(12) United States Patent
Ohmura et al.

(10) Patent No.: US 6,208,932 B1
(45) Date of Patent: Mar. 27, 2001

(54) NAVIGATION APPARATUS

(75) Inventors: Hiroshi Ohmura, Hatsukaichi; Koji Hosoda, Hiroshima-ken; Hideaki Kikuchi, Hatsukaichi, all of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 08/935,951

(22) Filed: Sep. 23, 1997

(30) Foreign Application Priority Data

Sep. 30, 1996 (JP) .................................................. 8-278996
Sep. 30, 1996 (JP) .................................................. 8-278997

(51) Int. Cl.$^7$ ............................... G06F 7/70; G06F 19/00
(52) U.S. Cl. ......................... 701/200; 701/209; 701/211; 73/178 R; 340/988
(58) Field of Search .................................. 701/200, 208, 701/209, 211, 300; 73/178 R; 340/988, 990; 455/527

(56) References Cited

U.S. PATENT DOCUMENTS 5,764,139 * 6/1998 Nojima et al. ......................... 701/29
5,850,618 * 12/1998 Suetsugu et al. ..................... 701/210
5,890,088 * 3/1999 Nimura et al. ....................... 701/208

FOREIGN PATENT DOCUMENTS

| 2-114117 | 4/1990 | (JP) . |
| 4-1898 | 1/1992 | (JP) . |
| 5-118866 | 5/1993 | (JP) . |
| 5-142994 | 6/1993 | (JP) . |
| 5-203458 | 8/1993 | (JP) . |
| 5-332778 | 12/1993 | (JP) . |
| 6-68385 | 3/1994 | (JP) . |

* cited by examiner

Primary Examiner—William A. Cuchlinski, Jr.
Assistant Examiner—Gertrude Arthur

(57) ABSTRACT

A navigation apparatus for appropriately providing a driver with necessary information without offering an excessive amount of information. When there are a plurality of information to be provided to a driver, the navigation apparatus selects information having a high priority in accordance with a predetermined priority order (PR or RK in FIG. 6) and offers the selected information to the driver in the selected order.

30 Claims, 72 Drawing Sheets

| INPUT TIME TM | TYPE OF INFORMATION KND | DATA DATA | PRIORITY PR | PRIORITY RANK (CORRECTED) RKC | INPUT QUEUE IQ | CURRENTLY BEING OUTPUT OUTP | OUTPUT QUEUE OUTQ | |
|---|---|---|---|---|---|---|---|---|
| t1 | 2 | X | 2 | B | | | | |
| t2 | 4 | Y | 4 | C | | | | |
| t3 | 1 | Z | 1 | A | | | | |
| | | | | | | | | ← POINTER γ |

FIG. 4

| TYPES OF INFORMATION | EXAMPLE |
|---|---|
| VEHICLE INFORMATION | ALARM FOR SYSTEM ABNORMALITY, REMAINING GASOLINE, ALARM FOR NON-SHUT DOOR |
| VICS INFORMATION | TRAFFIC INFORMATION, PARKING INFORMATION |
| NAVI INFORMATION | CURRENT POSITION, ROUTE GUIDANCE, OTHER GUIDANCE |
| TELETEXT BROADCASTING | MUSIC TITLE, TRAFFIC INFORMATION, WEATHER INFORMATION, NEWS, EVENT INFORMATION |
| ON-VEHICLE TELEPHONE | CONTENTS OF COMMUNICATION, VARIOUS AUDIO DATA |
| AUDIO DATA | MUSIC, NEWS, WEATHER FOCUS |
| | |

FIG. 5

| IDENTIFIER ID | MAP | REFERENCE ITEM |
|---|---|---|
| 1 | VEHICLE STATE | PROBLEM IN PARTICULAR FUNCTION, REMAINING FUEL |
| 2 | RUNNING STATE | SPEED, DISTANCE BETWEEN VEHICLES, AUTO CURSE STATE |
| 3-1 | RUNNING ENVIRONMENT | RUNNING ROAD (FLAT ROAD, MOUNTAIN ROAD, HIGHWAY, WIDE / NARROW ROAD, TOLL ROAD, CONGESTED ROAD) |
| 3-2 | | RUNNING LOCATION (NEIGHBORHOOD, LOCAL CITY, BEACH, TOURIST SPOT, SKIING SPOT) |
| 3-3 | | WEATHER (RAIN, SNOW, OUTSIDE TEMPERATURE) |
| 4 | DRIVING PURPOSE | WORK, TRAVEL, SHOPPING, SALES |
| 5 | TIME ZONE | COMMUTER'S RUSH HOUR, HOURS DURING MEAL, HOURS DURING SPORTS BROADCASTING, LATE NIGHT, EARLY MORNING |
| 6 | DRIVER'S MENTAL STATE | WEARY, TENSE, NERVOUS |
| 7 | INFORMATION PRECISION | NOISE LEVEL, TIME PASSED SINCE INPUT |
| 8 | DISPLAY MODE | |

FIG. 6

| INFORMATION | TYPE KND | PRIORITY ORDER PRD | PRIORITY ORDER (CHANGED) PRC | PRIORITY RANK (DEFAULT) PKD | PRIORITY RANK (CORRECTED) PKC | CAPACITY (DEFAULT) CAPD | CAPACITY (CHANGED VALUE) CAPC | REMAINING CAPACITY REM | POINTER PTR |
|---|---|---|---|---|---|---|---|---|---|
| URGENT INFORMATION | 1 | 1 | 1 | A | | | | | |
| VEHICLE INFORMATION | 2 | 2 | 2 | B | | | | | |
| VICS INFORMATION | 3 | 3 | 3 | C | | | | | |
| TRAFFIC INFORMATION | 4 | 4 | 4 | C | | | | | |
| NAVI INFORMATION | 5 | 5 | 5 | C | | | | | |
| WEATHER INFORMATION | 6 | 6 | 6 | D | | | | | |
| NEWS | 7 | 7 | 7 | D | | | | | |
| SPORTS INFORMATION | 8 | 8 | 8 | E | | | | | |
| EVENT INFORMATION | 9 | 9 | 9 | E | | | | | |
| MUSIC TITLE | 10 | 10 | 10 | E | | | | | |

ORDER OF RANKS : A > B > C > D > E

FIG. 7

MANAGEMENT OF MEMORY AREA

| [AREA 1] TRAFFIC INFORMATION (4WB)<br>1. LOCAL LOAD   2. NATIONAL ROAD 34<br>3. ○△HIGHWAY   4. NEIGHBORHOOD OF HOME<br>5. LOCAL ROAD (WEEKEND) 6. NEIGHBORHOOD B OF HOME<br>7. NEAR ◇○ PARK   7. NATIONAL ROAD Rt. 198<br><br>[AREA 2] WEATHER INFORMATION (2WB)<br>1. WEATHER FOCUS BETWEEN 12:00 - 18:00 IN ○△PREFECTURE<br>2. WEATHER FOCUS BETWEEN 18:00 - 24:00 IN ○△PREFECTURE<br>3. NATIONAL WEEKLY WEATHER FOCUS<br><br>[AREA 3] REGULATION INFORMATION (2WB)<br>1. LOCAL LOAD (DAY TIME)<br>2. LOCAL LOAD (NIGHT TIME)<br>3. MAIN ROAD | [AREA 4] NEWS (3WB)<br>1. NEWS DIGEST<br>2. LOCAL NEWS<br>3. YEN AND STOCKS<br>4. NATIONAL NEWS<br><br>[AREA 5] SPORTS NEWS (2WB)<br>1. PROFESSIONAL BASEBALL BULLETIN BOARD<br>2. J-LEAGUE BULLETIN BOARD<br>3. OTHER<br><br>[AREA 6] OTHER (3WB)<br>1. TITLE OF SONG<br>2. VEHICLE INFORMATION<br>3. SCHEDULE OF MONTH<br>4. PURCHASE LIST |
|---|---|
| [AREA 7] FREE : 4WB ||

SCREEN FOR SETTING MEMORY AREA

《SETTING MEMORY AREA》

1. TRAFFIC INFORMATION : 4MB
2. WEATHER INFORMATION : 2MB
3. REGULATION INFORMATION : 2MB
4. NEWS : 3MB
---
5. SPORTS INFORMATION : 2MB
6. OTHER : 3MB

MEMORY CAPACITY

FIG. 9

| INPUT TIME TM | TYPE OF INFORMATION KND | DATA DATA | PRIORITY PR | PRIORITY RANK (CORRECTED) RKC | INPUT QUEUE IQ | CURRENTLY BEING OUTPUT OUTP | OUTPUT QUEUE OUTQ |
|---|---|---|---|---|---|---|---|
| t1 | 2 | X | 2 | B | | | |
| t2 | 4 | Y | 4 | C | | | |
| t3 | 1 | Z | 1 | A | | | |
| | | | | | | | ← POINTER γ |

FIRST EMBODIMENT

FIG. 11

FIRST EMBODIMENT

SETTING TABLE OF URGENT LEVEL LVL OF OUTPUT TIMING

| PRIORITY RANK RKC<br>RUNNING STATE ST | A | B | C | D | E |
|---|---|---|---|---|---|
| ABRUPT TURN | 1 | 2 | 2 | 2 | 3 |
| ABRUPT BREAK | 1 | 2 | 2 | 2 | 3 |
| BACK UP | 1 | 1 | 1 | 2 | 3 |
| CHANGE LANE | 1 | 1 | 1 | 1 | 2 |
| TURN RIGHT / LEFT | 1 | 1 | 1 | 1 | 2 |
| ABRUPT ACCELERATION | 1 | 1 | 1 | 1 | 2 |
| OTHER (STOP, NORMAL) | 1 | 2 | 2 | 2 | 1 |
| ROUTE GUIDANCE | 1 | 2 | 2 | 2 | 2 |

FIG. 12

FIRST EMBODIMENT

| LEVEL OF DATA BEING OUTPUT | DATA BEING OUTPUT | LEVEL OF INPUT DATA | NO DATA BEING OUTPUT |
|---|---|---|---|
| 1 | CONTINUE OUTPUT OPERATION OF OUTPUTTING DATA (AS A RESULT, OUTPUT OF INPUTTED DATA IS POSTPONED) | 1 | OUTPUT INPUTTED DATA |
| 2 | TERMINATE OUTPUT OF OUTPUTTING DATA. OUTPUT OF THE OUTPUTTING DATA IS POSTPONED UNTIL RUNNING CONDITION WHICH HAS CAUSED THE TERMINATION RETURNS TO NORMAL | 2 | POSTPONE OUTPUT OF INPUTTED DATA UNTIL RUNNING CONDITION WHICH HAS CAUSED THE POSTPONEMENT RETURNS TO NORMAL |
| 3 | PROHIBIT OUTPUT OF OUTPUTTING DATA (CLEAR THE OUTPUTTING DATA) | 3 | PROHIBIT OUTPUT OF INPUTTED DATA (CLEAR INPUTTED DATA) |

FIG. 13

FIRST EMBODIMENT

DEFINITION TABLE OF PRIORITY LOWER LIMIT FOR EACH RUNNING STATE

| RUNNING STATE STAT | LOWER LIMIT OF PRIORITY ORDER RKLMT |
|---|---|
| ABRUPT TURN | A |
| ABRUPT BREAK | A |
| BACK UP | C |
| CHANGE LANE | D |
| TURN RIGHT / LEFT | D |
| ABRUPT ACCELERATION | D |
| NORMAL | PROVIDE ALL INFORMATION |

FIRST EMBODIMENT  F I G. 15
MAP CORRECTION
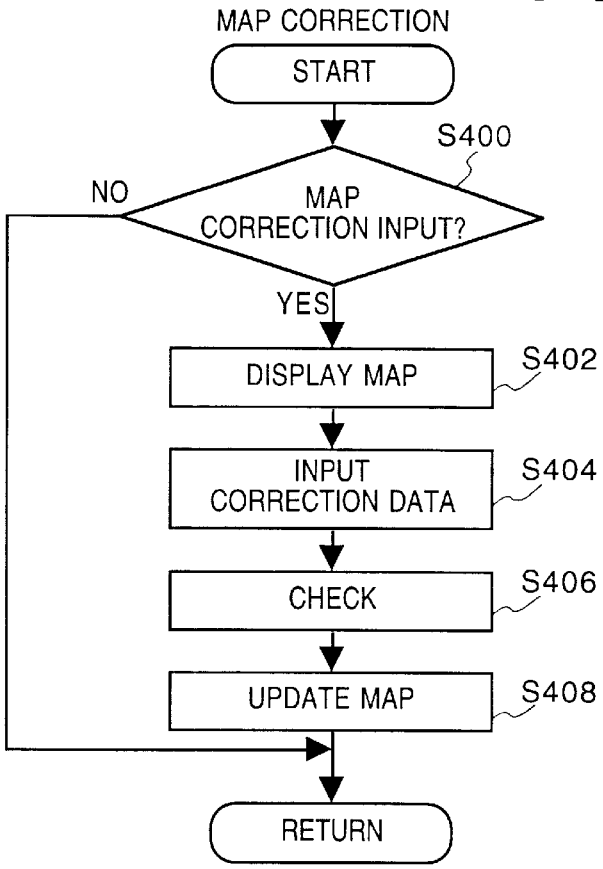
FIRST EMBODIMENT  F I G. 16
MAP SELECTION
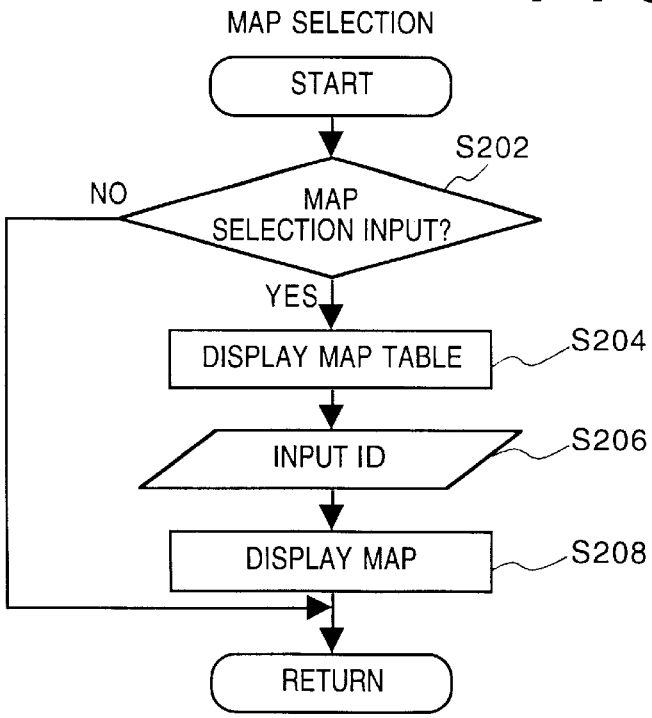

FIG. 21

DEFINITION TABLE OF LIMITATION IN CONTINUOUS OUTPUT

| RUNNING STATE ST | LIMITATION LMT IN NUMBER OF TIMES OF CONTINUOUS OUTPUT LMT |
|---|---|
| ABRUPT TURN | NO LIMIT |
| ABRUPT BREAK | NO LIMIT |
| BACK UP | TWICE |
| CHANGE LANE | TWICE |
| TURN RIGHT / LEFT | THREE TIMES |
| ABRUPT ACCELERATION | THREE TIMES |
| NORMAL | FIVE TIMES |

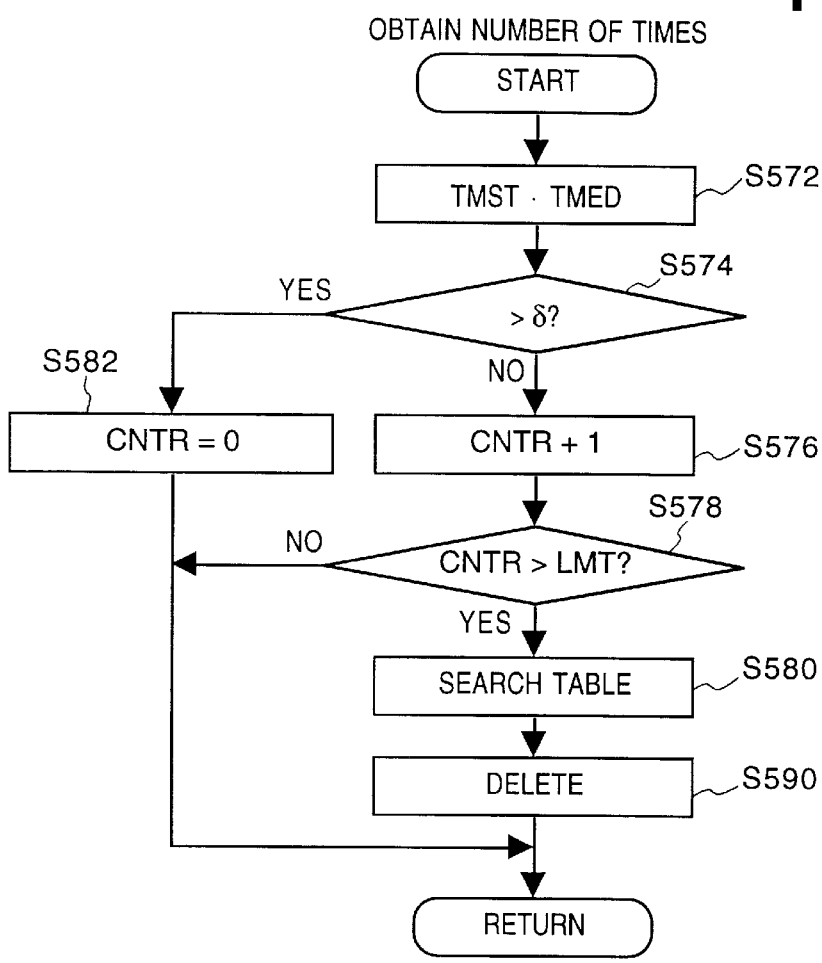
FIG. 22 FIRST EMBODIMENT
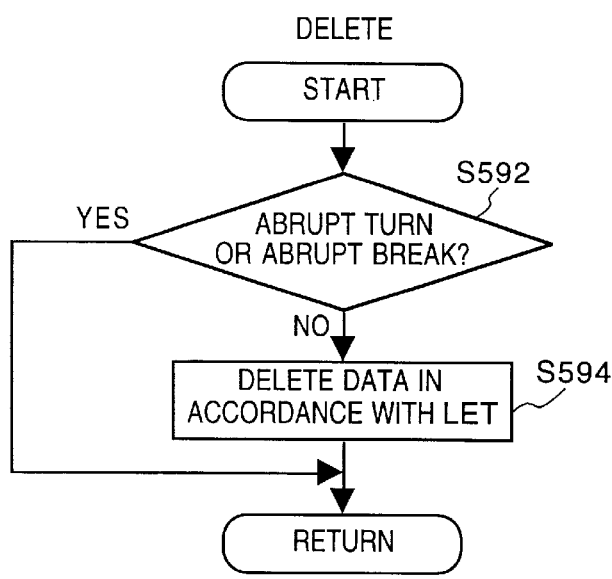
FIG. 23 FIRST EMBODIMENT

FIRST EMBODIMENT

FIRST EMBODIMENT

FIRST EMBODIMENT

FIRST EMBODIMENT

FIRST EMBODIMENT

FIG. 29

SECOND EMBODIMENT

DEFINITION TABLE OF ENVIRONMENT ENV - CLASSIFICATION CL

| INFORMATION | RUNNING ENVIRONMENT ENV | | |
|---|---|---|---|
| | MOUNTAIN ROAD | NEIGHBORHOOD | CONGESTED ROAD |
| URGENT INFORMATION | 1 | 1 | 1 |
| VEHICLE INFORMATION | 2 | 2 | 2 |
| VICS INFORMATION | 3 | 2 | 2 |
| TRAFFIC INFORMATION | 3 | 4 | 2 |
| NAVI INFORMATION | 3 | 2 | 2 |
| WEATHER INFORMATION | 3 | 3 | 3 |
| NEWS | 4 | 3 | 3 |
| SPORTS INFORMATION | 4 | 4 | 3 |
| EVENT INFORMATION | 4 | 4 | 3 |
| MUSIC TITLE | 4 | 4 | 4 |

FIG. 30
SECOND EMBODIMENT

| CLASSIFICATION (CL) OF DATA BEING OUTPUTTED | PRIORITY RANK OF OUTPUTTING DATA IS HIGHER (NO IN STEP S704) | CLASSIFICATION (CL) OF INPUTTED DATA | PRIORITY RANK OF OUTPUTTING DATA IS LOWER (YES IN STEP S704) |
|---|---|---|---|
| CL = 2 | CONTINUE OUTPUT OF OUTPUTTING DATA, AND OUTPUT INPUTTED DATA AFTER THE OUTPUTTING DATA IS OUTPUTTED | CL = 2 | TERMINATE OUTPUT OF OUTPUTTING DATA. INSTEAD, OUTPUT INPUTTED DATA. RESUME OUTPUT OF THE OUTPUTTING DATA AFTER INPUTTED DATA IS OUTPUTTED |
| CL = 3 | CONTINUE OUTPUT OF OUTPUTTING DATA. DELETE INPUTTED DATA | CL = 3 | TERMINATE OUTPUT OF OUTPUTTING DATA AND DELETE THE DATA. INSTEAD, OUTPUT INPUTTED DATA |

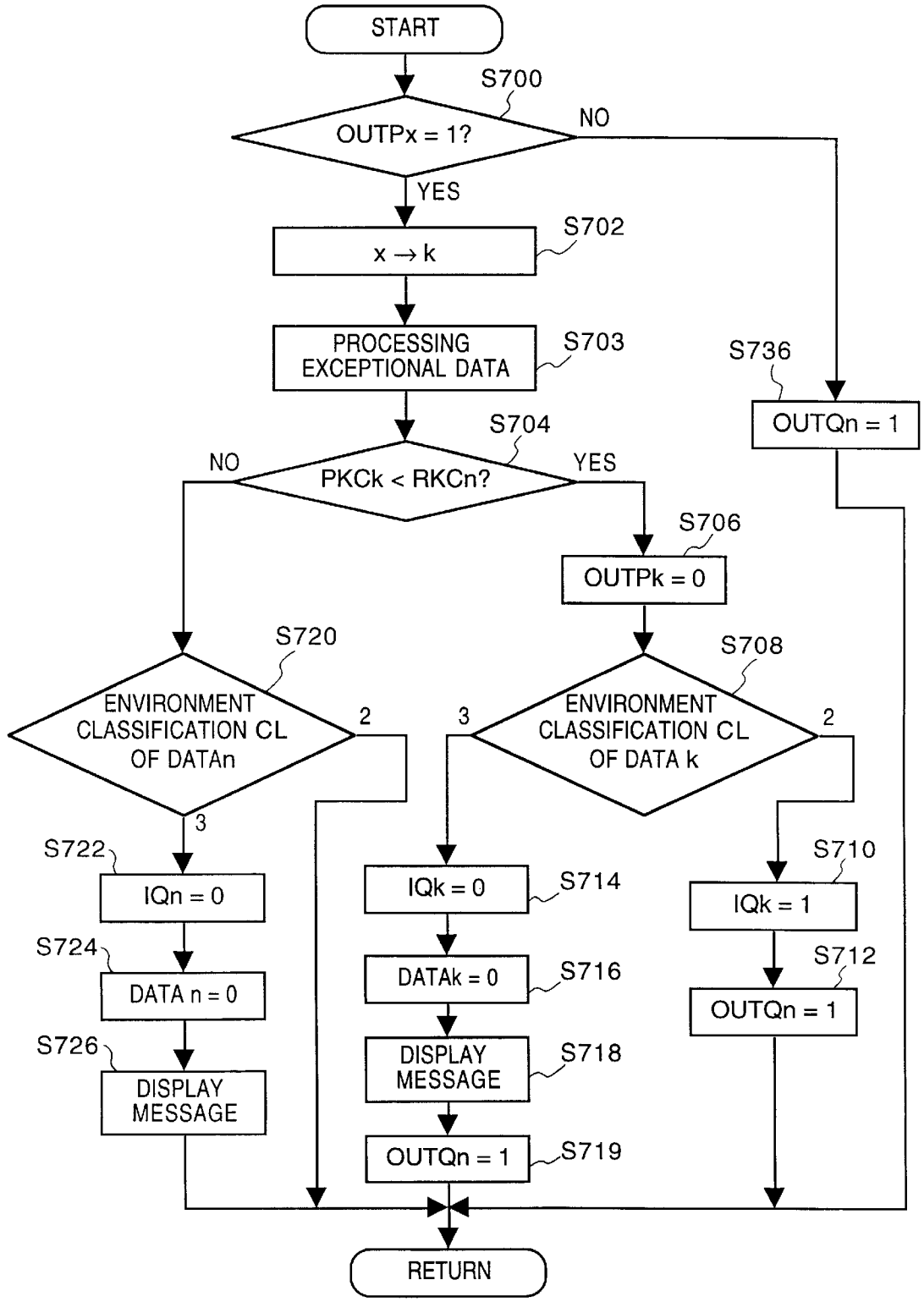

SECOND EMBODIMENT

SECOND EMBODIMENT

FIG. 35

THIRD EMBODIMENT

| INFORMATION | GENERAL DRIVING MODE | | HIGHWAY DRIVING MODE | |
|---|---|---|---|---|
| KIND | PRIORITY PR | CLASSIFICATION CL | PRIORITY PR | CLASSIFICATION CL |
| URGENT INFORMATION | 1 | 1 | 1 | 1 |
| VEHICLE INFORMATION | 2 | 1 | 2 | 1 |
| VICS INFORMATION | 4 | 2 | 3 | 2 |
| TRAFFIC INFORMATION | 5 | 2 | 4 | 2 |
| NAVI INFORMATION | 3 | 3 | 6 | 3 |
| WEATHER INFORMATION | 6 | 4 | 5 | 2 |
| NEWS | 7 | 4 | X | 4 |
| SPORTS INFORMATION | X | 4 | X | 4 |
| EVENT INFORMATION | X | 4 | X | 4 |
| MUSIC TITLE | X | 4 | X | 4 |

FIG. 36
THIRD EMBODIMENT

| CLASSIFICATION (CL) OF DATA BEING OUTPUTTED | PRIORITY RANK OF OUTPUTTING DATA IS HIGHER | CLASSIFICATION (CL) OF INPUTTED DATA | PRIORITY RANK OF OUTPUTTING DATA IS LOWER |
|---|---|---|---|
| CL = 2 | CONTINUE OUTPUT OF OUTPUTTING DATA, AND OUTPUT INPUTTED DATA AFTER THE OUTPUTTING DATA IS OUTPUTTED | CL = 2 | TERMINATE OUTPUT OF OUTPUTTING DATA. INSTEAD, OUTPUT INPUTTED DATA. RESUME OUTPUT OF THE OUTPUTTING DATA AFTER INPUTTED DATA IS OUTPUTTED |
| CL = 3 | CONTINUE OUTPUT OF OUTPUTTING DATA. DELETE INPUTTED DATA | CL = 3 | TERMINATE OUTPUT OF OUTPUTTING DATA AND DELETE THE DATA. INSTEAD, OUTPUT INPUTTED DATA |

THIRD EMBODIMENT

THIRD EMBODIMENT

INFORMATION OFFER CONTROL

FIG. 39 THIRD EMBODIMENT

THIRD EMBODIMENT

COMPLETE OUTPUT

THIRD EMBODIMENT

DELETE

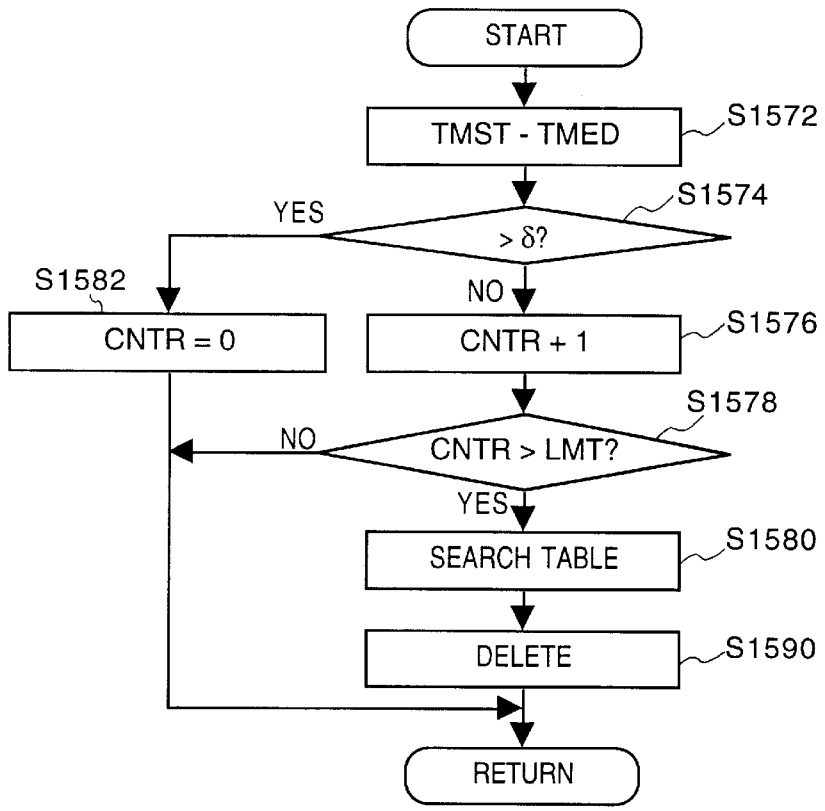
FIG. 46 THIRD EMBODIMENT OBTAIN NUMBER OF TIMES
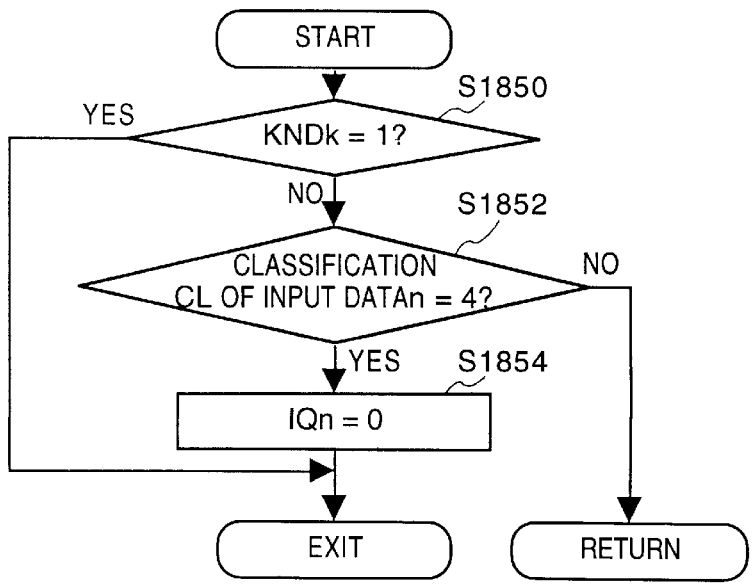
FIG. 47 THIRD EMBODIMENT PROCESSING EXCEPTIONAL DATA

FIG. 48
THIRD MODIFIED EMBODIMENT
DEFINITION TABLE OF TIME ZONE · CLASSIFICATION CL

| TIME ZONE BND / INFORMATION KND | TIME ZONE FOR MEAL HOUR | | TIME ZONE FOR COMMUTER'S RUSH HOUR | |
|---|---|---|---|---|
| | PRIORITY PR | CLASSIFICATION CL | PRIORITY PR | CLASSIFICATION CL |
| URGENT INFORMATION | 1 | 1 | 1 | 1 |
| VEHICLE INFORMATION | 2 | 2 | 2 | 2 |
| VICS INFORMATION | 5 | 2 | 3 | 2 |
| TRAFFIC INFORMATION | 4 | 2 | 4 | 2 |
| NAVI INFORMATION | 3 | 3 | 5 | 2 |
| WEATHER INFORMATION | 7 | 4 | 6 | 2 |
| NEWS | X | 4 | 7 | 3 |
| SPORTS INFORMATION | X | 3 | 8 | 3 |
| EVENT INFORMATION | 6 | 4 | 9 | 3 |
| MUSIC TITLE | X | 4 | X | 4 |

FIG. 49

THIRD MODIFIED EMBODIMENT

DEFINITION TABLE OF TIME ZONE · CLASSIFICATION CL

| TIME ZONE BND<br>INFORMATION KND | 11:30~13:30 17:30~21:00 | | 7:00~9:00 18:00~20:00 | |
|---|---|---|---|---|
| | PRIORITY PR | CLASSIFICATION CL | PRIORITY PR | CLASSIFICATION CL |
| URGENT INFORMATION | 1 | 1 | 1 | 1 |
| VEHICLE INFORMATION | 2 | 2 | 2 | 2 |
| VICS INFORMATION | 5 | 2 | 3 | 2 |
| TRAFFIC INFORMATION | 4 | 2 | 4 | 2 |
| NAVI INFORMATION | 3 | 3 | 5 | 2 |
| WEATHER INFORMATION | 7 | 4 | 6 | 3 |
| NEWS | X | 4 | 7 | 3 |
| SPORTS INFORMATION | X | 4 | 8 | 3 |
| EVENT INFORMATION | 6 | 4 | 9 | 3 |
| MUSIC TITLE | X | 4 | X | 4 |

FIG. 50
FOURTH MODIFIED EMBODIMENT

| TIME ZONE BND / INFORMATION KND | COMMUTER'S RUSH HOUR | MEAL HOUR | BASEBALL GAME BROADCASTING HOUR | TIME FOR NEWS | TIME FOR WEATHER FOCUS |
|---|---|---|---|---|---|
| VEHICLE INFORMATION | ○ | ○ | ○ | ○ | ○ |
| NAVI INFORMATION | ○ | | | | |
| VICS INFORMATION | ○ | | | | |
| NEWS | | | | ○ | |
| SPORTS INFORMATION | | | ○ | | |
| TRAFFIC INFORMATION | ○ | ○ | | | |
| WEATHER INFORMATION | | | | | ○ |
| EVENT INFORMATION | | | | | |

FOURTH MODIFIED EMBODIMENT

DETERMINING WHETHER TO PROVIDE INFORMATION ACCORDING TO TIME ZONE

FOURTH MODIFIED EMBODIMENT

| TIME ZONE | EXAMPLE |
|---|---|
| COMMUTER'S RUSH HOUR | 6 : 30 ~ 9 : 00, 18 : 00 ~ 20 : 00 |
| MEAL HOUR | 11 : 30 ~ 13 : 30, 18 : 00 ~ 21 : 00 |
| BASEBALL GAME BROADCASTING HOUR | 18 : 30 ~ 21 : 00 |
| TIME FOR NEWS | 7 : 00 ~ 7 : 30, 12 : 00 ~ 12 : 10, 18 : 00 ~ 18 : 10 |
| TIME FOR WEATHER FOCUS | 9 : 55 ~ 10 : 00, 11 : 55 ~ 12 : 00, 18 : 55 ~ 19 : 00 |

FIG. 53
FOURTH EMBODIMENT
CLASSIFICATION DEPENDING ON DRIVING PURPOSE

| DRIVING PURPOSE OBJ / INFORMATION KND | WORK PRIORITY PR | WORK CLASSIFICATION CL | TRAVEL PRIORITY PR | TRAVEL CLASSIFICATION CL | SHOPPING PRIORITY PR | SHOPPING CLASSIFICATION CL |
|---|---|---|---|---|---|---|
| URGENT INFORMATION | 1 | 1 | 1 | 1 | 1 | 1 |
| VEHICLE INFORMATION | 2 | 2 | 2 | 2 | 2 | 2 |
| VICS INFORMATION | 4 | 2 | 6 | 2 | 3 | 2 |
| TRAFFIC INFORMATION | 5 | 2 | 4 | 2 | 4 | 2 |
| NAVI INFORMATION | 3 | 2 | 3 | 2 | 5 | 2 |
| WEATHER INFORMATION | 6 | 3 | 5 | 2 | 6 | 3 |
| NEWS | 7 | 4 | X | 4 | 7 | 3 |
| SPORTS INFORMATION | X | 4 | X | 4 | 8 | 3 |
| EVENT INFORMATION | X | 4 | X | 4 | 9 | 3 |
| MUSIC TITLE | X | 4 | X | 4 | X | 4 |

FIG. 54

FIFTH MODIFIED EMBODIMENT

DETERMINING WHETHER TO PROVIDE INFORMATION
ACCORDING TO DRIVING ZONE

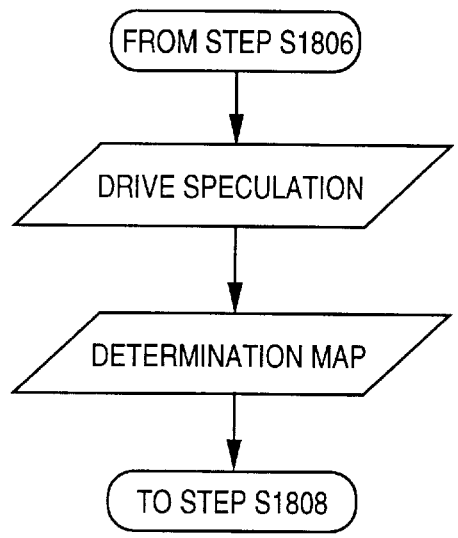

FIG. 55

FIFTH MODIFIED EMBODIMENT

| INFORMATION KND \ DRIVING PURPOSE BND | WORK | TRAVEL | SALES | SHOPPING | NAVI ROUTE GUIDANCE |
|---|---|---|---|---|---|
| VEHICLE INFORMATION | ○ | ○ | ○ | ○ | ○ |
| NAVI INFORMATION |  | ○ | ○ | ○ | ○ |
| VICS INFORMATION | ○ | ○ | ○ | ○ | ○ |
| NEWS | ○ |  |  |  |  |
| SPORTS INFORMATION |  |  |  | ○ |  |
| TRAFFIC INFORMATION | ○ | ○ | ○ | ○ | ○ |
| WEATHER INFORMATION |  | ○ | ○ | ○ |  |
| EVENT INFORMATION |  |  |  | ○ |  |

FIG. 56

FIFTH EMBODIMENT

CLASSIFICATION DEPENDING ON DRIVER'S MENTAL STATE

| DRIVER'S MENTAL STATE PSY / INFORMATION KND | WEARY | | TENSE | | NORMAL | |
|---|---|---|---|---|---|---|
| | PRIORITY PR | CLASSIFICATION CL | PRIORITY PR | CLASSIFICATION CL | PRIORITY PR | CLASSIFICATION CL |
| URGENT INFORMATION | 1 | 1 | 1 | 1 | 1 | 1 |
| VEHICLE INFORMATION | 2 | 2 | 2 | 2 | 2 | 2 |
| VICS INFORMATION | 4 | 3 | 5 | 2 | 3 | 2 |
| TRAFFIC INFORMATION | 5 | 3 | 4 | 2 | 4 | 2 |
| NAVI INFORMATION | 3 | 3 | 3 | 2 | 5 | 2 |
| WEATHER INFORMATION | 6 | 3 | 6 | 3 | 6 | 2 |
| NEWS | 7 | 3 | X | 4 | 7 | 3 |
| SPORTS INFORMATION | X | 4 | X | 4 | 8 | 3 |
| EVENT INFORMATION | X | 4 | X | 4 | 9 | 3 |
| MUSIC TITLE | X | 4 | X | 4 | X | 4 |

FIG. 57

SIXTH MODIFIED EMBODIMENT

| MENTAL STATE / INFORMATION KIND | NORMAL | NERVOUS | HEAVILY EXHAUSTED | SLIGHTLY EXHAUSTED | HEAVILY TENSE | SLIGHTLY TENSE |
|---|---|---|---|---|---|---|
| VEHICLE INFORMATION | ○ | ○ | ○ | ○ | ○ | ○ |
| NAVI INFORMATION | ○ | ○ | | ○ | ○ | ○ |
| VICS INFORMATION | ○ | ○ | | ○ | | ○ |
| NEWS | ○ | | | | | |
| SPORTS INFORMATION | ○ | | | ○ | | |
| TRAFFIC INFORMATION | ○ | ○ | ○ | ○ | ○ | ○ |
| WEATHER INFORMATION | ○ | | | | | |
| EVENT INFORMATION | ○ | | | ○ | | |

FIFTH EMBODIMENT

SIXTH EMBODIMENT

SIXTH EMBODIMENT

FIG. 61
SEVENTH EMBODIMENT

| [CONDITION OF CORRECTION] | [EXAMPLES OF PRIORITY CORRECTION] |
|---|---|
| ● VEHICLE STATE | |
| PROBLEM IN PARTICULAR FUNCTION | • RAISE PRIORITY OF TRAFFIC INFORMATION AT THE TIME OF BREAKDOWN |
| REMAINING FUEL | • RAISE PRIORITY OF TRAFFIC INFO. AND NAVI INFO. WHEN REMAINING FUEL IS LESS THAN PREDETERMINED AMOUNT |
| ● RUNNING STATE | |
| SPEED | • HIGH SPEED : RAISE PRIORITY OF VICS INFORMATION |
| AUTO CRUISE | • RAISE PRIORITY OF NAVI INFORMATION WHILE DRIVING WITH AUTO CRUISE CONTROL |
| ● RUNNING ENVIRONMENT | |
| RUNNING ROAD (MOUNTAIN ROAD, HIGHWAY ETC.) | • MOUNTAIN ROAD : RAISE PRIORITY OF WEATHER INFORMATION<br>• HIGHWAY : RAISE PRIORITY OF VICS INFORMATION AND TRAFFIC INFORMATION |
| CONTESTED ROAD | • RAISE PRIORITY OF TRAFFIC INFORMATION |
| WEATHER (RAIN, SNOW ETC.) | • RAISE PRIORITY OF WEATHER INFORMATION |
| ● DRIVING PURPOSE | |
| WORK | • RAISE PRIORITY OF TRAFFIC INFORMATION |
| TRAVEL | • RAISE PRIORITY OF NAVI, VICS, TRAFFIC AND WEATHER INFORMATION |
| SHOPPING | • RAISE PRIORITY OF EVENT INFORMATION |
| SALES | • RAISE PRIORITY OF NAVI, VICS, TRAFFIC INFORMATION |
| ● TIME ZONE | |
| COMMUTER'S RUSH HOUR | • RAISE PRIORITY OF TRAFFIC INFORMATION |
| HOURS DURING MEAL | • RAISE PRIORITY OF NAVI INFORMATION |
| HOURS DRIVING SPORTS BROADCASTING | • RAISE PRIORITY OF SPORTS INFORMATION |
| LATE NIGHT | • RAISE PRIORITY OF TRAFFIC INFORMATION |
| ● MENTAL STATE | |
| NERVOUS | • RAISE PRIORITY OF TRAFFIC INFORMATION |
| ● INFORMATION PRECISION | |
| NOISE LEVEL | • LOWER PRIORITY OF DATA HAVING HIGH LEVEL OF NOISE |
| TIME PASSED SINCE INPUT | • LOWER PRIORITY OF OUTDATED DATA |

SEVENTH EMBODIMENT

| INPUT TIME | NUMBER OF TIMES | DATA CONTENTS | INTERVAL |
|---|---|---|---|
|  |  |  |  |
|  |  |  |  |
|  |  |  |  |
|  |  |  |  |
|  |  |  |  |

EIGHTH EMBODIMENT

EIGHTH EMBODIMENT

FIG. 67

FIRST MODIFIED EMBODIMENT

SETTING TABLE OF URGENT LEVEL LVL OF OUTPUT TIMING

| PRIORITY RANK RKC<br>RUNNING STATE ST | A | B | C | D | E |
|---|---|---|---|---|---|
| ABRUPT TURN | 1 | 1 (DISPLAY) | 2 | 2 | 3 |
| ABRUPT BREAK | 1 | 1 (DISPLAY) | 2 | 2 | 3 |
| BACK UP | 1 | 1 | 1 | 2 | 3 |
| CHANGE LANE | 1 | 1 | 1 | 1 | 2 |
| TURN RIGHT / LEFT | 1 | 1 | 1 | 1 | 2 |
| ABRUPT ACCELERATION | 1 | 1 | 1 | 1 | 2 |
| OTHER (STOP, NORMAL) | 1 | 1 | 1 | 1 | 1 |
| ROUTE GUIDANCE | 1 | 2 | 2 | 2 | 2 |

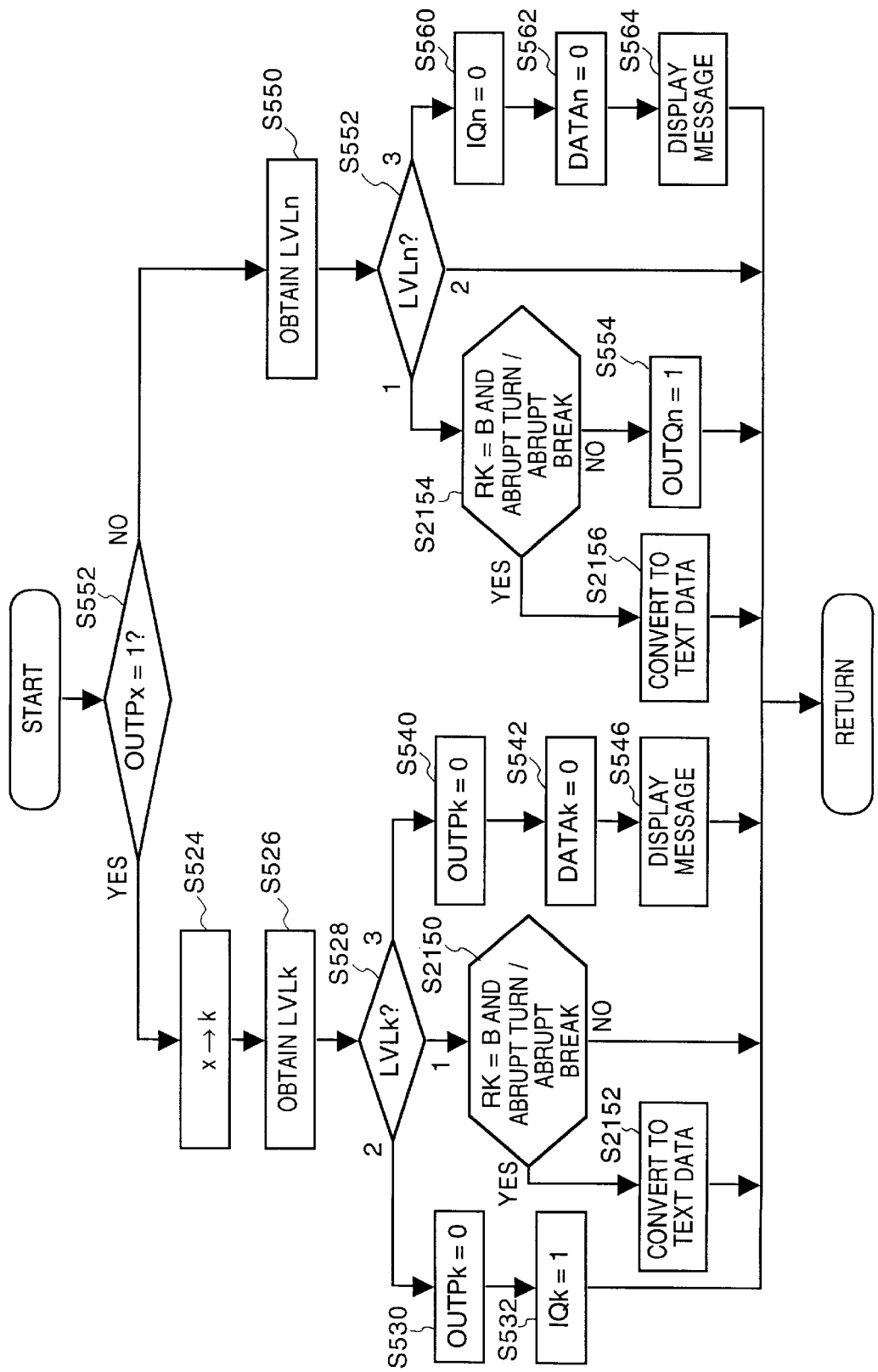

FIG. 69

SECOND MODIFIED EMBODIMENT

| INFORMATION KND | ABRUPT TURN | | CHANGE LANE | | OTHER STATE | |
|---|---|---|---|---|---|---|
| | PRIORITY PR | CLASSIFICATION CL | PRIORITY PR | CLASSIFICATION CL | PRIORITY PR | CLASSIFICATION CL |
| URGENT INFORMATION | 1 | 1 | 1 | 1 | 1 | 1 |
| VEHICLE INFORMATION | 2 | 1 | 2 | 1 | 2 | 1 |
| VICS INFORMATION | 3 | 2 | 3 | 2 | 4 | 2 |
| TRAFFIC INFORMATION | 4 | 2 | 4 | 2 | 5 | 2 |
| NAVI INFORMATION | 6 | 3 | 5 | 2 | 3 | 2 |
| WEATHER INFORMATION | 5 | 2 | 6 | 3 | 6 | 3 |
| NEWS | X | 4 | 7 | 3 | X | 3 |
| SPORTS INFORMATION | X | 4 | 8 | 3 | X | 4 |
| EVENT INFORMATION | X | 4 | 9 | 4 | X | 4 |
| MUSIC TITLE | X | 4 | X | 4 | X | 4 |

NINTH EMBODIMENT

NINTH EMBODIMENT

NINTH EMBODIMENT

NINTH EMBODIMENT

NINTH EMBODIMENT

NINTH EMBODIMENT

NINTH EMBODIMENT

EIGHTH MODIFIED EMBODIMENT

TENTH EMBODIMENT

FIG. 76 TENTH EMBODIMENT

1 = TENSE  0 = SOFT
1 = TONE OF COMMAND  0 = TONE OF GUIDANCE

| TYPE OF GUIDANCE INFORMATION | | SOUND QUALITY / VOICE | | | | SERVICE MARK INFORMATION |
|---|---|---|---|---|---|---|
| | | CHIME TENSE/SOFT | MALE/FEMALE VOICE | TONE OF VOICE COMMAND/GUIDANCE | VOLUME | |
| WARNING INFORMATION | URGENT LEVEL HIGH (ABS, TRC) | 1 | MALE | 1 | MEDIUM | |
| | URGENT LEVEL LOW (LITTLE OIL, FUEL) | 0 | FEMALE | 0 | MEDIUM | |
| ROUTE GUIDE INFORMATION | NEAR GUIDANCE POINT | 1 | MALE | 1 | MEDIUM | |
| | DISTANT FROM GUIDANCE POINT | 0 | FEMALE | 0 | MEDIUM | |
| TRAFFIC INFORMATION | LARGELY AFFECT ON DRIVING | 1 | MALE | 1 | MEDIUM | |
| | LITTLE AFFECT ON DRIVING | 0 | FEMALE | 0 | MEDIUM | |
| FACILITY GUIDE | | 0 | FEMALE | 0 | MEDIUM | |
| HIGHWAY GUIDE | | 0 | FEMALE | 0 | MEDIUM | |
| CURRENT POSITION INFORMATION | | 0 | FEMALE | 0 | MEDIUM | |
| RUNNING ENVIRONMENT | CITY | 0 | FEMALE | 0 | HIGH | |
| | SUBURB | 0 | FEMALE | 0 | LOW | |
| DRIVING TIME | LESS THAN TWO HOURS | 0 | FEMALE | 0 | LOW | |
| | MORE THAN TWO HOURS | 0 | FEMALE | 0 | HIGH | |
| DRIVING TIME ZONE | AM6:00 ~ AM10:00 | 0 | FEMALE | 0 | LOW | |
| | AM10:01 ~ PM4:00 | 0 | FEMALE | 0 | MEDIUM | |
| | PM4:01 ~ PM5:59 | 0 | FEMALE | 0 | MEDIUM | |
| DRIVING AREA | NEIGHBORHOOD | 0 | FEMALE | 0 | | NONE |
| | OUTSIDE NEIGHBORHOOD | 0 | FEMALE | 0 | | YES |

SIXTH MODIFIED EMBODIMENT

PROCESSING EXCEPTIONAL DATA

SEVENTH EMBODIMENT

FIG. 79

DEFINITION TABLE OF MENU-SETTING PERMISSION

|  | RANK = A, B | RANK = C | RANK = D | RANK = E |
|---|---|---|---|---|
| URGENT LEVEL 1 | ○ | △ | × | × |
| URGENT LEVEL 2 | ○ | ◎ | △ | × |
| URGENT LEVEL 3 | ○ | ◎ | ◎ | △ |
| URGENT LEVEL 4 | ◎ | ◎ | ◎ | ○ |

▨ MENU SETTING EFFECTIVE AREA

FIG. 80

TABLE FOR DETERMINING AUDIO DATA OUTPUT DESTINATION

|  | RANK = A, B | RANK = C | RANK = D | RANK = E |
|---|---|---|---|---|
| URGENT LEVEL 1 | ○ AUDIO SYSTEM + DISPLAY SYSTEM | △ AUDIO SYSTEM | × | × |
| URGENT LEVEL 2 | ○ AUDIO SYSTEM + DISPLAY SYSTEM | ○ AUDIO SYSTEM | △ AUDIO SYSTEM | × |
| URGENT LEVEL 3 | ○ AUDIO SYSTEM + DISPLAY SYSTEM | ○ AUDIO SYSTEM + DISPLAY SYSTEM | ○ AUDIO SYSTEM | △ AUDIO SYSTEM |
| URGENT LEVEL 4 | ○ AUDIO SYSTEM + DISPLAY SYSTEM | ○ AUDIO SYSTEM + DISPLAY SYSTEM | ○ AUDIO SYSTEM + DISPLAY SYSTEM | ○ AUDIO SYSTEM + DISPLAY SYSTEM |

FIG. 81

| CONDITION | STATE | URGENT LEVEL |
|---|---|---|
| WHEN THERE ARE OR THERE MAY BE LARGE DRIVING MOTION | • WHEN ROAD CURVATURE IS, OR IS PREDICTED TO BE LARGE, COMPARED TO VEHICLE SPEED | 2 |
| | • WHEN ROAD CURVATURE IS LARGE | 2 |
| | • WHEN ABRUPTLY ACCELERATING / DECELERATING | 3 |
| | • DRIVING INTERSECTING POINT (TURNING BLINKER ON) | 1 |
| | • WHEN CHANGING LANE (TURNING BLINKER ON) | 1 |
| | • WHEN BAD WEATHER | 2 |
| WHEN DRIVER PAYS ATTENTION TO DRIVING | • WHEN CUTTING IN WHILE DRIVING ON A ROAD HAVING NUMEROUS LANES | 1 |
| | • WHEN MERGING AT INTERCHANGE OF HIGHWAY | 1 |
| | • WHEN DRIVING RESIDENTIAL AREA OR NEAR SCHOOL | 3 |
| | • WHEN DRIVING WITH SHORT DISTANCE BETWEEN VEHICLES | 2 |
| | • WHEN PASSING ANOTHER VEHICLE | 2 |
| | • WHEN MAKING PHONE CALL, DURING PHONE CALL, RECEIVING PHONE CALL | 1 |
| | • WHEN APPROACHED BY EMERGENCY VEHICLE | 2 |
| TRAFFIC | • WHEN DRIVING EXTREMELY SLOW (CREEPING OF STOPPED), NOT URGENT | 4 |
| | • WHEN DRIVING AT 40 - 110 Km/h, NOT URGENT | 4 |
| | • WHEN DRIVING APPROXIMATELY AT 20 Km/h, CAN BE URGENT | 2 |

FIG. 82

TWELFTH EMBODIMENT

| PRIORITY ORDER TABLE | | | | | | | PRIORITY ORDER OF GUIDE INFORMATION | | | | | |
|---|---|---|---|---|---|---|---|---|---|---|---|---|
| FLAG | | | | | | WARNING INFORMATION | ROUTE GUIDE INFORMATION | FACILITY GUIDE INFORMATION | HIGHWAY GUIDE INFORMATION | TRAFFIC INFORMATION | CURRENT POSITION INFORMATION |
| A | B | C | D | E | F | | | | | | |
| 1 | 1 | - | - | - | - | 1 | 2 | - | - | - | - |
| 1 | 1 | 1 | - | - | - | 1 | 2 | 3 | - | - | - |
| 1 | 1 | 0 | 1 | - | - | 1 | 2 | - | - | 3 | - |
| 1 | 1 | 0 | 0 | 1 | - | 1 | 2 | - | - | - | 3 |
| 1 | 1 | 0 | 0 | 0 | 1 | 1 | 2 | - | - | - | - |
| 1 | 1 | 0 | 0 | 0 | 0 | 1 | - | - | - | - | - |
| 1 | 0 | - | 1 | - | - | 1 | - | - | 2 | 3 | - |
| 1 | 0 | - | 0 | 1 | 1 | 1 | - | - | 2 | 3 | 2 |
| 1 | 0 | - | 0 | 1 | 0 | 1 | - | - | - | 3 | 2 |
| 1 | 0 | - | 0 | 0 | 1 | 1 | - | - | - | - | 2 |
| 1 | 0 | - | 0 | 0 | 0 | 1 | - | - | - | - | - |
| 0 | - | - | - | - | - | - | 1 | - | - | - | - |
| 0 | 1 | - | 1 | - | - | - | 1 | 2 | - | 2 | - |
| 0 | 1 | - | 0 | 1 | 1 | - | 1 | - | 1 | 2 | 2 |
| 0 | 1 | - | 0 | 1 | 0 | - | 1 | - | 1 | - | 2 |
| 0 | 1 | - | 0 | 0 | 1 | - | 1 | - | - | 2 | 2 |
| 0 | 0 | - | 1 | 0 | - | - | - | - | - | 2 | - |
| 0 | 0 | - | 0 | 1 | 1 | - | - | - | - | 2 | 2 |
| 0 | 0 | - | 0 | 1 | 0 | - | - | - | - | - | 2 |
| 0 | 0 | - | 0 | 0 | 1 | - | - | - | - | 1 | - |
| 0 | 0 | - | 0 | 0 | 0 | - | - | - | - | - | 1 |

FIG. 83

| RUNNING ENVIRONMENT | |
|---|---|
| WHEN WARNING INFORMATION OCCUR e.g. HEAT WARNING LAMP REMAINING FUEL WARNING LAMP | VARIOUS SENSORS |
| DURING ROUTE GUIDANCE | ROUTE GUIDANCE SETTING CONDITION OF NAVIGATION SYSTEM |
| WHEN APPROACHING DESTINATION / ROUTE GUIDANCE POINT DURING ROUTE GUIDANCE | POSITION RECOGNITION OF NAVIGATION SYSTEM AND GUIDANCE DATA |
| WHEN DRIVING HIGHWAY | POSITION RECOGNITION FUNCTION OF NAVIGATION SYSTEM |
| WHEN THERE IS CONGESTION / ACCIDENT | TRAFFIC INFORMATION AND NAVIGATION SYSTEM |
| WHEN DRIVING ROAD WHERE DRIVING FREQUENCY IS LOW | POSITION RECOGNITION FUNCTION OF NAVIGATION SYSTEM AND MEMORY FUNCTION OF DRIVING HISTORY |

FIG. 84

| EXAMPLES OF GUIDANCE INFORMATION | CONTENTS OF COMMENT |
|---|---|
| WARNING INFORMATION | EXPLANATION OF WARNING OR GUIDE TO NEAREST FACILITY e.g. WAY OF HANDLING, NAME AND PHONE NUMBER OF AUTOMOBILE DEALER NAME, DISTANCE AND GUIDANCE TO NEAREST GAS STATION |
| ROUTE GUIDANCE INFORMATION | NAME, DISTANCE DIRECTION (RIGHT/LEFT) OF INTERSECTION TO TURN |
| FACILITY GUIDE INFORMATION | NAME, AND LOCATION OF PARKING, HOTEL, RESTAURANT NEARBY |
| HIGHWAY GUIDE INFORMATION | NAME, DISTANCE AND SERVICE (GAS STATION ETC.) OF NEXT SERVICE AREA OR INTERCHANGE |
| TRAFFIC INFORMATION | TRAFFIC INFORMATION OF DRIVING ROAD AND DISTANCE TO REACH DESTINATION |
| CURRENT POSITION INFORMATION | ADDRESS OF CURRENT POSITION, NAME OF DRIVING ROAD, NAME OF AREA THE VEHICLE IS HEADING |

FIG. 85

MANUAL SETTING OF PRIORITY ORDER

PRIORITY ORDER VALUES OF GUIDE INFORMATION OFFER

○ DEFAULT MODE

◎ SELECTION MODE
(PLEASE SET
PRIORITY ORDER)
- WARNING INFORMATION | 4
- ROUTE GUIDE INFORMATION | 2
- FACILITY GUIDE INFORMATION | 6
- HIGHWAY GUIDE INFORMATION | 5
- TRAFFIC INFORMATION | 3
- CURRENT POSITION INFORMATION | 1

THIRTEENTH EMBODIMENT

NAVIGATION APPARATUS

BACKGROUND OF THE INVENTION

The present invention relates to a navigation apparatus for outputting such audio information, and more particularly, to a navigation apparatus which selectively and preferentially outputs data which is truly necessary for a driver when there are a plurality of information to offer.

Along with recent tendency to process computer-related data in multimedia, multimedia has also rapidly found its way to be utilized in automobiles. Types of information handled in automobiles are, for instance, navigation information, VICS (Vehicle Information Control System) information, audio/visual information, radio, information from on-vehicle telephone, information from teletext broadcasting, information received from vehicle systems and the like.

A most serious problem in processing information from multimedia is simultaneous occurrence of an enormous amount of data. More specifically, a driver in an automobile receives a large amount of information e.g. information from VICS, information from multiplexed audio broadcasting and the like, from places where the driver does not take any part in. The obvious characteristic of the multimedia in automobiles is in that, in a case where a driver receives image data by a multimedia system, if the driver is not interested in the image, the driver simply needs to look away from a screen showing that image, so that the driver is not disturbed while driving the automobile.

However, in a case where the driver receives audio information where useful information and useless information are mixed, the driver must concentrate on the audio information to distinguish which information is useful. In addition, it is also difficult for a driver to ignore the information provided audibly. Especially, if unnecessary information is audibly provided while the driver is in an urgent situation, such information provided audibly may affect driver's performance.

Particularly with respect to regulating audio information output, for instance, Japanese Patent Application Laid-Open No. 1-142994, No. 5-203458 and No. 5-332778 disclose controlling of mainly the volume at the time of outputting audio information. However, when volume is controlled, a driver is required to concentrate even harder on the contents of the information because low volume is difficult to hear.

Furthermore, according to Japanese Patent Application Laid-Open No. 2-114117, a driver is able to set in advance a plurality of points where the driver desires to receive audio navigation, so that unnecessary audio guidance can be eliminated.

Moreover, according to Japanese Patent Application Laid-Open No. 4-1898, the length of guidance provided as audio information is controlled in accordance with vehicle speed, to synchronize outputting of the guidance information with passage of neighborhood of a destination point, whereby making it possible for a driver to associate what is seen with the contents of the guidance.

In addition, according to Japanese Patent Application Laid-Open No. 5-118866, a degree of driver's familiarity with respect to each road is determined by accumulating the number of times of driving the road, and in accordance with the degree of familiarity, audio information offering is controlled to be turned on/off. Since a driver does not need to audibly receive information on a familiar road, such unnecessary audio information is not provided.

Furthermore, according to a navigation apparatus disclosed in Japanese Patent Application Laid-Open No. 6-68385, two types of audio information, i.e., the first type of audio information outputted upon request of a driver and the second type of audio information provided automatically, are set. When the first type of audio information is to be outputted while the second type of audio information is being outputted, the second type of audio information is provided instead of the first type of audio information, or vice versa.

In the case of the aforementioned Japanese Patent Application Laid-Open No. 2-114117, if a large amount of multimedia data occur at the point where a driver desires audio navigation, all the information is provided to the driver and unnecessary information cannot be eliminated.

Even if the length of guidance provided as audio information is controlled in accordance with vehicle speed as disclosed in the aforementioned Japanese Patent Application Laid-Open No. 4-1898, in a case where a large amount of information occur simultaneously, a driver may receive information regarding the destination after the driver has already passed the destination.

Moreover, in the case of Japanese Patent Application Laid-Open No. 5-118866, if a large amount of plural audio information occur simultaneously while a driver is driving on an unfamiliar road, the driver may receive truly necessary information after receiving unnecessary information.

In other words, all the above-described conventional techniques are not capable of handling a case where there are plural information occurred simultaneously to be provided to a driver. Since these conventional techniques did not expect the arrival of the multimedia era in automobiles, drivers have to bear with useful and useless information mixed together.

Still further, in the navigation apparatus according to the aforementioned Japanese Patent Application Laid-Open No. 8-254437, either one of the two types of audio information (the aforementioned first type and second type of audio information) is always outputted whenever there is information to be provided. Thus, when both types of audio information occur, one of the types of audio information is outputted which may be useless to a driver at the time of output.

SUMMARY OF THE INVENTION

The present invention has been made in consideration of the above situation, and has as its object to provide a navigation apparatus which adequately provides a driver with necessary information without providing an excessive amount of information.

Another object of the present invention is to provide a navigation apparatus where a driver is always informed of any important information.

In order to attain the above objects, the present invention provides a navigation apparatus for providing different types of information to a driver, comprising: means for allocating a priority order to inputted information in accordance with a type of the inputted information; means for selecting a type of information having a high priority order in accordance with the allocated priority order in a case where there are a plurality of types of information; and means for providing the driver with the selected information in the selected order.

The navigation apparatus having the aforementioned configuration comprises means for selecting information having a high priority order in accordance with predetermined priority orders (e.g. PR or RK which will be described later with reference to FIG. 6) when there are a plurality of information to be provided, and means for providing a driver with the selected information in the selected order.

According to the navigation apparatus as the preferred embodiment of the present invention, the priority order is set in a unit of each medium which conveys information.

According to the navigation apparatus as the preferred embodiment of the present invention, the driver is allowed to change the priority order.

According to the navigation apparatus as the preferred embodiment of the present invention, the priority order is prescribed in accordance with a running state of a vehicle.

According to the navigation apparatus as the preferred embodiment of the present invention, the priority order is changed in accordance with change in the running state of a vehicle. Accordingly, the navigation apparatus can adequately provide necessary information without excessively providing information.

According to the navigation apparatus as the preferred embodiment of the present invention, the priority order is prescribed in accordance with the type of information.

According to the navigation apparatus as the preferred embodiment of the present invention, the priority order is prescribed in accordance with a quality of information.

According to the navigation apparatus as the preferred embodiment of the present invention, in a case where information, having the same information as information of the already inputted information, is inputted, the priority order of the inputted information is set low.

According to the navigation apparatus as the preferred embodiment of the present invention, a low priority order is given to information received in low reception sensitivity.

According to the navigation apparatus as the preferred embodiment of the present invention, the priority order is prescribed in accordance with running environment of a vehicle.

According to the navigation apparatus as the preferred embodiment of the present invention, the priority order is changed in accordance with change in running environment of a vehicle.

According to the navigation apparatus as the preferred embodiment of the present invention, the priority order is prescribed in accordance with a driving purpose.

According to the navigation apparatus as the preferred embodiment of the present invention, the information is audio information.

According to the navigation apparatus as the preferred embodiment of the present invention, the aforementioned information is information inputted from an arbitrary medium in chronological order.

The navigation apparatus, as the preferred embodiment of the present invention, further comprises means for storing a plurality of information to be outputted, wherein the selecting means selects information, which is to be outputted in accordance with the priority order, from the plurality of information stored in the storing means.

Still further, in order to attain the above objects, provided is a navigation apparatus for providing different types of information, comprising:

means for allocating, to inputted information, a rank indicating a type of the inputted information, and a priority order indicating a priority degree of the inputted information; and means for providing one or more information allocated with a predetermined rank value, in accordance with values of priority order allocated to said one or more information.

Furthermore, the navigation apparatus for sequentially providing different types of information inputted successively, comprises: means for allocating a rank to inputted information in accordance with a type of the inputted information; and means for successively providing one or more information having a predetermined rank value.

The navigation apparatus having the foregoing configuration is characterized by comprising: means for allocating a priority order (e.g. PR in FIG. 6) and a rank (e.g. RK in FIG. 6) to inputted information in accordance with a type of the inputted information; and means for providing one or more information having a predetermined rank value in the order of high priority.

According to the navigation apparatus as the preferred embodiment of the present invention, the information to be provided is audio information.

According to the navigation apparatus as the preferred embodiment of the present invention, the value of the rank can be changed.

Still further, the navigation apparatus according to the present invention for sequentially providing different types of information inputted successively, comprises: means for allocating a rank to inputted information in accordance with a type of the inputted information; and means for successively providing one or more information having a predetermined rank value.

Moreover, the navigation apparatus according to the present invention for sequentially providing different types of information inputted successively, comprises: means (e.g. FIG. 21 to be described later) for restraining the number of information to be successively provided, to less than a predetermined number.

According to the navigation apparatus as the preferred embodiment of the present invention, the number of information to be successively provided can be changed (e.g. FIG. 21 to be described later).

According to the navigation apparatus as the preferred embodiment of the present invention, the predetermined number is changed in accordance with at least one of running state, driving purpose and running environment.

According to the navigation apparatus as the preferred embodiment of the present invention, the rank allocated to information is changed in accordance with at least one of running state, driving purpose and running environment.

According to still further aspect of the navigation apparatus, said providing means provides one or more information which are allocated with one of a plurality of ranks which have a different rank value from each other, in accordance with values of priority order allocated to said one or more information.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a table showing various types of media connected to the navigation system shown in FIGS. 2 and 3A;

FIG. 5 is a table showing names of maps used by the navigation system of the present embodiment and items referred by each of the maps;

FIG. 6 is a table for managing attribute data (priority orders, rank, memory capacity and the like) allocated to each of the various data that are used in the navigation system of the present embodiment;

FIGS. 7 and 8 are an explanatory view showing the way the memory area is divided for storing data in the navigation system;

FIG. 9 is a table showing an input data queue table used in the navigation system of the present embodiments;

FIG. 11 is a table showing a setting table where urgent levels LVL of output timing is set, which is used in the navigation system according to the first embodiment;

FIG. 12 is a table for explaining the state of control operation in accordance with values of the urgent level LVL;

FIG. 13 is a table showing the lower limit value of priority for information offer (RKLMT), varied in accordance with different running state;

FIG. 15 is a flowchart showing a "map correction" routine in control steps of the navigation system according to the first embodiment;

FIG. 16 is a flowchart showing a "map selection" routine in control steps of the navigation system according to the first embodiment;

FIG. 21 is a table where variables "limitation LMT in number of times" are defined, which are used in controlling of the navigation system according to the first embodiment;

FIG. 22 is a flowchart showing a "obtaining number of times" routine in control steps of the navigation system according to the first embodiment;

FIG. 23 is a flowchart showing a "delete" routine in control steps of the navigation system according to the first embodiment;

FIG. 29 is a table where relation between a running environment and action classification is defined, which is used in the navigation system according to the second embodiment;

FIG. 30 is a table showing different operation in accordance with a value CL of the running environment-action classification utilized in the navigation system according to the second embodiment;

FIG. 31 is a flowchart showing a "processing corresponding to priority" routine in control steps of the navigation system according to the second embodiment;

FIG. 35 shows a classification table used in the navigation system according to the third embodiment;

FIG. 36 is a table describing operation of the navigation system according to the third embodiment;

FIG. 46 is a flowchart showing a "obtaining number of times" routine in control steps of the navigation system according to the third embodiment;

FIG. 47 is a flowchart describing operation of "processing exceptional information" in FIG. 32;

FIGS. 48 and 49 show a CL table used in controlling operation of the third modified example (modification of the third embodiment);

FIG. 50 is a table used in controlling operation of the fourth modified example (modification of the third embodiment);

FIG. 53 is a table used in controlling of the navigation system according to the fourth embodiment;

FIG. 54 is a partial flowchart of control steps in navigation system according to the fifth modified example (modification of the fourth embodiment);

FIG. 55 is a table used in the navigation system according to the fifth embodiment;

FIG. 56 is a table used in the navigation system according to the fifth embodiment;

FIG. 57 is a table used in the navigation system according to the fifth modified example (modification of the fifth embodiment);

FIG. 61 is a table used in control steps of the navigation system according to the seventh embodiment;

FIG. 67 is a table used in the controlling operation of the first modified example (modification of the first embodiment);

FIG. 68 is a flowchart showing a part of control steps of the first modified example (modification of the first embodiment);

FIG. 69 is a table used in controlling operation of the second modified example (modification of the second embodiment);

FIG. 76 is a table used in controlling operation of the navigation system according to the tenth embodiment;

FIG. 79 is a table used in controlling operation of the navigation system according to the eleventh embodiment;

FIG. 80 is a table used in controlling operation of the navigation system according to the eleventh embodiment;

FIG. 81 is a table showing controlling operation of the navigation system according to the eleventh embodiment;

FIG. 82 is a table showing controlling operation of the navigation system according to the twelfth embodiment;

FIG. 83 is a table used in the controlling operation of the navigation system according to the twelfth embodiment;

FIG. 84 is a table used in the controlling operation of the navigation system according to the twelfth embodiment;

FIG. 85 is an explanatory view showing a user interface used in the navigation system according to the twelfth embodiment;

DETAILED DESCRIPTION OF THE INVENTION

Preferred embodiments of the present invention will be described in detail in accordance with the accompanying drawings. As will be apparent from the following descriptions, the present invention is applicable not only to automobiles, but also to other movable bodies e.g. airplanes and ships.

System Construction

System construction commonly used in the navigation system of all the following embodiments (and modification thereof) according to the present invention will be described with reference to FIGS. 1 to 3A.

Figure 1:
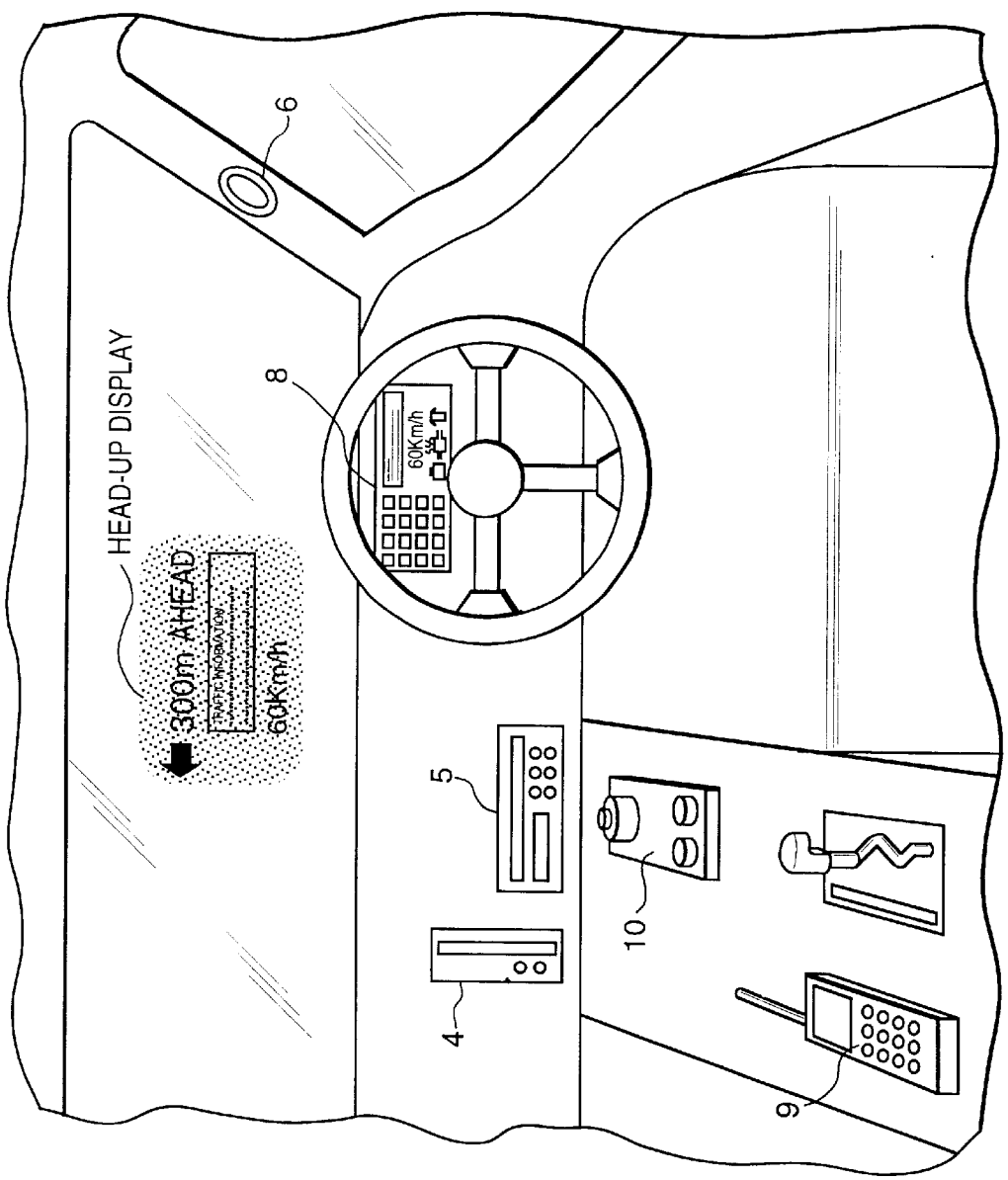
FIG. 1 is an interior view of a vehicle showing the main part of a multimedia-type navigation system adopting the present invention.
Figure 2:
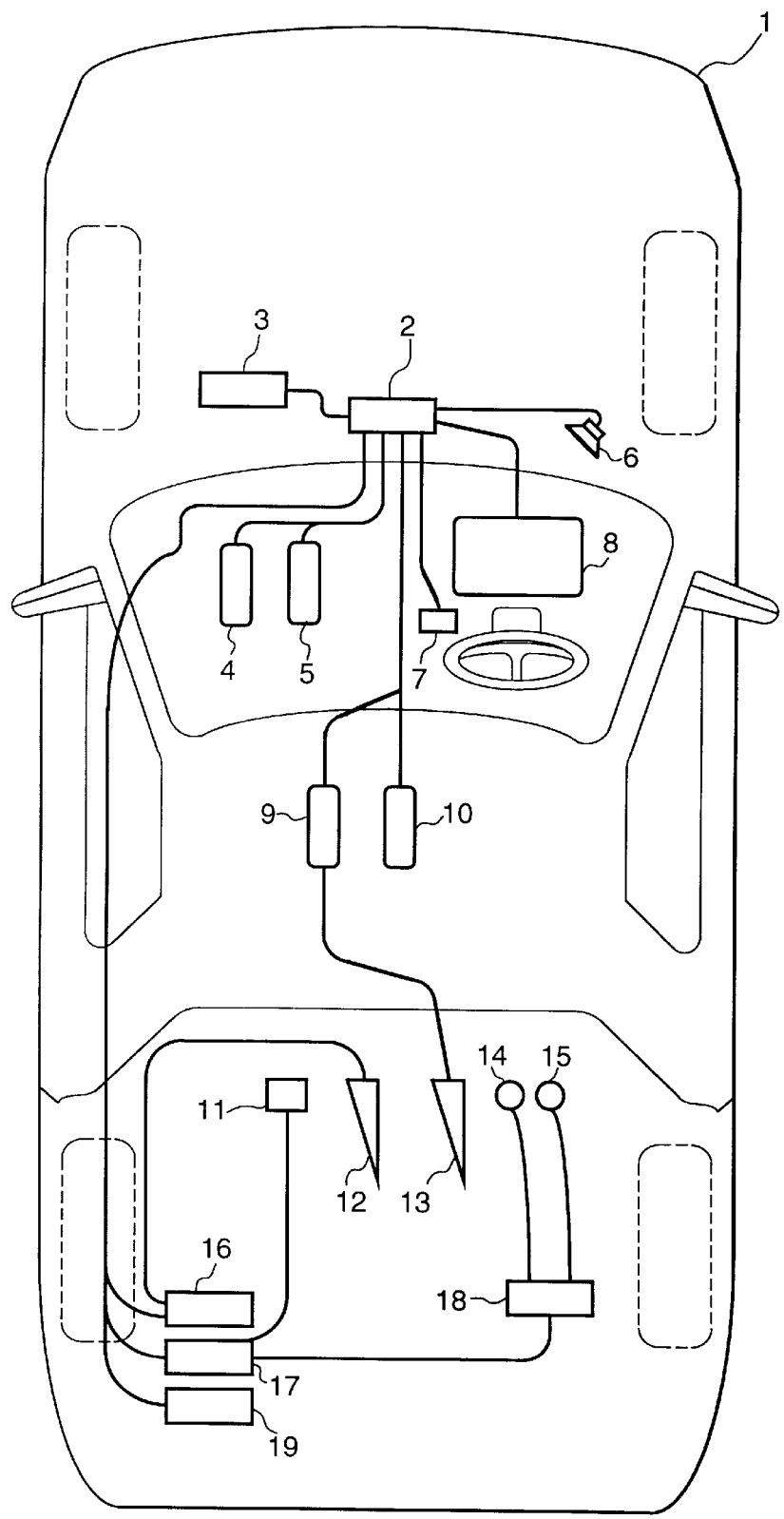
FIG. 2 is a wiring view of a vehicle showing the way the navigation system shown in FIG. 1 is connected.
Figure 3A:
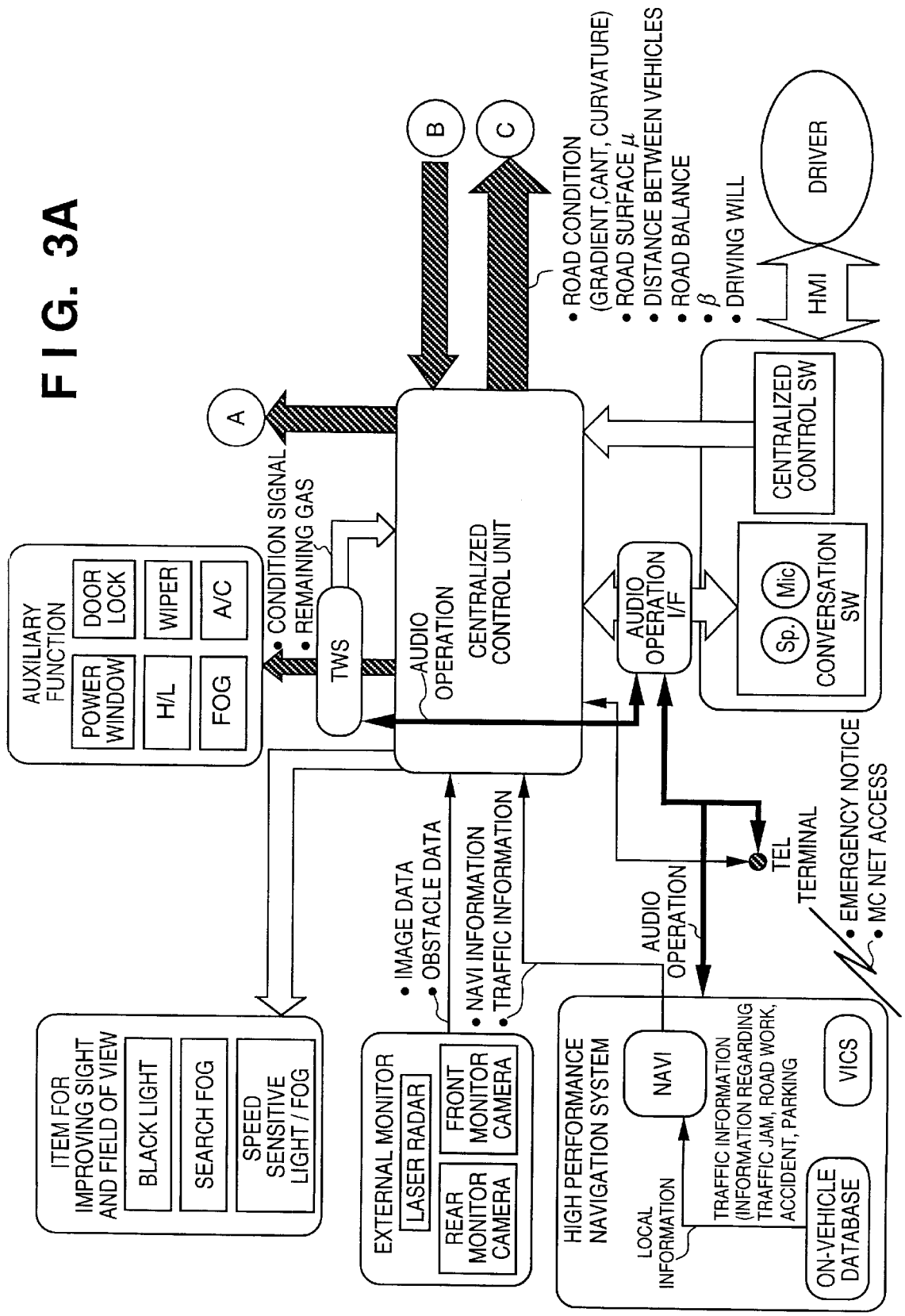
FIG. 3A is a block diagram showing the way the navigation system shown in FIGS. 1 and 2 is connected.
Figure 3A:
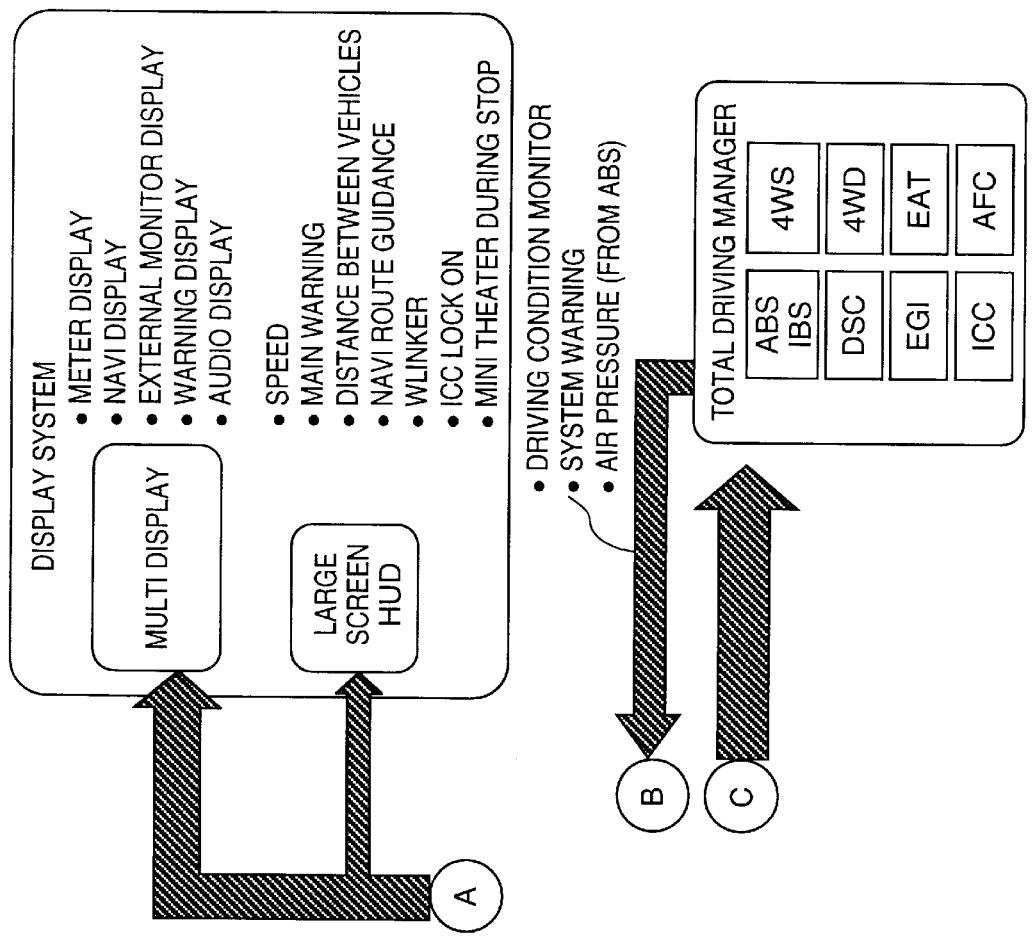

FIG. 1 is a front view seen from a driver's seat in an automobile adopting the navigation apparatus of the present embodiment. FIGS. 2 and 3A show the system structure indicative of a state where the navigation apparatus of the present embodiment is installed in an automobile.

Referring to FIG. 2, reference numeral 2 denotes a centralized control unit which calculates various data (remaining fuel, mean fuel consumption, mean running speed and so on) related to running state of a vehicle and integrally controls each of the components described below. Reference numeral 3 denotes a LAN unit provided in the vehicle for controlling, e.g. an anti-lock brake system (ABS), sensors (not shown) necessary to control four-wheel drive operation and the like, and so-called local area network communication between a driving unit and the centralized control unit 2. Reference numeral 4 denotes a RAM card drive which is a device for reading/writing information from/to a RAM card which stores information related to a driver e.g. seat position, mirror position and the like. Reference numeral 5 denotes a data storage drive which is a device for reading/writing various data stored in a data storing medium such as an FD (floppy disk), MD (magneto optical disk), PD (phase-transition-type optical disk) and the like. Reference numeral 6 denotes an audio guidance speaker which outputs audio information from a navigation controller 17 via an audio output interface included in the centralized control unit 2. Reference numeral 7 denotes a microphone into which voice instruction of an operator is inputted and further transmitted to the navigation controller 17 via a voice recognition interface (not shown) included in the centralized control unit 2. Reference numeral 8 denotes a display such as a liquid crystal display and the like where a navigation screen, a screen for various input operation and conditions (running speed, air conditioning and the like) of the vehicle are displayed. In the front surface of the display 8, an input apparatus adopting a capacitance coupling method or method utilizing infrared rays is incorporated to enable input operation by touching the display panel. Reference numeral 9 denotes a portable telephone to which a telephone antenna 13 is connected. Reference numeral 10 denotes an operation switch which is used to perform input operation to the centralized control unit 2 and navigation controller 17. The reference numeral 17 denotes the navigation controller which searches for an appropriate route to reach a destination designated by an operator using the operation switch 10 on the basis of position information obtained by a GPS (Global Positioning System) antenna 11 and map information stored in a CD-ROM inserted in a CD-ROM changer 19. Based on the searched information, guidance is provided by displaying the information on the display 8 or outputting audio information from the audio guidance speaker 6. The map information of CD-ROM read by the CD-ROM changer 19 is the basic data of route information which is displayed on the display 8.

As shown in FIG. 2, to the navigation controller 17, an FM tuner 16 which receives FM multiplex broadcasting compatible with VICS (Vehicle Information Communication System), and a beacon receiver 18 which receives a beacon signal from an electric wave beacon antenna 14 and an optical beacon antenna 15, are connected. VICS signals and/or beacon signals obtained by the above devices are interpreted as traffic control information and displayed on the display 8, then used as a condition (restricted condition) of route search at the time of route guidance. In addition, area information related to the area where the vehicle is running may be input from the data storage drive 5 to be used as display data. Since the technique of detecting the position of a vehicle by GPS is well known, description thereof will be omitted.

The navigation system described below restricts or prohibits to output information (particularly, audio information) which is not necessary by a driver or which is massive to be provided to the driver. When there are a plurality of audio information occurred simultaneously to be offered to the driver, it is necessary to select single audio information, i.e. specific information, from the plurality of audio information since only single audio information can be provided at once to a driver. According to the navigation system of the present embodiment, the single audio information is selected on the basis of "importance" of the information which is determined based upon an association between a priority order of the information itself and a running condition (running state, running environment, driving time zone, driving purpose and the like) which is independent from the information. Furthermore, when the foregoing conflicts occur, some data are deleted under a. predetermined condition. With respect to such data, a message indicating that the data will be deleted is displayed on a display; alternatively, the audio information subjected to deletion is, instead of being outputted audively, converted to text data and displayed on a head-up display shown in FIG. 1.

User Interface

Figure 3B:
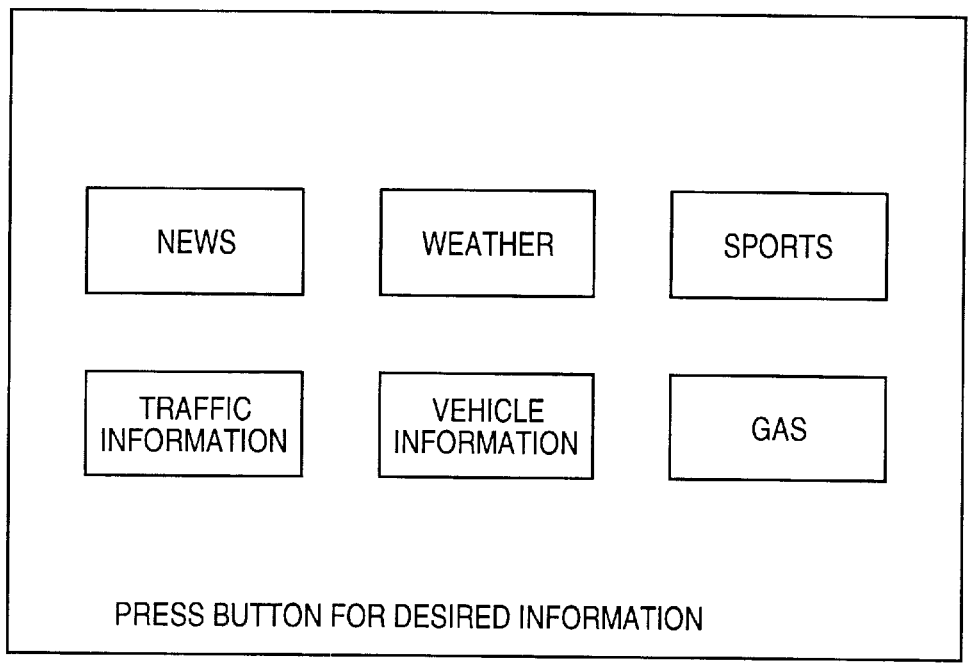
FIGS. 3B and 3C show an interface used in the present embodiments.

The display 8 in the present system includes a touch panel. FIG. 3B shows switches used for requesting a type of information by using the touch panel. As shown in FIG. 3B, a driver can access to the information in six different genre, e.g. "news," "weather," "sports," "traffic information," "vehicle information," "gasoline (GAS)" and the like. FIG. 3B shows the function buttons (switches on the touch panel) for accessing to these information. Upon pressing any of the switches, information corresponding to the pressed switch is provided to the driver.

The information genre switches (FIG. 3B) are also used to display genre necessary in the current running condition. For instance, "GAS" menu is displayed when the centralized control unit 2 receives vehicle information indicating that the amount of remaining gasoline is small. Such displaying is performed not because a driver has requested, but because the system has made a determination on the basis of various data. As another example with reference to FIG. 3B, "weather" menu is displayed when wipers start running because the system determines that rain has started.

Figure 3C:
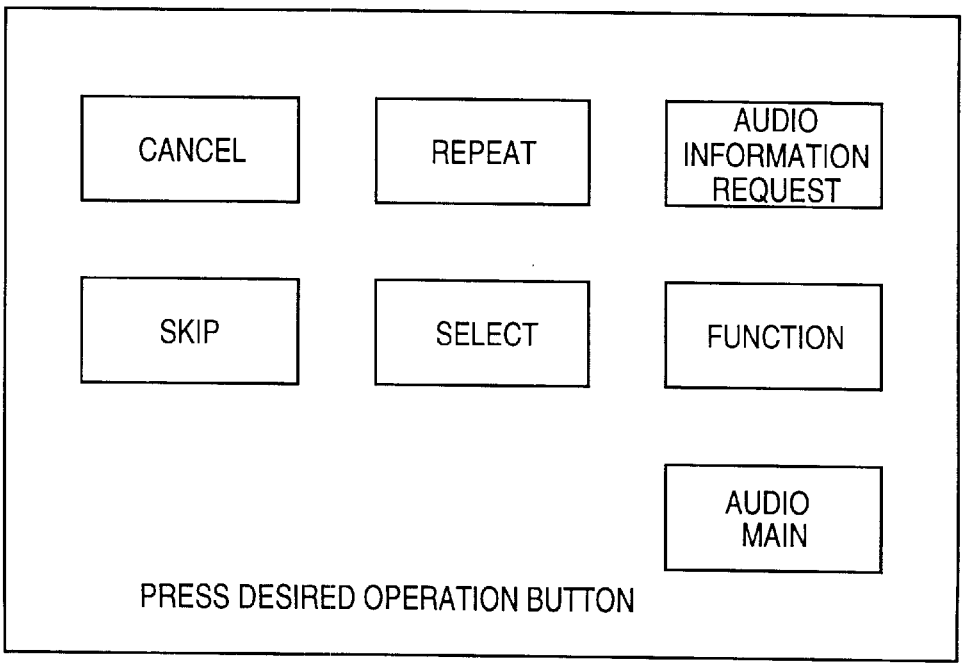

FIG. 3C shows switches used to request various functions provided in the present system.

The switch "cancel" cancels access to selected information. The switch "repeat" replays current-receiving information (stored in data storage drive 5), starting from the initial item of the information. The switch "audio main" is used to select whether or not to receive guidance information as audio information.

The switch "audio information-request" is unique to the present system. When the switch is depressed, various multimedia information in the present navigation system are provided in a predetermined order.

The switch "skip" skips an item or a genre and goes to the next.

The switch "select" selects and decide information genre.

The switch "function" stores a predetermined item, so that information regarding the predetermined item is directly provided to the driver.

Types of Media and Information

The information subjected to be handled by the present navigation system shown in FIGS. 1–3A is provided by media such as, NAVI, VICS (Vehicle Information Control System), audio equipment, radio, on-vehicle telephone, teletext broadcasting, vehicle system and the like. As shown in FIG. 4, information handled in these media includes: vehicle information, NAVI information, VICS information, information from audio equipment, information from on-vehicle telephone, information from teletext broadcasting and so on. Specific examples of the information are shown in FIG. 4.

Regulating Information Offer

In Accordance with Priority Order and Running Condition

The navigation system according to the present embodiment utilizes aforementioned vehicle information, NAVI information, VICS information, information from audio equipment, information from on-vehicle telephone, teletext broadcasting information and so on, as necessary information for navigating operation. However, in the multimedia navigation system, there may be a plurality of information to be provided simultaneously. When a large amount of information are provided simultaneously to a driver, the driver may feel uncomfortable, and in addition, providing too much information may confuse the driver. Particularly, in case of audio information, these problems are apparent.

Accordingly, the navigation system according to the present embodiments assign a priority order to information if there are a plurality of information to be provided simultaneously. Alternatively, the navigation system regulates information offering performed by a medium which is considered unnecessary under a predetermined condition. By virtue of the above, the present invention provides a driver with only necessary information.

FIG. 5 shows examples of maps from which a driver can select, used in the following embodiments.

In general, running conditions (e.g. speed, distance between vehicles, auto cruise state and the like) vary momentarily. In the first embodiment, the mode of information regulation is changed in accordance with the running conditions. Note that information in the multimedia navigation system includes various types, such as urgent information (e.g. accident information) which should not be regulated because of its high urgency characteristic, and non-urgent information such as titles of music programs or the like. The mode of regulating information offer should be determined in accordance with the running condition at which the information is to be provided. Therefore, in the present embodiment, the mode at which information is regulated is changed in accordance with the change in running conditions. Since running conditions vary depending on the driver or roads on which the driver is driving, the running conditions in the present embodiment are classified into seven types as shown in FIG. 5: "vehicle state," "running state," "running environment," "driving purpose," "time zone," "driver's condition" and "information precision." In other words, running conditions are classified into seven types, and maps are set to prescribe modes of information regulation in dependence upon each running condition. Meanwhile, reference items such as those shown in FIG. 5 are displayed to a driver (on the display 8) so that the driver is fully informed of how information offer is regulated upon selection of each map.

Selecting a map is performed by the control steps which will be described later with reference to FIG. 16.

Definition of Data, Table Etc.

FIG. 6 is a table which defines types of information generated in the system according to the first to twelve embodiments and various attributes predeterminedly given to each type of information. As the types of information, the followings are set: "urgent information," "vehicle information," "VICS information," "traffic information," "NAVI information," "weather information," "news," "sports information," "event information" and "music title." The table in FIG. 6 shows definitions in "types KND," "priority order PRD," "priority rank (default value) RKD," "priority rank (corrected) RKC," "capacity (default value) CAPD," "capacity (changed value) CAPC," "remaining capacity REM" and "pointer" with respect to each of the various information.

"Priority order PRD," "priority rank (default value) RKD," "priority rank (corrected) RKC," "capacity (default value) CAPD," "capacity (changed value) CAPC," "remaining capacity REM" are added to the information inputted from each medium, and the information is stored in a predetermined memory.

More specifically, an identifier KND indicative of the type of the information is added to each data. For instance, KND=3 is VICS data. Moreover, the "priority order PRD" is set in advance for each data. The value of "priority order PRD" indicates priority at the time of offering the data. For instance, an identifier KND=3 is assigned to data inputted from VICS medium, and the value of the priority order PR is 3. Lower number indicates higher priority. KND=1 indicative of the highest priority is given to "urgent information" such as data informing that a vehicle is on fire or accident in a tunnel or the like. The "priority order PRD" shown in FIG. 6 indicates default values which can be changed by an operator performing predetermined operation. The priority order PRC changed by an operator is stored in PRC in the table in FIG. 6.

The "priority rank RKD" indicates ranks (default value) of the priority order. In FIG. 6, "A," "B," ... "E" are set as example of rank values. "Rank" is used to measure the priority. In the examples shown in FIG. 6, rank value=C is assigned to "VICS information" (PRD=3), "traffic information" (PRD=4) and "NAVI information" (PRD=5). These rank values will be described with reference to the control steps.

"Capacity CAPD" denotes the capacity (default value) of a memory area allocated to the type of information. FIG. 7 shows setting of memory area. Although limitation in a memory capacity should be set in data depending on the type of information, urgent information should not be limited because it is important. Therefore, as shown in FIG. 7, in a case where urgent information exceeds a given capacity, it can be saved in the "free area" (area 7 having 4 MB in FIG. 7).

Figure 8:
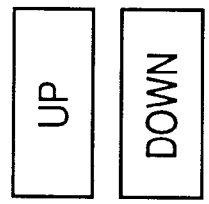

The capacity CAPD set for each type of information can be changed as described below. FIG. 8 shows the screen for changing the setting of memory areas. Changed capacity values are stored in CAPC in the table shown in FIG. 6.

In the "remaining capacity REM" in FIG. 6, a remaining capacity in a memory area which is left to store corresponding type of information, is stored. If information, whose volume exceeds the remaining capacity, is to be input, the information will not be converted to text data (if conversion is possible) except at which the information is urgent.

When there is inputted information, "pointer PTR" shows the position in the memory at which the information is to be stored.

FIG. 9 shows a list of input information and data to be outputted which construct a queue table. More specifically, the table shows the list of stored information which has been inputted by a certain time t3. FIG. 9 indicates that data=X indicative of vehicle information (KND=2) is inputted at time t1; data=Y indicative of traffic information (KND=4) is inputted at time t2; and data=Z indicative of urgent information (KND=1) is inputted at time t3. When next data is inputted, the data is stored in a position in the table indicated by the pointer r.

"Input queue IQ" in FIG. 9 is a flag indicating that there is inputted information waiting to be processed. When the flag "currently being outputted OUTP" is 1, the information is currently outputted, i.e. provided to a driver. When the flag "output queue OUTQ" is 1, the corresponding information subjected to output is queued (not yet outputted).

First Embodiment

Regulating Information Offer in Accordance with Running State

Regulating information offer in accordance with the running state is now described with reference to FIGS. 4–23.

Figure 10:
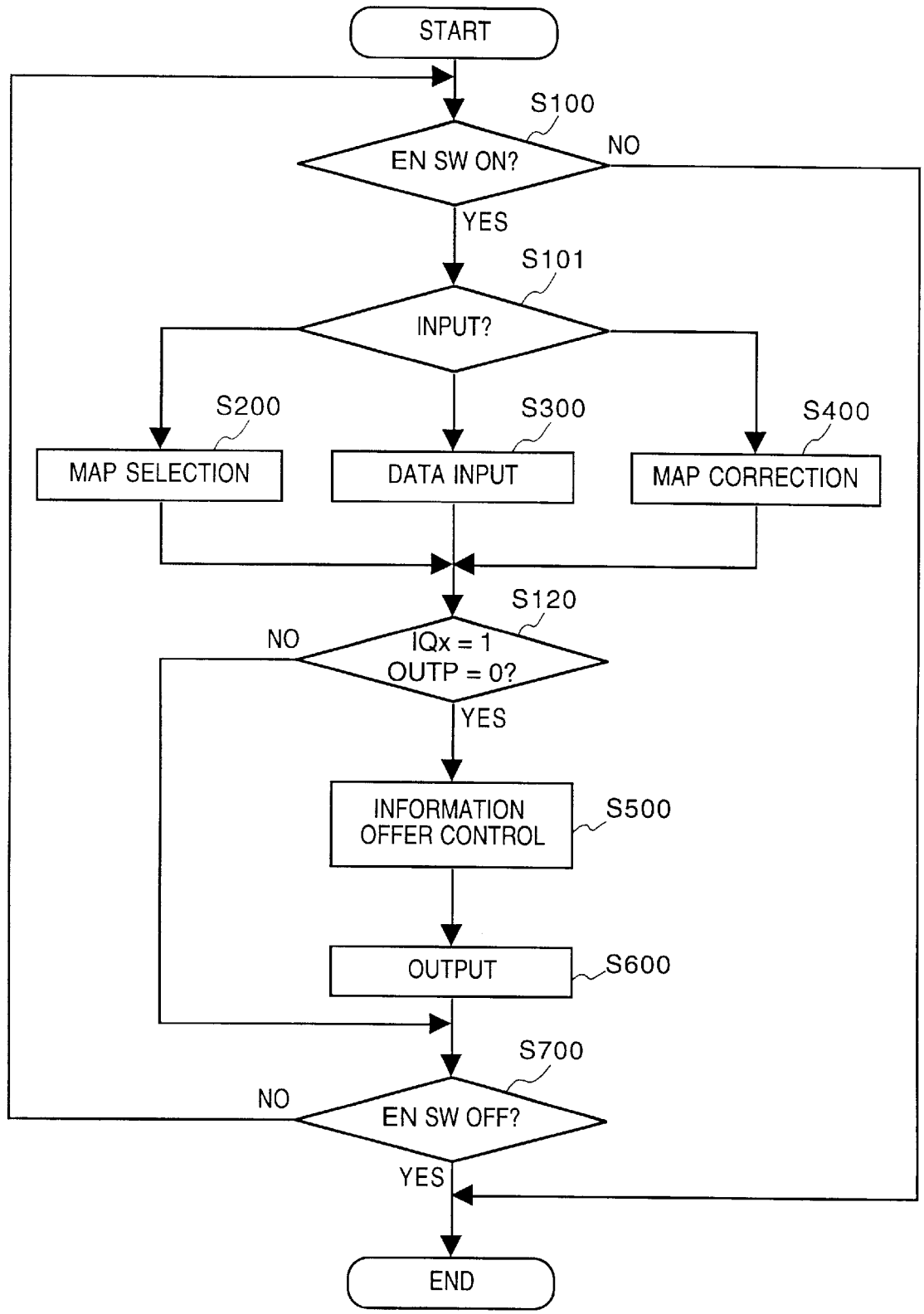
FIG. 10 is a flowchart describing a main routine in control steps of the navigation system according to the first embodiment.

FIG. 10 shows a main routine of control steps in the navigation system according to the first embodiment. Turning on/off of an enable switch (EN-SW) (not shown) in the navigation system regulates turning ON (step S100)/OFF (step S700) of respective operation. In other words, the main routine (steps S101 to S600) is executed as long as the EN-SW switch is on.

Step S101 is a routine of inputting various information. More specifically, executed routines in step S101 are: information input from various multimedia (step S300, FIG. 14), input routine of a driver for inputting information to select a map (step S200, FIG. 16), and input routine of inputting information to correct or change information in the selected map (step S400, FIG. 15).

In step S120, input information table (FIG. 9) is scanned to search for information (information to be processed as audio information) in which the flag of input queue IQ is "1." When such information is found, the processing proceeds to step S500 where control operation is performed to provide/not provide the information. Step S500 is described in detail in FIG. 18.

Characteristics of control operation performed by the first embodiment are shown in the tables in FIGS. 11 and 13.

The table in FIG. 13, showing lower limit values of priority, is referred when there is information to be provided as audio information, and defines the relationship between the running state STAT of a vehicle at the time of providing information and the lower limit value RKLMT which regulates the priority rank RKC of the information.

For instance, it is assumed herein that input information (X, Y, Z) as shown in FIG. 9 is stored in a memory to be provided as audio information. When the current vehicle is in the state of abrupt break, the lower limit value RKLMT is A. Therefore, information having the priority higher than rank value A is recognized as the information to be provided to a driver. Thus, the data X and Y whose rank values are B and C respectively are not provided to the driver as audio information.

Meanwhile, when a vehicle is in the state of backing up, the lower limit value RKLMT is C. Therefore, information having the priority higher than rank value C is recognized as the information to be provided to a driver. Thus, all the information X, Y and Z (all data in FIG. 9) whose rank values are respectively A, B and C are provided to the driver as audio information.

As described above, according to the first embodiment, when there are a plurality of information to be provided as audio information to a driver, information to be provided is selected in accordance with the value of the priority RKLMT (degree of priority order) determined in accordance with running states (e.g. the seven conditions specified as STAT in FIG. 13).

When regulating in formation offer in accordance with the priority lower limit RKLMT (degree of priority order), if there are a plurality of information having a higher rank than the priority lower limit RKLMT, priority order cannot be given to these information. Therefore in the first embodiment, for the purpose to assign absolute priority orders to a plurality of information where priority orders cannot be determined by the priority lower limit RKLMT, univocal sequential relationship is given to information offering in accordance with priority order PRC which is allocated univocally to the information type KND.

By regulating information offer in accordance with the priority lower limit RKLMT, information which does not need to be considered depending on running state can be removed from control objects; thus, it is possible to efficiently and accurately regulate information offer according to the priority order PRC (or PRD).

Next, information input control and controlling of information offer performed by the first embodiment will be described with reference to FIGS. 10 to 28.

When information is inputted, it is determined in step S101 in FIG. 10 if the input is performed by multimedia, or by a driver for the purpose of selecting a map, or by a driver for the purpose of correcting the information on a map.

Selecting an input item is realized by operating the operation switch 10 to select an icon switch displayed on the display 8. Since the controlling of such icons is well known, description thereof will not be provided.

When a driver inputs a selection (selection on a map selection menu) to select a map, in step S204 in FIG. 16, items of a selectable map are displayed on the display 8, for instance, as shown in FIG. 5. The driver (user) selects a desired map by operating the operation switch 10 on the display screen of the display 8. The system inputs in step S206, an identifier ID of the map designated by the user and displays the selected map in step S208. If the user selects ID=2 indicative of "running state," a table defining lower limit of priority for each running state, such as that shown in FIG. 13, is displayed.

When a user selects map correction in step S101 in FIG. 10, the processes following steps S400 in FIG. 15 are executed. That is, in step S402, a map corresponding to a value stored in a register ID is displayed on the display 8. In step S404, a correction value for correcting map information, inputted by the user, is inputted. For instance, referring to the map in FIG. 13, the user can change the lower limit value RKLMT of the running state "back up" from the current value "C" to "B". In step S406, integirity is checked between the corrected data and the current data. For instance, in a case where a user changes the lower limit value RKLMT of the running state "back up" from the current value "C" to "E" in the map shown in FIG. 13, if there is no "E" for the lower limit value RKLMT of "back up," it is determined as an error. In step S408, the map is updated with the corrected information.

Figure 14:
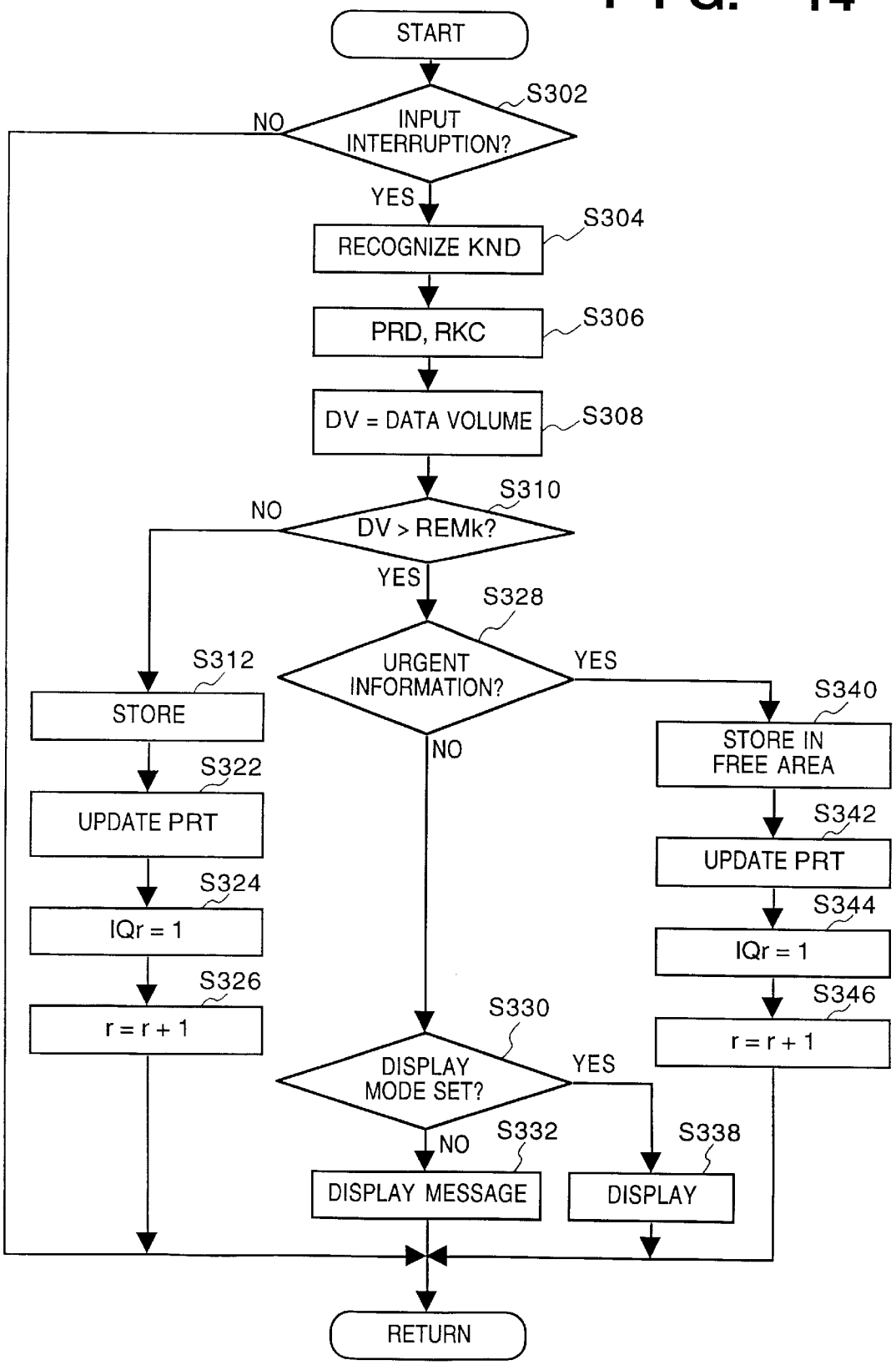
FIG. 14 is a flowchart describing a "data input interruption" routine in control steps of the navigation system according to the first embodiment.

In a case where the system detects that data is inputted by multimedia in step S101, the processes following step S302 in FIG. 14 are executed. That is, in step S304, the type of input information KND is recognized. In the present embodiment, ten types of information e.g. "urgent information" or the like, are set as described above. The centralized control unit 2 allocates the type KND to the information sent by an information source in accordance with the source. Depending on the information, information may sometimes include an identifier which indicates the type of information defined in advance in a particular field of the information. For such information, the type of information indicated by the information is allocated. In step S306, information related to the type of information KND, for instance, "priority order PRD" and "priority rank RKC," is stored in the information input table in FIG. 9 by referring to the table shown in FIG. 6. In step S308, the volume of inputted information DV is obtained. In step S310, the information volume DV and the remaining capacity REMKND in a storage area allocated for the type of information are compared to determine whether or not there is room to store the information.

If DV≦REMKND (NO in step S310 in FIG. 14) is satisfied, information can be stored in the memory; thus the information is stored in the predetermined area of the information storage drive 5. In step S322, a pointer PTR is updated to indicate next memory area in the information storage drive 5. Then in step S324, an input queue flag IQ (referred by the pointer r in the table in FIG. 9) corresponding to the subject information in the information table (FIG. 9) is set at "1" to indicate that information has been input, whereby requesting processing of the subject information. In step S326, the pointer r is updated.

If DV>REMKND is satisfied, there is not enough capacity left in the storage area to store the information. Therefore, in step S328, it is determined whether or not the subject information is urgent information on the basis of the information type KND. If it is urgent information, the information is saved in a free area (FIG. 7) in step S340. In step S342, a pointer PTR indicative of the storage area for the subject information (urgent information) is updated so that the pointer indicates the next storing position. Then in step S344, the input queue flag IQ (referred by the pointer r in the table in FIG. 9) corresponding to the subject information in the information table (FIG. 9) is set at "1" to indicate that data has been input, whereby requesting processing of the subject information. In step S346, the pointer r is updated.

Note that in order to save the storage area, unnecessary data may be periodically deleted. The unnecessary data is, for instance, data which has been stored for a predetermined period of time, traffic information with regard to a point already passed, title of songs while a driver is not listening to radio and the like.

Figure 25:
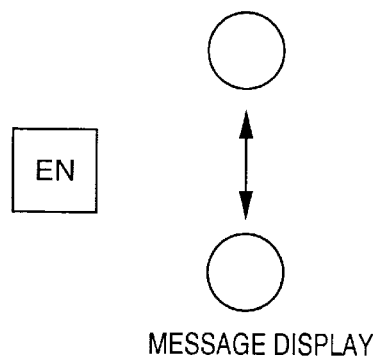
FIG. 25 is an explanatory view showing configuration of a switch which instructs two options when audio information is not audibly outputted, utilized in the navigation system according to the first embodiment.

In a case where non-urgent information is input but there is not enough capacity left in the storage area to store the data (NO in step S328), it is determined in step S330 whether or not a display mode is set. The display mode switch corresponds to a switch of the identifier ID=8 (FIG. 5). As shown in FIG. 25, a driver can specify whether to receive the information subjected to regulation as text data displayed on a display apparatus (head-up display in FIG. 1) instead of as audio information, or to receive a message on a display indicating that the audio information is regulated. Deepression of the EN switch shown in FIG. 25 notifies the system that the user desires a substitute display in case where audio information is to be regulated. Selection of "convert and display" will convert the audio information to text data to output. When "message display" is selected, a message indicating that the audio information has been regulated, is displayed on the display. If "convert and display" mode is set, the subject audio information is converted to text data and displayed on the head-up display in step S338. Herein, the data is displayed not on the display 8, but on the head-up display because the "display mode" is selected. When the "display mode" is selected, the system determines that a driver prefers to be informed of any trivial information. For this reason, the information is displayed on the head-up display in order to attract driver's attention.

If the "message display" mode is set, a message indicating that there is data which will not be stored, is displayed on the display 8 in step S332 in FIG. 14. The message is not displayed on the head-up display because "display mode" is not selected. When the "display mode" is not selected, the system determines that the driver does not wish to be disturbed by information displayed.

As set forth above, in the system according to the present embodiment, the data storage drive 5 is not occupied by particular information which occurs frequently despite its importance, because the storage area is set in accordance with types of media, thus types of information. In addition, by allowing a user to designate a storage area, a larger storage area can be allocated to information which is important to the user. Therefore, it is possible to prevent important information from not being stored. Furthermore, on account of the special storage area (free area) allocated to urgent information, urgent information can be received any time.

As described above with reference to the flowchart in FIG. 14, when data is input, the input queue flag IQ "1" requesting to process the information, is set in the data. In step S120 in FIG. 10, the set state of the flag (IQx) of data x stored in the data storage drive 5 is checked. In other words, in step S120, whether or not IQx=0 is satisfied with respect to all data is determined. If OUTPx=1 is satisfied by all data x satisfying IQx=1, steps S500 and S600 in FIG. 10 are not executed. Meanwhile, in step S120, if there is data x satisfying IQx=1 and OUTPx=0, the processing of controlling information offer in step S500 (described in detail in FIG. 17) is executed.

Figure 17:
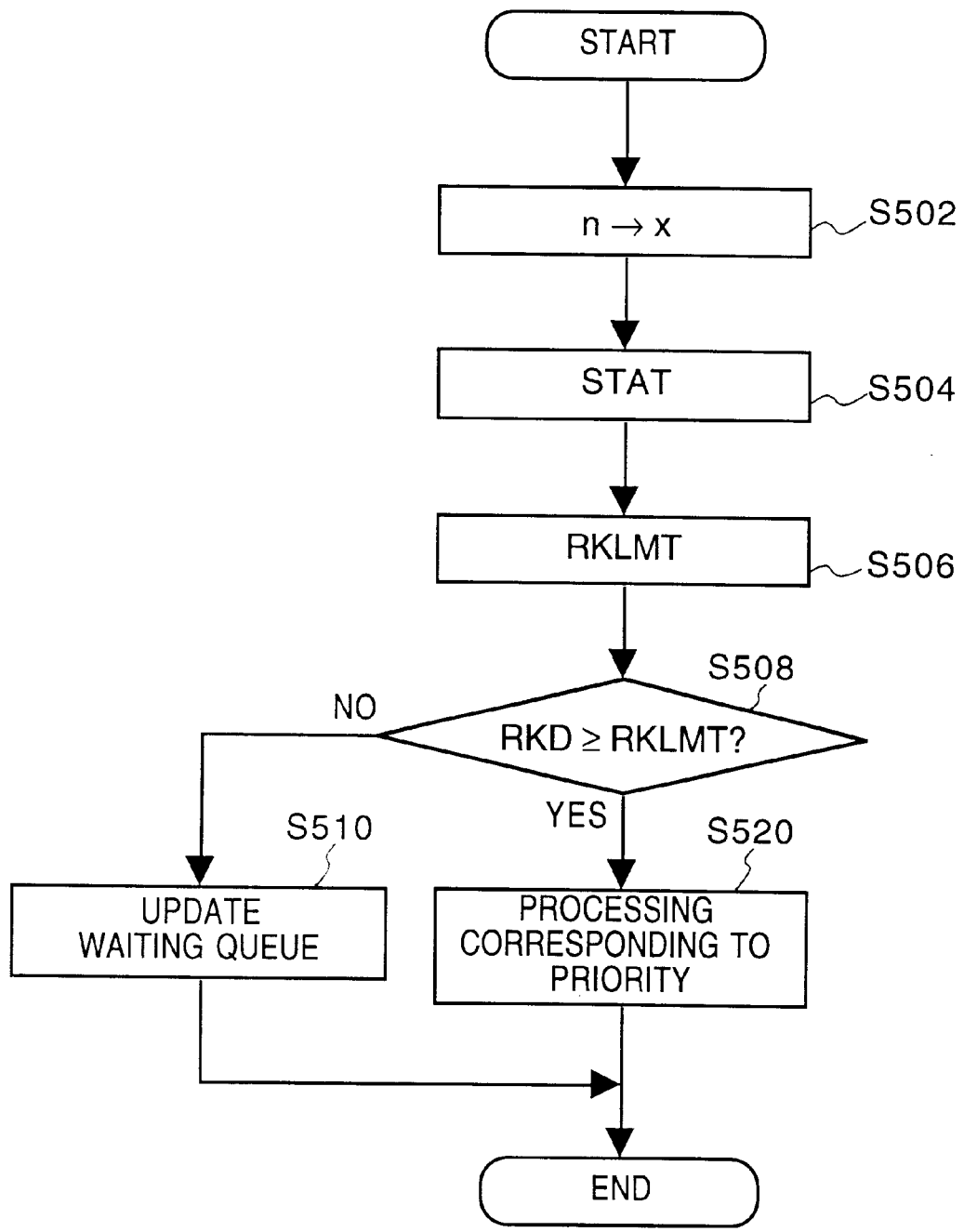
FIG. 17 is a flowchart showing an "information offer control" routine in control steps of the navigation system according to the first embodiment.

In step S502 in FIG. 17, an argument x of the subject information is saved in a register n. In step S504, running state STAT of the vehicle is determined. Seven types of running states STAT of a vehicle are assumed in the present embodiment: "abrupt turn," "abrupt break," "back up," "change lane," "turn right/left," "abrupt acceleration" and "normal." In step S506, the lower limit value of priority RKLMT is read out of the table shown in FIG. 13, "definition table of priority lower limit RKLMT" in accordance with the detected running state STAT. In step S508, the priority rank RKC and the lower limit value RKLMT of the requested information data are compared, and in step S520, only the data satisfying RKCn≧RKLMT is subjected to consideration for information offer. Therefore, data n which satisfies RKCn<RKLMT is held back from being offered to the driver. More specifically, the processing proceeds to step S510 (FIG. 17) where waiting queue in FIG. 9 is updated. By the updating process, the data n which has been checked once in step S508 is moved to the bottom of the waiting queue. This prevents the processing of the same data successively in the flowchart in FIG. 17. Note that in step S510, instead of the control operation of postponing the information offer of the data n (i.e. audibly output the data), the subject information may be cleared.

Figure 26:
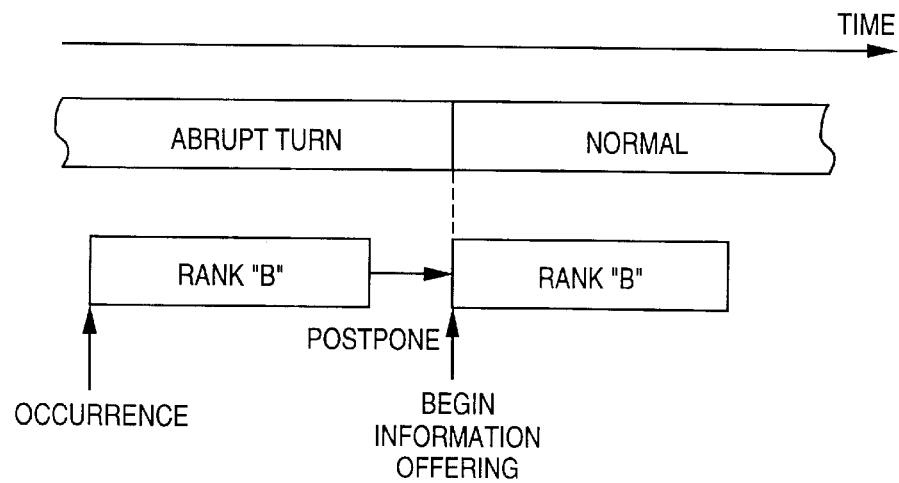
FIGS. 26–28 are an explanatory view showing control operation of the navigation system according to the first embodiment.

FIG. 26 shows the process in a case where data occurs during a certain running state (abrupt turn), information offer is postponed until the running state is canceled (returns to normal running state).

As described above, according to the present invention, when there are a plurality of information to be provided to a driver, appropriate information (RKC≧RKLMT) is selected in accordance with the running state of a vehicle and provided to the driver. As a result, information truly necessary by the driver is selected, so that the aforementioned problem of making the driver feel uncomfortable will be solved.

When it is determined in step S508 in FIG. 17 that the subject information n satisfies RKCn≧RKLMT, the data n is subjected to information offer to the driver. Therefore, the final determination is made in step S520 whether the data n is to be subjected to information offer. In the first embodiment, the determination is made in accordance with the priority PR and priority rank RK.

Next, description will be provided on the subroutine "processing corresponding to priority" performed in step S520 in FIG. 17. The subroutine is explained in FIG. 18, and outline of the control is shown in FIG. 12.

In the first embodiment, data is discriminated between data necessary to be provided to a driver and data not necessary to be provided to the driver, in accordance with running state as defined in the table in FIG. 13. However if there are a plurality of data, having the same value of the priority rank RKC, simultaneously exist to be provided to a driver, the priority of the data cannot be determined by using only the lower limit value RKLMT. To cope with this situation, in the fist embodiment, an urgent level LVL of output timing is defined based on the priority rank RKC of the data and the current running state STAT, and the data occurred at the same time is mediated based on the level value LVL (=1 to 3).

FIG. 11 shows a table on the logic of generating a level LVL indicative of output timing of the data (i.e. urgent level for output), which is determined on the basis of a priority rank of the data (inputted data or data subjected to output) and the current running states STAT. The level LVL is used to determine the data is to be outputted (information offer) as shown in FIG. 12. More specifically, when data is in an output queue, determination is made, utilizing the level LVL, on the basis of the priority rank RKC of the data and the running state, as to whether the data should be outputted or should be forced to wait. Meanwhile, when data in the output queue is currently being outputted, determination is made, utilizing the level LVL, as to whether to continue or terminate the output operation.

Figure 18:
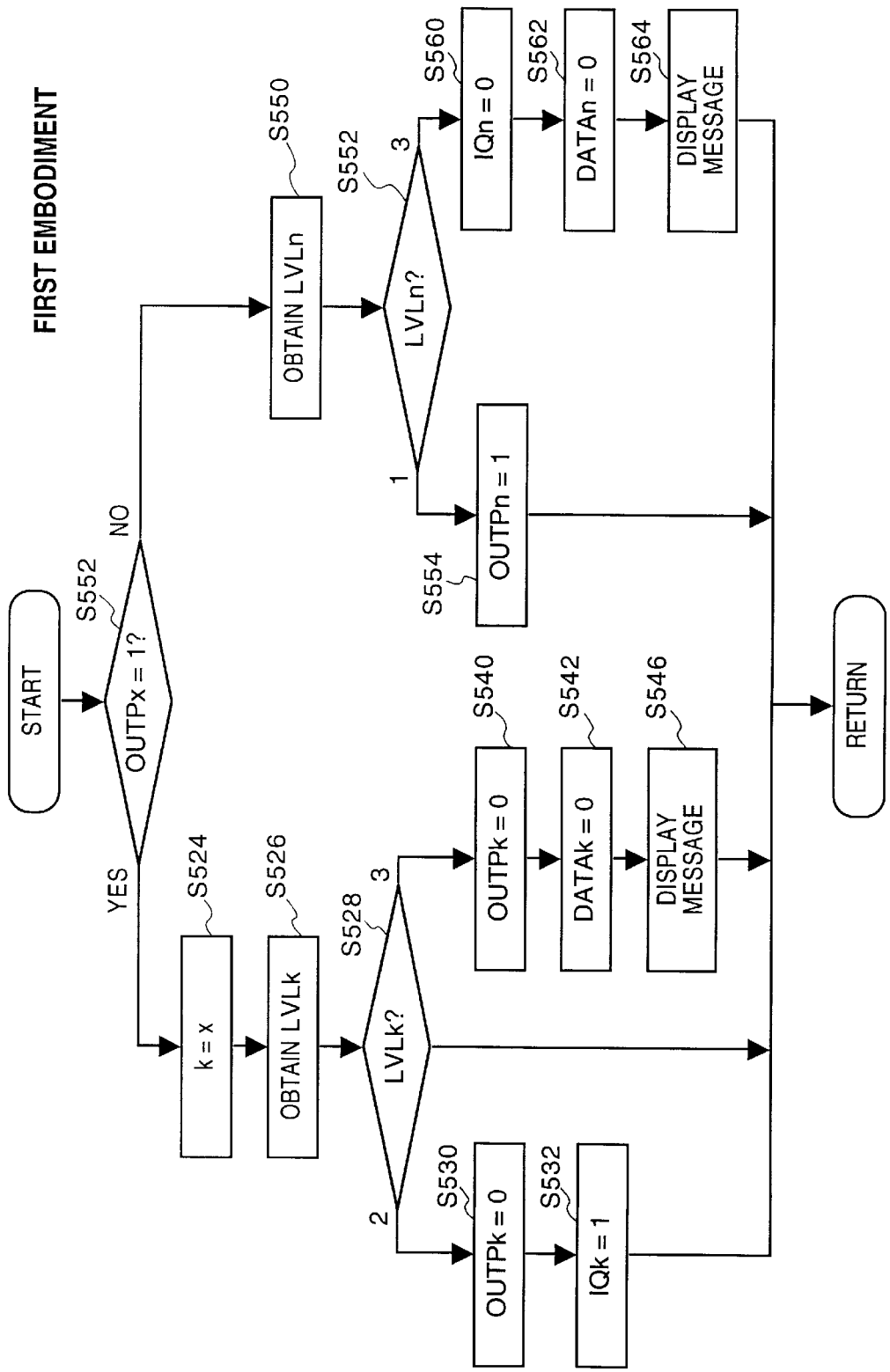
FIG. 18 is a flowchart showing a "processing corresponding to priority" routine in control steps of the navigation system according to the first embodiment.

FIG. 12 shows results of control procedure shown in FIG. 18. More specifically, the level LVL is used differently depending on whether or not there is data currently being outputted (referred to as "outputting data" for descriptive convenience) as shown in FIG. 12. In a case where "input data" occurs while there is no "outputting data," the level LVL is used to determine how to process the input data. In a case where there is "outputting data," the level LVL is used to determine whether or not the output operation is to be terminated.

When there is no outputting data, determination NO is made in step S522 in FIG. 18. In step S550, the level LVLn of input data n is obtained. If the value of LVLn is "1," the processing proceeds to step S554 where the input data is outputted. More specifically, an output queue flag OUTQn of the data n is set at "1" in step S554. As a result, input data satisfying level LVLn=1 is output. Input data satisfying the level LVL=1 is, e.g., data having rank "A" in all running states, or data having rank "B" or "C" in the running states of "back up," "change lane," "turn right/left," "abrupt acceleration," and "normal," or data having rank "D" in the running state of "change lane," "turn right/left," "abrupt acceleration," and "normal," or data having rank "E" in the normal running state.

When the level LVLn of input data n is "2," the control steps in FIG. 18 will not be executed. As apparent from FIG. 11, data having level "2" is: data having rank "B," "C" or "D" in the running state of "abrupt turn" "abrupt break" and "route guidance," or data having rank "D" in the running state of "change lane," "back up," or data having rank "E" in the running state of "turn right/left," "abrupt acceleration," and "route guidance." Since data having level "2" is not urgent, e.g. vehicle information and the like during abrupt turn or abrupt break, it is not provided to the driver. Such data is returned from step S552 in FIG. 18 to the initial routine to postpone the output. Note that the postponed data, e.g. "vehicle information," is released from the standby state and outputted (if there is no other data) when the vehicle state changes from, for instance, "abrupt break" to "change lane."

Figure 27:
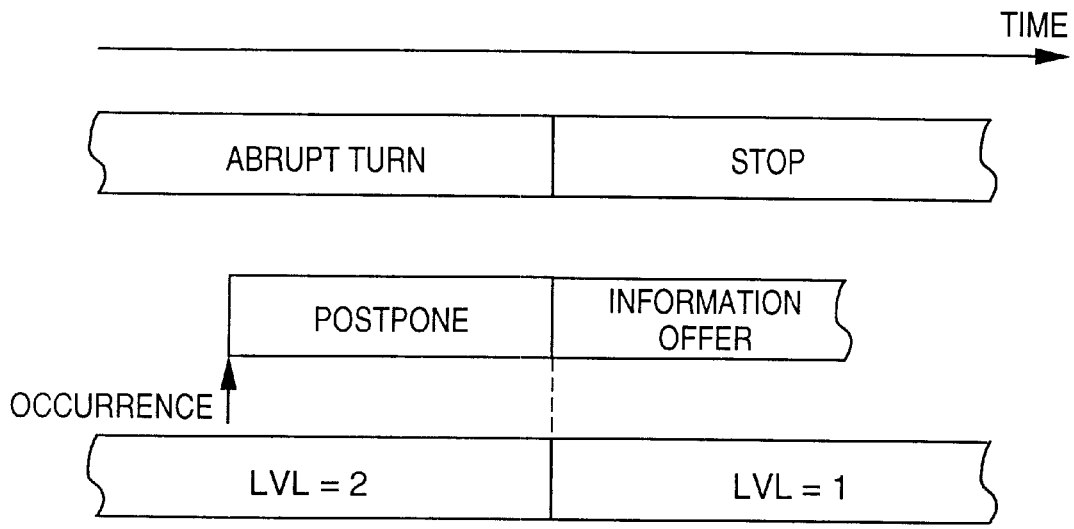

FIG. 27 describes the state where output of data having LVL=2 is postponed.

Meanwhile, when the level LVLn of the input data n is "3," the processing proceeds to step S560 in FIG. 18. Data having level "3" is: data having rank "E" in the running state of "abrupt turn," "abrupt break" and "back up." Since such data is not urgent, information offer is prohibited and data is cleared. That is, in step S560 in FIG. 18, the queue flag IQn of the subject information n is reset (also deleted from the queue table in FIG. 9), and audio information is cleared in step S562. In step S564, a message informing a driver that audio information is cleared, is displayed on the display 8.

In a case where there is outputting data (determination YES is made in step S522), the processing proceeds to step S524 where an argument x of the outputting data is saved in the register k. In step S526, a value of the level LVLk of the outputting data is obtained.

If the value of LVLk of the outputting data is "1" in step S528, the processing returns to the initial routine. In other words, if the level of the outputting data is "1," outputting operation of the outputting data is continued, but inputted data is not offered to the driver and is postponed. Herein, outputting data having LVLn "1" is data having rank "A" in the running state of "abrupt turn," "abrupt break" and "route guidance," or data having rank "C" or higher in the running state of "back up," or data having rank "D" or higher in the running state of "change lane," "turn right/left," and "abrupt acceleration," or data having all ranks in the normal running state. As explained above, outputting data having level "1" is urgent information or information which does not disturb the driver in any running states. Thus, output operation therefor is continued.

Herein, a problem arises if input data having rank "A" (e.g. urgent information) is inputted while the outputting data having level LVL "1" is being outputted. Particularly, it is problematic when the outputting data has rank "B" which is lower than rank "A," because the data having rank "A" may be forced to wait. According to the level setting in FIG. 11, the time at which the input data having rank "A" is forced to wait is when the outputting data having rank "B" is being outputted in the running state which is not "abrupt turn" or "abrupt break." Therefore, even if inputted data having rank "A" is forced to wait in the running state other than the "abrupt turn" or "abrupt break," it would not cause any problem. Furthermore, in the first embodiment, inputted data having ranks other than rank "A" is not processed to be outputted during "abrupt turn," or "abrupt break" by virtue of the operation in step S508 (FIG. 17). Accordingly, in the first embodiment, such situation where data having rank "B" or lower is outputted before outputting data having rank "A" during the running state of "abrupt turn" or "abrupt break" would not occur.

In a case where determination is made in step S528 in FIG. 18 that the outputting data has level "2," a flag OUTPk is reset in step S530 to cancel the output of the outputting data. In step S532, the flag IQk is set at "1" to make the outputting data k in output-waiting state. The data whose output has been terminated is next outputted when the running state which has caused the termination changes.

Herein, outputting data having level "2" is: data having rank "D" or higher in the running state of "abrupt turn," "abrupt break" and "route guidance," or data having rank "D" or higher in the running state of "back up," or data having rank "E" in the running state of "change lane," "turn right/left," "abrupt acceleration," and "route guidance." It is not problematic if outputting of data having level "2" is terminated since it is not urgent.

Figure 28:
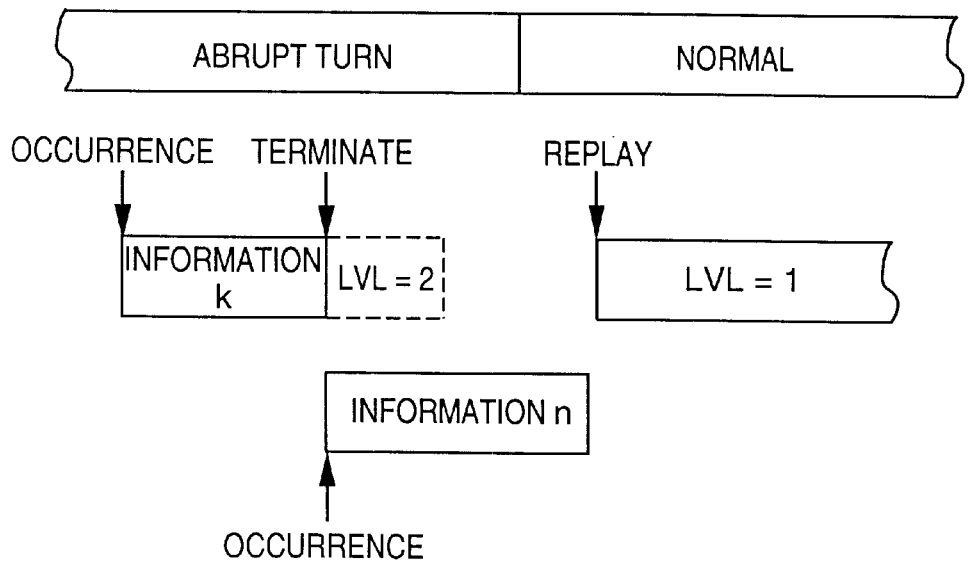

FIG. 28 shows the state where output operation of data k which is outputted during the running state of abrupt turn, is terminated by another inputted data n which causes to change the urgent level to LVL=2, and is resumed after the running state returns to normal.

Meanwhile, referring back to FIG. 18, if determination is made in step S528 that outputting data has level "3," the processing proceeds to step S540 where the flag OUTPk of the outputting data k is reset to terminate the output operation. Further in step S542, the subject information is cleared, thus will not be outputted in the future. In step S546, a message indicating that the data has been cleared is displayed on the display 8 to inform the driver.

Note that instead of clearing the data, the queue flag may be reset. The aforementioned repeat switch (FIG. 3C) is effectively utilized.

As has been described above, in accordance with a priority rank, running state or conflicting state of information, inputted data is returned to the output queue (OUTQ=1), or output operation of data currently being outputted is terminated and the data is returned to the output queue. In the case where the data being outputted is returned to the output queue, the data is outputted to a driver in output routine in step S600 in FIG. 10 (details shown in FIG. 19). More specifically, data in the output queue is read in step S602 in FIG. 19. The identification of the information in the output queue is stored in the register x. In step S604, the number of times of continuous data output is obtained. Details thereof will be described later.

If the number of times of the continuous data output is within a limited value, it is confirmed in step S606 that there is no other data being queued as output data, and in steps S608 and S610, subject information x is marked m as outputted data (OUTPm=1). Then audio information is outputted-in step S612 to a digital signal processor (DSP) (not shown) in the centralized control unit 2 to be output as audio information. In step S614, output starting time (TMST) of the data is stored in a register. The processing returns from step S614 to the main routine in step S700 (FIG. 10).

Upon completing audio information output via the DSP, the completion is detected as an interruption. When output-complete interruption is detected, the control steps shown in FIG. 20 begins. It is confirmed in step S802 in FIG. 20 that there is at least one entry in the queue being outputted. In step S804, the data number in the queue being outputted is stored in the register q. In step S806, the output queue (OUTP) is reset to indicate that output has been completed. In step S808, the time at which the output has been completed (TMED) is stored in a register.

Herein, the routine in FIG. 19 for obtaining the number of times will be described.

When data, particularly audio information, is continuously output, a driver is bothered by such information. Therefore, it is preferable to reduce an excessive amount of audio information provided to a driver in a continuous manner. However, the number of times of continuous information offering should be regulated in accordance with running conditions. Therefore, in the present embodiment, limitation in number of times LMT of continuous output is defined as shown in FIG. 21.

Figure 24:
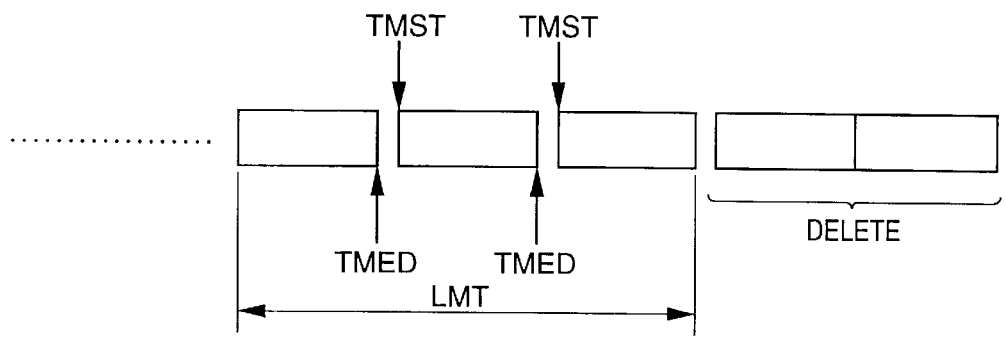
FIG. 24 is an explanatory view showing operation of "obtaining number of times" routine in FIG. 22.

FIG. 24 shows the definition of "continuous output" in the first embodiment.

A driver feels that data is "continuously outputted," when the time difference between output-completed time (=TMED) of data and output starting time (=TMST) of the next data is small. Assuming that a threshold value of the time difference is set to a predetermined value δ, it is defined herein that a driver feels uncomfortable when a sequence of data output satisfying TMST-TMED<δ is repeated for the number of times LMT. In the present embodiment, when data is outputted the LMT number of times, data waiting in the output queue is removed from the queue, so that the driver will not be bothered by continuous output of audio information. Note that the limitation in number of times LMT varies in accordance with the running state. Therefore, in the first embodiment, the limitation in number of times LMT is varied in correspondence with the running state as shown in FIG. 21. Since data should not be removed while a vehicle performs urgent operation (abrupt turn or abrupt break), the LMT value is not limited under such condition. On the contrary, under a driving state which is closer to the normal driving condition, a driver drives in free and easy manner. In other words, the driver is more tolerant of information offer. Thus, larger value of LMT is set.

The number of times may be obtained at the time of starting output operation. More specifically, step S604 (details shown in FIG. 22) is executed each time the output routine in FIG. 19 is executed. In step S572 in FIG. 22, TMST−TMED is calculated. In step S574, it is determined whether or not the difference obtained in step S572 is larger than the threshold value δ. If it is larger, the system judges that the continuous output so far is not problematic. Then in step S582, a counter CNTR which stores the number of times of continuous output is reset.

Meanwhile, if the difference exceeds the threshold value δ, the processing proceeds to step S576 where the counter CNTR is incremented. In step S578, the counted value CNTR is compared with the limitation in number of times LMT corresponding to the current running state STAT. If the counted value CNTR exceeds the LMT, a data output request (IQ=1) which is queued in the output table is searched in step S580. Then the queue of data output is reset in step S590.

Details of the delete routine in step S590 (FIG. 22) is shown in FIG. 23. More specifically, in step S592, it is determined whether or not the current running state is an abrupt turn or abrupt break. When the current running state is abrupt turn or abrupt break, the processing returns to the initial routine in FIG. 22, thus the entry of the queue is not reset. This is because it is preferable not to delete data during the state of abrupt turn or abrupt break. If it is determined that the running state is not an abrupt turn or abrupt break, the entry of the queue is reset in step S594 in accordance with the running state. Note that the process of deleting an entry of the queue in step S594 is not performed for input data having rank "A."

Effects of First Embodiment

The following effects are attained by virtue of the navigation system according to the above-described first embodiment.

!: On account of multimedia which provides audio information, a large variety of information can be obtained so that appropriate route guidance is realized.

!-1: When audio information is provided via multimedia, an excessive amount of audio information is sometimes offered to a driver, causing the driver to feel annoyed or miss important information. However, according to the first embodiment, regulating information offer is changed depending on a type of a medium (i.e., depending on a medium, regulated by priority PR or priority rank RK). Therefore, information offer is regulated such that it is appropriate for each medium.

!-2: Because information offer is regulated in accordance with the current running state, the driver is able to receive an amount of information or a type of information that are suitable for the running state.

Particularly noted in the first embodiment is in that unnecessary information is removed in advance in accordance with the running state, as shown in FIG. 13.

Furthermore, the urgent level LVL indicative of the timing of data output is determined on the basis of both the running state STAT and priority rank RK of data as shown in the tables in FIGS. 11 and 12. Accordingly, uniform information offer, where data output is determined based on only the running state STAT or only the priority rank RK, is prevented, and well-balanced information offering is realized. This is because the timing at which information is provided to a driver should be determined by taking account of both nature of the information (rank, that is, importance) and current running state (urgent level).

Moreover, by virtue of the fact that continuous data output is limited as shown in FIG. 21, a driver will no longer be bothered by an enormous amount of information being offered. In addition, the limitation in the number of times of continuous output is changed in accordance with the running state. Thus, a situation such as where important information is lost depending on the running state, does not occur.

": According to the system in the first embodiment, in a case where a plurality of different information are inputted simultaneously to be provided to a driver, the order of outputting thereof is determined based on the priority (or rank). Accordingly, the driver is able to appropriately receive navigation information by preferentially outputting data having higher priority.

"-1: Information offered to a driver is regulated by not providing information having low priority (regulating data output by RKLMT shown in FIG. 13, or prohibiting output of data having level 3 as shown in FIG. 12).

"-2: Since the table where priority orders are defined is changeable, navigation information can be offered to the driver in the way preferred by the driver.

: Audio information whose output has been restrained is displayed on the display, or a message notifying that there has been data not provided is substitutedly displayed on the display. Accordingly, a driver does not miss any information, or is not bothered by excessive information offer. Also, the message display can be activated or not activated depending on the driver's preference.

$: A memory capacity can be set for each medium as shown in FIGS. 7 and 8. Accordingly, it is possible to prevent a large volume of (unnecessary) information from occupying a storage area of the memory. In addition, operability improves since the capacity is set by the user. Furthermore, with respect to important (urgent) information, a special storage area to which the user cannot access is secured so that important information will not be lost due to lack of storage area.

Modification of First Embodiment

First Modified Example (Audio Information→Display Data)

Hereinafter, description will be provided in the first modified example where modification is added to the controlling operation (FIGS. 10 to 28) of the foregoing first embodiment. According to the first embodiment, when audio information having rank "B" (information related to vehicle) is inputted in the running state of abrupt turn or abrupt break, LVL=2 is given to the data because data having rank "B" is considered as relatively important. Thus, depending on conflicts with other information, the audio information having LVL=2 is provided to the driver.

However in the first modified example, in a case where data having rank "B" is inputted during the running state of abrupt turn or abrupt break, in consideration of the fact that the data having rank "B" is relatively important, LVL=1 is given to the data so that the data is surely offered to the driver. In the meantime, if the subject information having rank "B" is text data, the data is provided without being converted to audio information, and if the subject information is audio information, the data is provided after being converted to text data, so that the driver does not lose his concentration due to audio information during an abrupt turn or break operation.

FIG. 67 is a setting table where urgent levels of output timing are set, which is used in controlling of the first modified example. The table in FIG. 67 differs from the table used in the first embodiment (FIG. 11) in that, as described above, LVL=1 is given to data having rank "B" in the running state of abrupt turn or abrupt break, and the data is offered to the driver always on a display.

The first modified example employs substantially the same control steps described in the first embodiment. However, the routine "processing corresponding to priority" (FIG. 18) in the first embodiment is substituted with control steps shown in FIG. 68. More specifically, in the controlling of the first modified example, when data having level LVL=1 is detected while the data has rank "B" and when the running state of the vehicle is abrupt turn or abrupt break, the inputted data is converted to text data (or kept as text data) to be displayed on the display 8.

Note that in the first modified example, the information having rank "B" (e.g. vehicle information) is regulated so that it is not provided as audio information. However, during the running state of abrupt break or abrupt turn, a driver may feel annoyed even when audio information having rank "A" is provided. To cope with this, the first modified example may be modified further such that audio information having rank "A" is converted to text data to be displayed.

Second Embodiment

Considering Running Environment

In the above-described first embodiment, the timing of information offer, particularly in a case where two conflicting information are simultaneously inputted, is determined by introducing the concept of the urgent level LVL (FIG. 11). The urgent level LVL is determined on the basis of the priority rank RK and running state STAT as shown in FIG. 11.

In the second embodiment described below, the conflicts in information offering order is mediated in accordance with priority order and running environment. In order to realize the above, the second embodiment utilizes the flowchart shown in FIG. 31 instead of the flowchart in FIG. 18. Also the second embodiment utilizes the table shown in FIG. 29 where running environment ENV is taken into consideration, instead of the table in FIG. 11. Other flowcharts and tables described in the first embodiment are used for the second embodiment as well.

FIG. 29 shows a table for determining priority, while taking into account of running environment ENV for each type of information. The priority in the second embodiment indicates a classification of control action which is to be taken after the priority is determined. To be discriminated from the "level LVL" used to determine priority in the first embodiment, the priority in the second embodiment will be referred to as "classification CL" for descriptive convenience. In the second embodiment, three types of running environment are set: a mountain road, neighborhood and a congested road. According to FIG. 29, the same type of information has different levels of importance to a driver depending on a running environment. Thus, depending on the change in running environment, a value of priority, i.e. classification CL, is different. The smaller the value of classification CL, the more the information is important for a driver. For instance, NAVI information has high importance (value "2") in a congested road, but has medium importance (value "3") in a mountain road, and has low importance (value "4") in the neighborhood since a driver is familiar with the area. Note that in the second embodiment, data having the classification value CL "1" is always outputted, but data having classification CL "4" is excluded from output object.

FIG. 31 shows control steps of the second embodiment used in place of the flowchart shown in FIG. 18 in the first embodiment. The control steps in FIG. 31 is started when: queuing of data x is detected while the main routine in FIG. 10 is performed; then the subroutine "information offer control" (details in FIG. 17) in step S500 in FIG. 10 is started and executed; and the processing in step S520 (FIG. 17) is started.

More specifically, by the time the processing in step S700 in FIG. 31 is executed, the number x of the data, subjected to information offer, has been registered in the register n. Thus, in step S700, it is determined before processing data n, whether or not there is data x currently being outputted (for descriptive convenience, will be referred to as "outputting data" as similar to the first embodiment).

If there is no outputting data x (i.e. no conflicting information), the data n which is queued can be outputted. Thus, the processing proceeds to step S736 where data n is inputted in the output queue, that is, the flag OUTQn is set at "1."

Meanwhile, if there is outputting data x in step S700, in step S702 in FIG. 31, the argument x is registered in the register k and the "processing of exceptional data" in step S703 is performed. The processing of exceptional data is shown in detail in FIG. 32.

Figure 32:
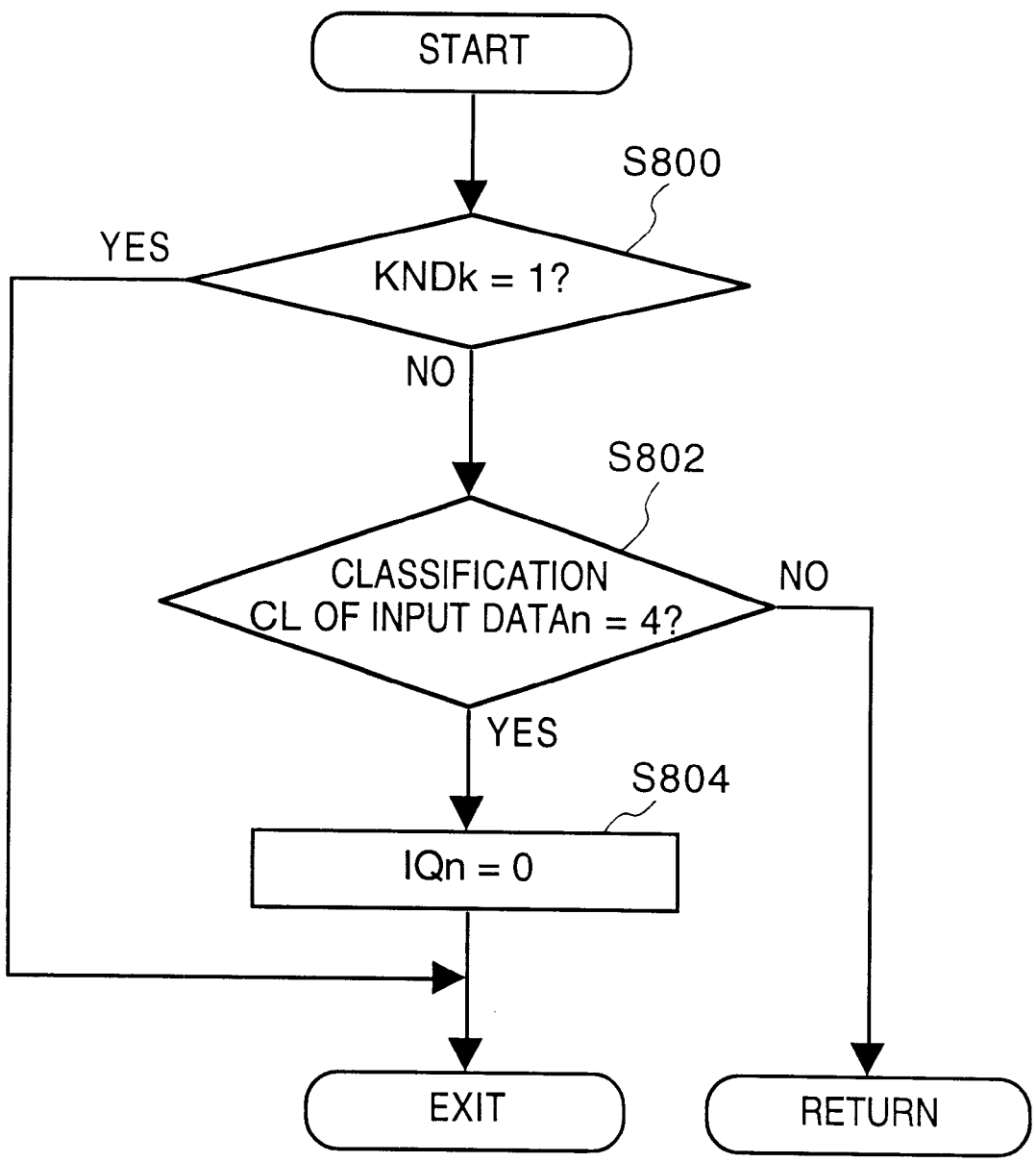
FIG. 32 is a flowchart showing a "processing of exceptional information" routine which is unique to the navigation system according to the second embodiment.

Referring to FIG. 32, it is determined in step S800 whether or not the type of information KND of outputting data k is urgent (KND=1). If the outputting data k is urgent, the output of the urgent information should be completed. Thus, the controlling proceeds from step S800 to the last step EXIT (return step) of the routine in FIG. 32, not returning to step S704 of the initial routine. In other words, the processing in step S520 in FIG. 17 is ended. As a result, when the outputting data is urgent information, the output operation is continued even if there is conflicting information. Note that if urgent information n is inputted while urgent information k is outputted, the urgent information n is outputted after the output of the urgent information k is completed, according to the control steps in FIG. 32.

If it is determined in step S800 in FIG. 32 that the outputting data k is not urgent, it is determined in step S802 whether or not the classification CL of the inputted data n is "4." As mentioned above, data having classification value CL=4 is excluded from processing according to the running environment defined in the second embodiment. Thus, if CL=4 is satisfied, the processing proceeds to step S804 where the queue flag IQn of the inputted data n is reset, and the data is cleared. Then, the processing proceeds to the last step EXIT (return step) of the routine in FIG. 32, and processing of the data n is considered completed. In other words, step S520 in FIG. 17 ends.

Meanwhile, in a case where the outputting data k is not urgent and where the inputted data n does not satisfy CL=4, the processing returns to step S704 in FIG. 31 to process the inputted data n.

In step S704, priority rank RKC is checked for the outputting data k and the inputted data n.

In a case where priority rank RKCk of the outputting data k is equal to or lower than the priority rank RKCn of the inputted data n (YES in step S704), the processing proceeds to step S706 to stop outputting the data k having the lower priority rank, by resetting the outputting flag OUTPk. Then in step S708, environment classification CL is determined with respect to the outputting data k in accordance with the table in FIG. 29. The control is different depending on the classification value CL. Note that urgent information (CL=1) or information satisfying CL=4 have already been processed in step S703.

In a case where classification value CL of the data k, whose output has been stopped, is "2," the queue flag IQk of the data k is set at "1" in step S710. This is to schedule the data k having classification value CL=2 to be output later again, in consideration of the fact that the data k (CL=2) has relatively high importance under the current running state as compared to data having classification value CL=3. In step S712, the flag OUTQn is set at "1" to immediately output the data n in place of the data k whose output has been stopped.

Figure 33:
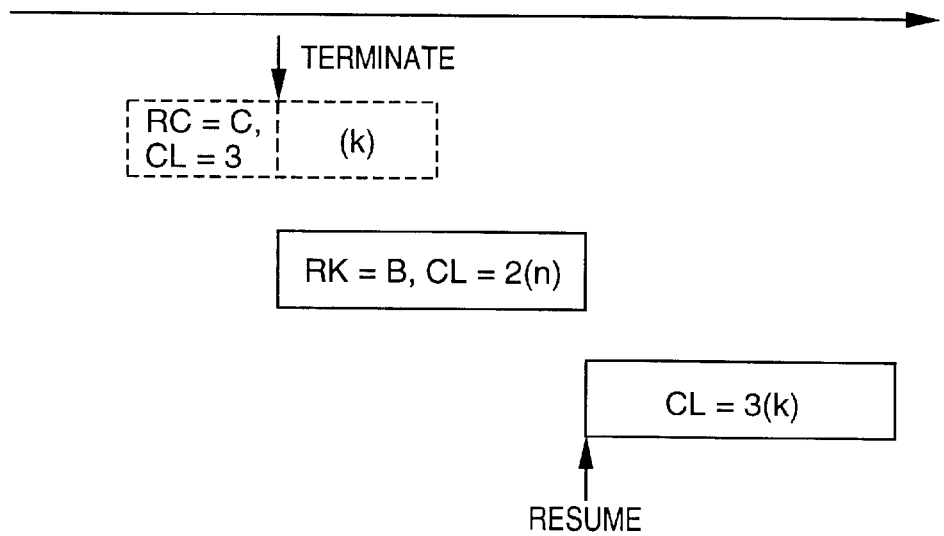
FIG. 33 is a timing chart explaining operation of the navigation system according to the second embodiment.

FIG. 33 shows examples of conflicting data k and data n which are subjected to processing in steps S706 to S712. Herein, data n having rank "B" and classification "2" is inputted while data k having rank "C" and classification "3" is being outputted. The output operation of data k is interrupted and output of data n is started instead. Upon completing the output of data n, the output of data k is resumed.

In a case where it is determined in step S708 in FIG. 31 that classification value of data k is "3," more specifically, if a priority rank of the outputting data k is lower than that of the inputted data n and classification of the outputting data k is "3," the input queue flag IQk of the outputting data k is reset in step S714, the data k is deleted in step S716, and a message indicative of deletion of data k is displayed on the display 8 in step S718. In step S719, the output queue flag OUTQn is set at "1" to enter the inputted data n in the output queue.

In a case where priority rank RKC of the outputting data k is higher than that of the inputted data n (NO in step S704), the environment classification CL of the inputted data n is obtained in step S720.

Figure 34:
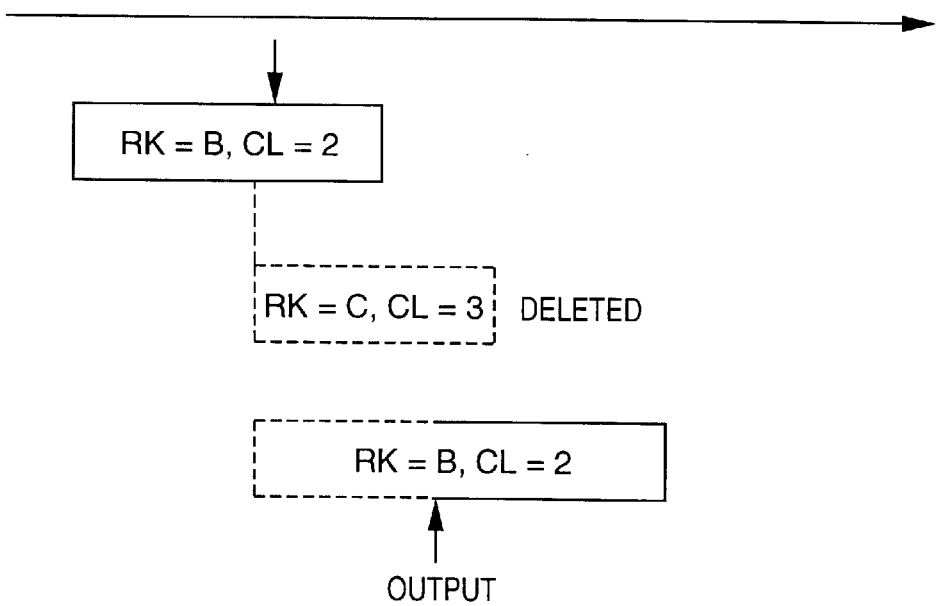
FIG. 34 is a timing chart explaining operation of the navigation system according to the second embodiment.

Description is now provided for a case where the classification CL of the inputted data n is "3." CL=3 denotes that a level of importance of the inputted data n is relatively low under the current running environment. Therefore, it is not necessary to stop output operation of the current-outputting data k having high priority rank RK. It is even preferable not to output the inputted data n, considering the fact that the priority rank of the outputting data k is higher than that of the inputted data n, and the level of importance of the inputted data n is relatively low under the current running environment. It is preferable not to output the data n because the system can prepare for another important data which may be inputted next. Thus, the input queue flag IQn of the inputted data n is reset in step S722, the data is deleted in step S724, and a message indicating the deletion of the data is displayed in step S726. FIG. 34 illustrates the above description.

Description is now provided for a case where the classification CL of the input data n is "2" (step S720). In this case, since the priority rank RK of the outputting data k is higher than that of the inputted data n, it is not necessary to stop output operation of the outputting data k, or to delete the inputted data n. Therefore in such case, the processing returns from step S720 to the initial routine, and the inputted data n is outputted after the output operation of the outputting data k is completed, or after the current running state changes.

FIG. 34 illustrates the above description. Also, the logic of the second embodiment is described in FIG. 30. In the second embodiment, three running environments are shown in FIG. 29 as examples. In addition, maps may be generated in accordance with the following environment:

!: running road (flat road, mountain road, highway, wide/narrow road, toll road, congested road);
": running location (neighborhood, city, beach, tourist spot, skiing spot); and
: weather (rain, snow, outside temperature)

Effect of Second Embodiment

The following effects are attained by virtue of the navigation system according to the above-described second embodiment.

!: By performing the processing of exceptional data (step S703 in FIG. 31/process in FIG. 32), special data (data always having high importance e.g. urgent information, or data always having low importance e.g. music title or the like) can be excluded from the processing. Therefore, control logic can be simplified.

": When there are conflicting data, the output order is determined (step S704) while the priority rank RKC and running environment ENV are considered.

When a priority rank RK of outputting data k is lower than inputted data n, output operation of the outputting data k is terminated depending on a condition. Whether or not the output operation is to be resumed is determined in accordance with the running environment. More specifically, when two conflicting data exist, whether or not to stop output operation of current-outputting data is determined in accordance with priority ranks between the conflicting data (step S704). Whether or not to resume the output-operation which has been terminated is determined on the basis of the level of importance (classification CL) of the data, while taking into account of the running environment (steps S708 and S710). When it is determined that the terminated output operation will not be resumed, the data is cleared (step S714).

Meanwhile, when a priority rank RK of outputting data k is higher than inputted data n (step S720), whether or not the inputted data n is to be provided to a driver is determined on the basis of the level of importance (classification CL) of the inputted data n, while taking the running environment into consideration. In other words, output operation of the outputting data k is maintained, but inputted data n having lower priority rank is regulated in accordance with the level of importance of the inputted data n in the running environment (steps S722–S724).

In the foregoing first and second embodiments, priority is briefly classified by introducing the concept of the priority rank RK. The present invention is also applicable to a case where the priority rank is further classified to set one rank=one priority. Such setting of priority ranks is easily realized by using the display screen shown in FIG. 5.

Modification of Second Embodiment

Second Modified Example

According to the second modified example, the control technique of the second embodiment utilizing priority (PR) and classification (CL) is applied to the control technique of the first embodiment where information offer is regulated while taking running state (speed, turning speed, acceleration/deceleration, change lanes, turn right/left, drive forward/backward) into consideration.

The control steps of the second embodiment (FIGS. 29–34) are utilized for the control of the second modified example. In this case, the similar change in the control logic of the first modified example is applied to the control logic of the second embodiment. For this, the table shown in FIG. 69 is used in place of the table in FIG. 29 used in the second embodiment. In other words, the control of the second modified example is realized by employing the table in FIG. 69 in the control steps of the second embodiment.

Third Embodiment

Considering Running Mode

According to the third embodiment, when there are a plurality of data inputted simultaneously to be provided to a driver, whether or not to provide the driver with the data, and the priority order of information offer are determined in accordance with a running mode.

FIGS. 35 to 47 show flowcharts related to control steps as well as various tables used for the control steps in the third embodiment.

In the third embodiment, whether or not to provide information, and the priority order of the information offer are determined in accordance with a running mode, that is, a general driving mode (low-to-medium speed) and a highway driving mode. As shown in FIG. 35, priority PR and classification CL corresponding to the running mode are defined to each type of information. More specifically, depending on the running mode, different priority values PR and different classification values CL are given to the same information. For instance, NAVI information has priority PR=3 and classification CL=2 in the general driving mode, but has PR=6 and CL=3 in the highway driving mode. Since a driver is less likely to lose his/her way on a highway, the NAVI information is less necessary while VICS information is necessary on a highway. These settings can be changed by a user as similar to the first embodiment.

Referring to FIG. 35, the priority columns marked "x" are excluded from controlling operation. For such information, classification CL=4 is given. With respect to urgent information, the highest priority (PR=1) and highest classification (CL=1) are given. Therefore, urgent information and information excluded from controlling operation are handled as "exceptional data" as similar to the second embodiment (See FIG. 47).

Control steps according to the third embodiment are now briefly described.

Figure 37:
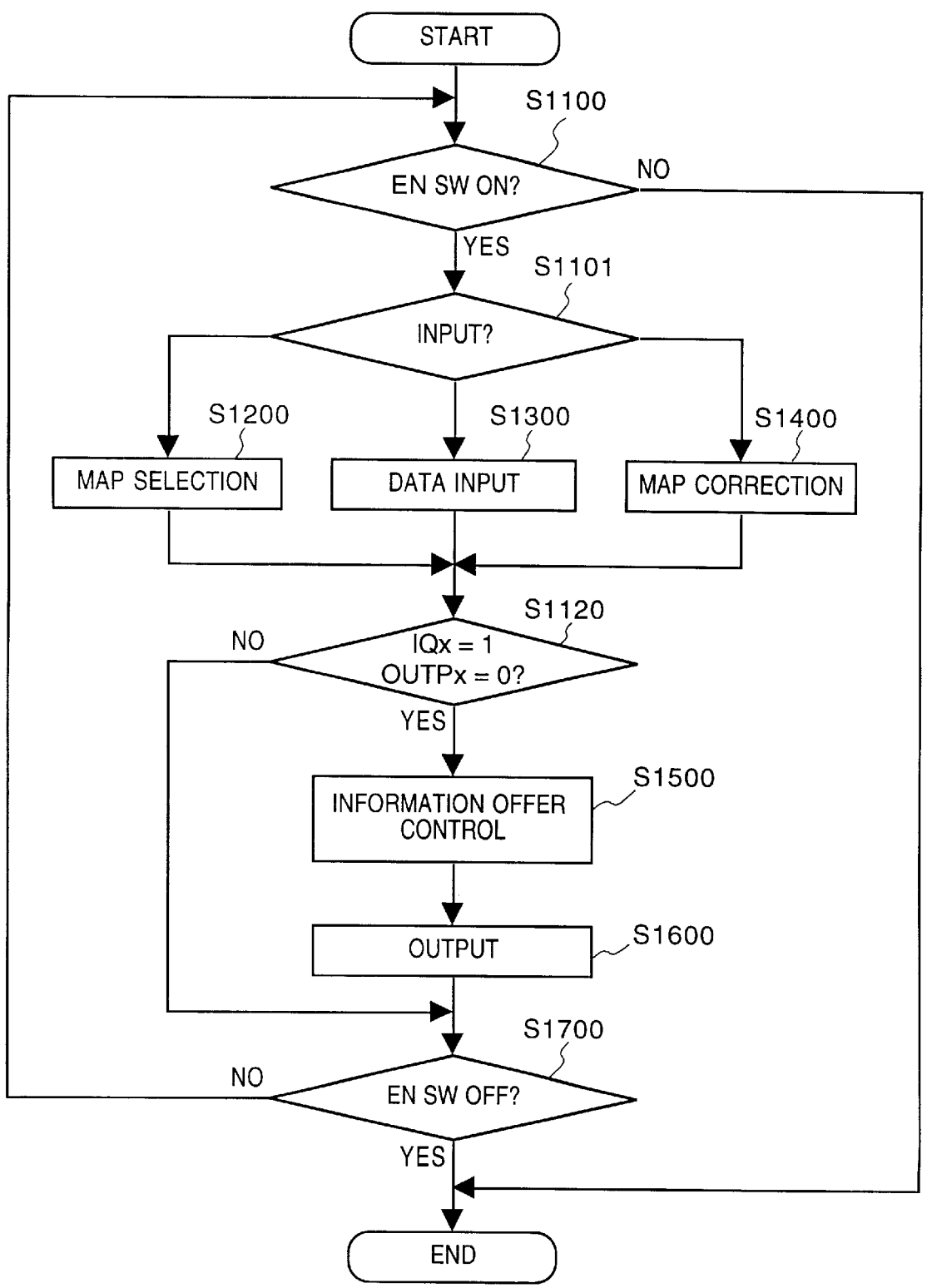
FIG. 37 is a flowchart describing a main routine in control steps of the navigation system according to the third embodiment.

FIG. 37 shows a main routine of control steps according to the third embodiment. The construction and operation are substantially the same as the flowchart in FIG. 10 described in the first embodiment. Thus, description thereof will not be provided.

Figure 38:
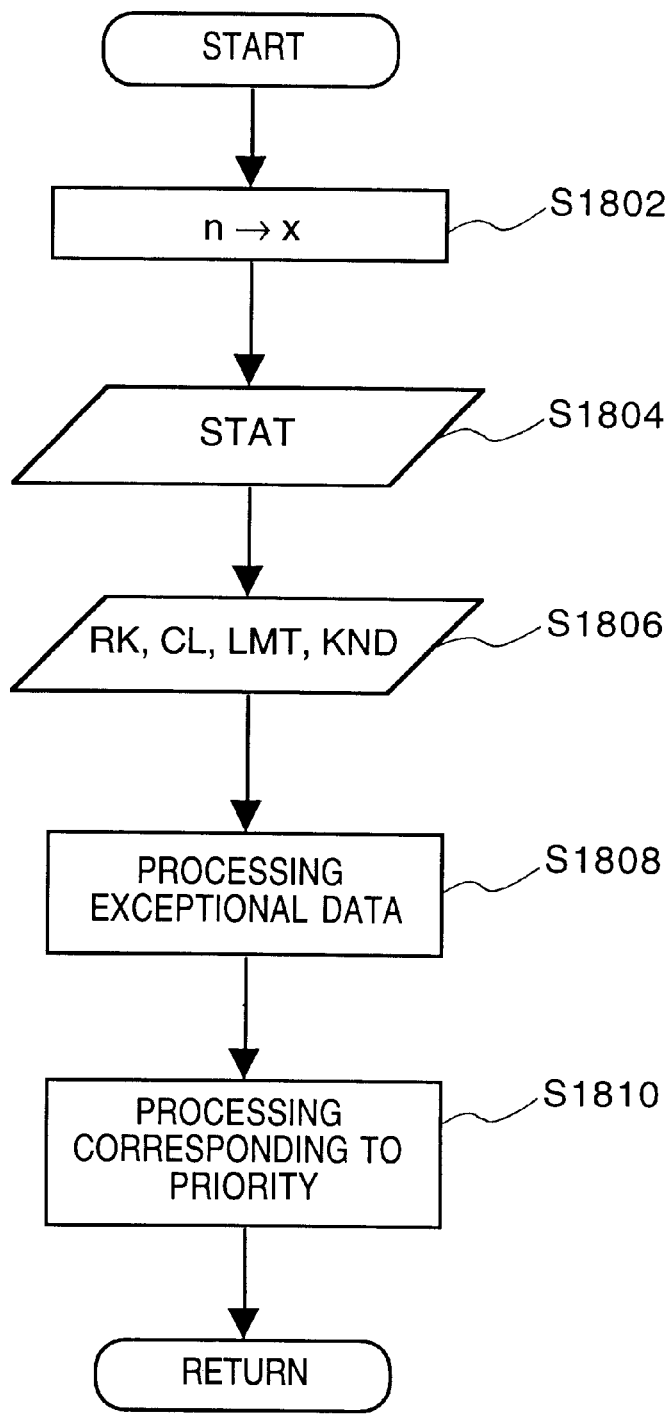
FIG. 38 is a flowchart showing details of the "information offer control" routine in the flowchart in FIG. 37.
Figure 39:
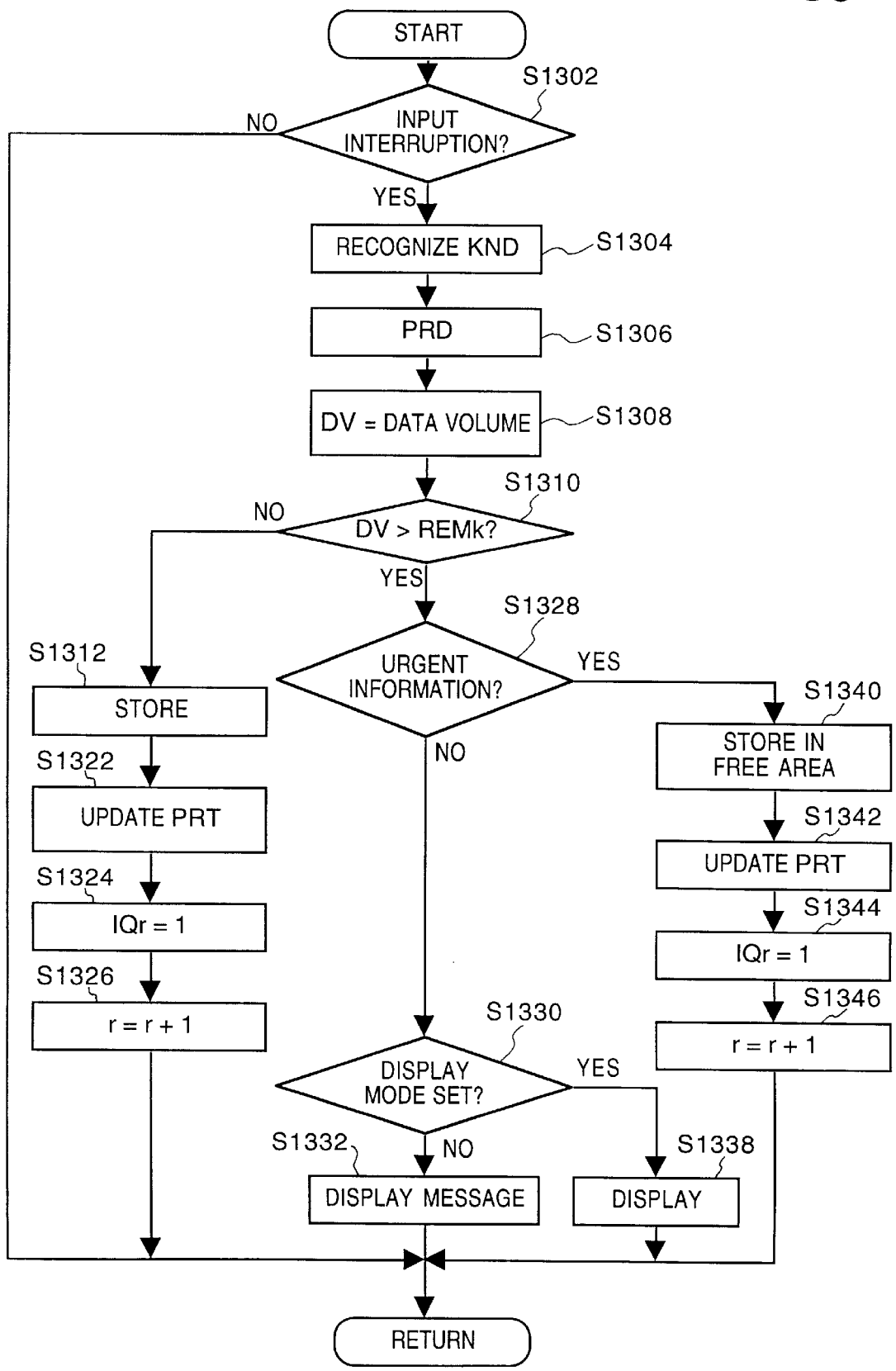
FIG. 39 is a flowchart showing details of the "information offer control" routine in the flowchart in FIG. 37.
Figure 40:
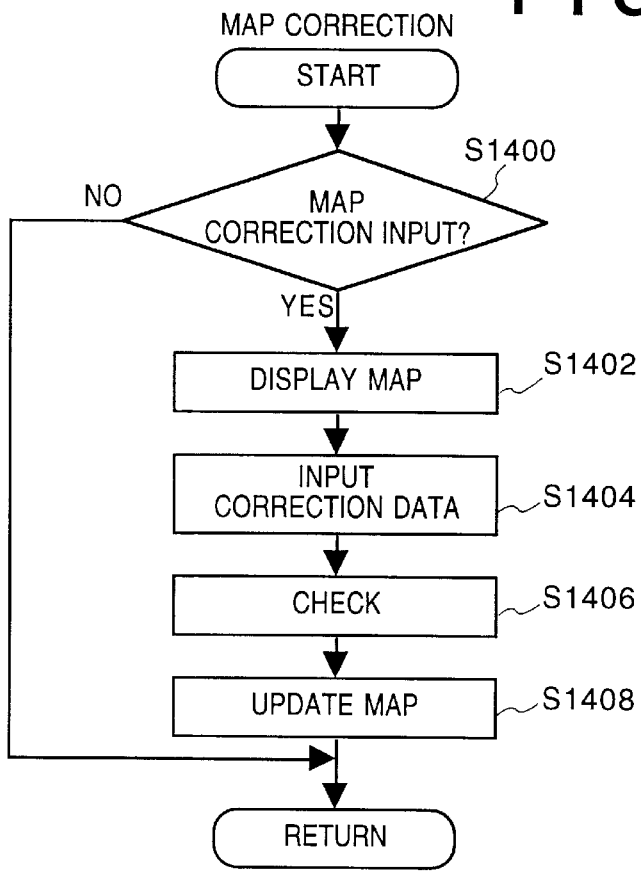
FIG. 40 is a flowchart showing a "map correction" routine in control steps of the navigation system according to the third embodiment.
Figure 41:
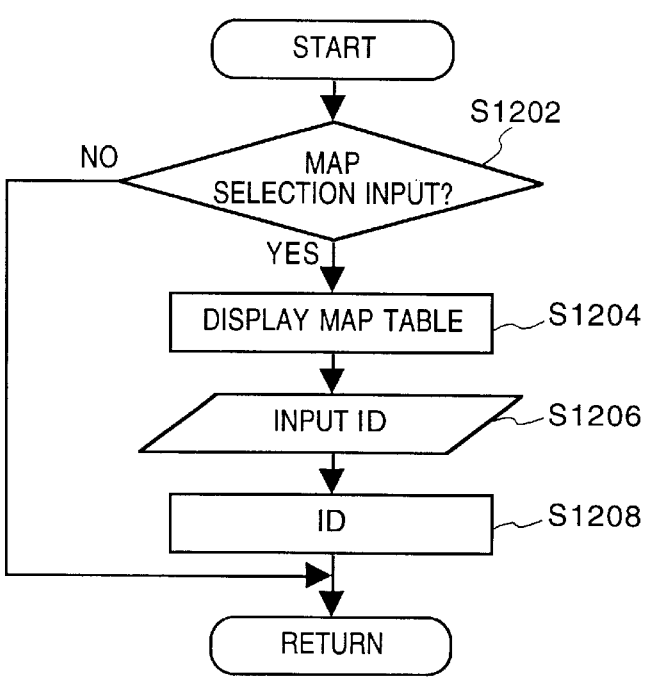
FIG. 41 is a flowchart showing a "map selection" routine in control steps of the navigation system according to the third embodiment.
Figure 42:
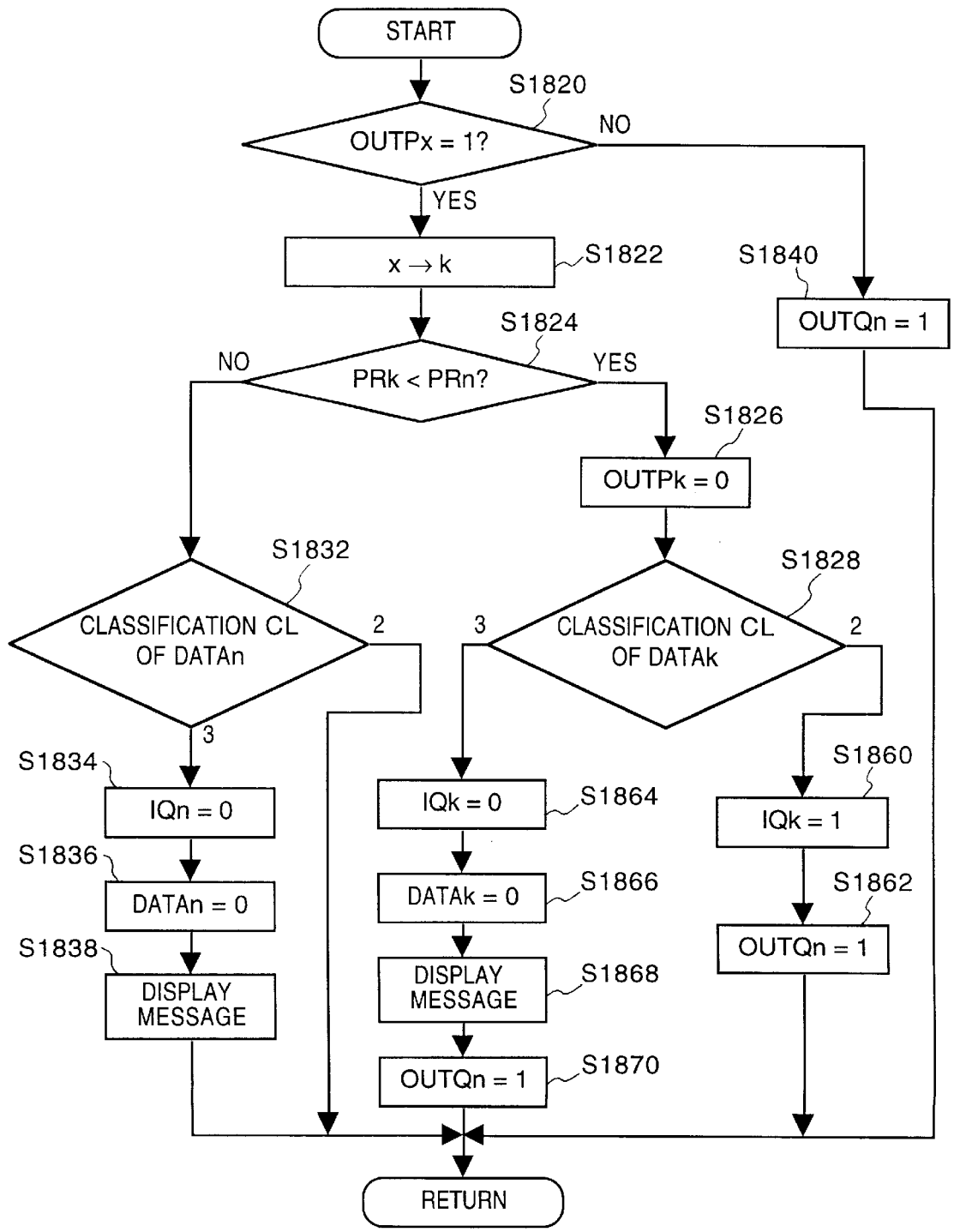
FIG. 42 is a flowchart showing a "processing corresponding to priority" routine in control steps of the navigation system according to the third embodiment.
Figure 43:
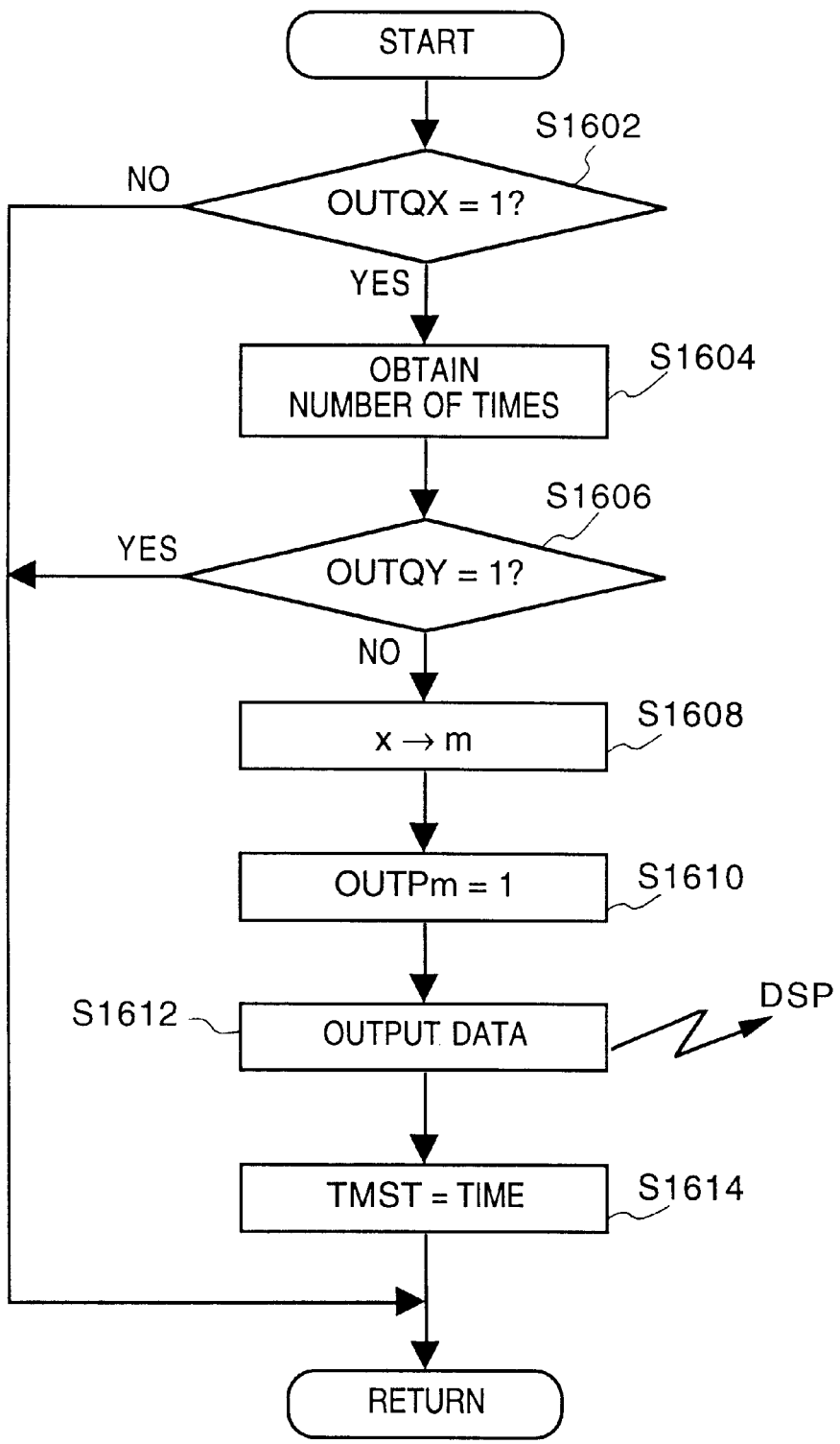
FIG. 43 is a flowchart showing an "output" routine in control steps of the navigation system according to the third embodiment.
Figure 44:
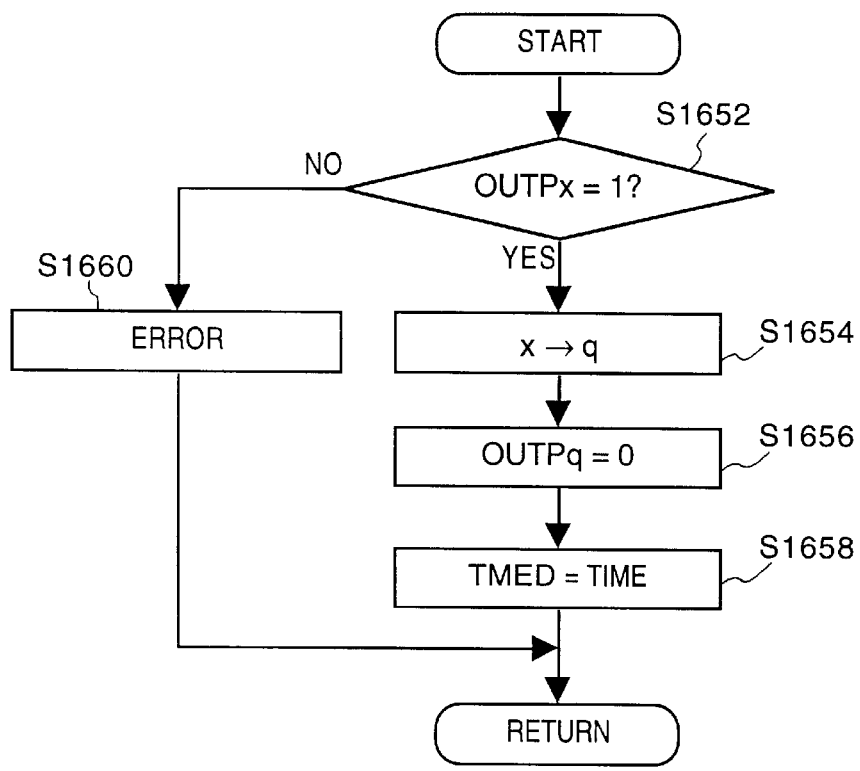
FIG. 44 is a flowchart showing an "output complete" routine in control steps of the navigation system according to the third embodiment.
Figure 45:
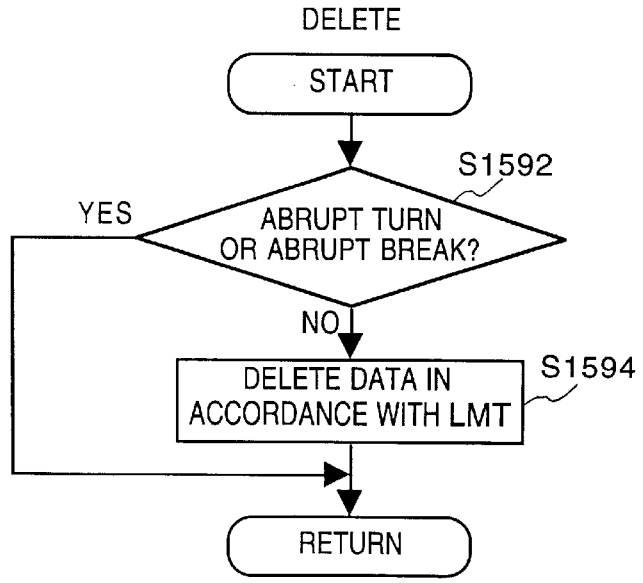
FIG. 45 is a flowchart showing a "delete" routine in control steps of the navigation system according to the third embodiment.

FIG. 38 explained in the third embodiment corresponds to FIG. 17 described in the first embodiment; FIG. 39 corresponds to FIG. 14; FIG. 40 corresponds to FIG. 15; FIG. 41 corresponds to FIG. 16; FIG. 43 corresponds to FIG. 19; FIG. 44 corresponds to FIG. 20; FIG. 45 corresponds to FIG. 23; FIG. 46 corresponds to FIG. 22; FIG. 42 corresponds to FIG. 18; and FIG. 47 corresponds to FIG. 32 described in the second embodiment. The third embodiment employs the same table used in the first embodiment (FIG. 21) for the definition of limitation in continuous output.

FIG. 38 shows the information offer control. Unlike the foregoing first modified example where priority ranks are assigned to information, according to the third embodiment, different priority orders are given to information depending on a running mode. Thus, processing of exceptional data is performed in the information offer control shown in FIG. 38. The processing of exceptional data performed in step S1808 is substantially the same as that described in the second embodiment (FIG. 32), i.e. urgent information having classification CL=1 and information having classification CL=4 are exceptionally processed. By virtue of this processing of exceptional data, only those information having classification CL=2 or CL=3 are subjected to the process in the following "processing corresponding to priority" in step S1810.

The processing shown in FIG. 42 is performed to determine the output order of conflicting information, while taking priority PR and running mode into consideration (step S1824). More specifically, the order of information offer and whether or not to provide the information, are determined such that it is suitable for each running mode.

The determination logic of the order of information offer is basically the same as that of the second embodiment. Particularly noted herein is a logic of determining whether or not to provide the information to a driver. In a case where priority PR of outputting data k is lower than inputted data n, output operation of the outputting data k may be terminated. Whether or not the terminated output operation will be resumed is determined on the basis of the running mode. In other words, when there are two conflicting information, whether or not to terminate output operation of current-outputting data is determined on the basis of priority of the conflicting information (step S1824 in FIG. 42). Whether or not to resume the terminated output operation is determined on the basis of a level of importance (classification CL) of the information, while taking the running mode into consideration (steps S1828 and S1860). In a case where it is determined that the output operation will not be resumed, the data is cleared (step S1864).

Meanwhile, in a case where priority of the outputting data k is higher than inputted data n (NO in step S1824), whether or not the inputted data n should be provided to a driver is determined on the basis of the level of importance (CL) of the inputted data n, while taking the running mode into consideration. In other words, the output operation of the outputting data k having a higher priority than inputted data n is maintained, while the inputted data n having lower priority than data k is regulated in accordance with the level of importance of the inputted data n in the current running mode (steps S1834–S1838).

FIG. 36 shows a table on the logic of determining the control steps described in FIG. 42. The logic is substantially the same as that in the second embodiment.

Modification of Third Embodiment

Third Modified Example (Considering Time Zone)

The third modified example determines the order of information offer and whether or not to provide the information to a driver in accordance with the time zone where driven.

FIG. 48 shows a definition table of priority PR and classification CL as similar to FIG. 35 described in the third embodiment. Values of the priority PR and classification CL are defined (but can be changed) for each type of information as similar to the third embodiment. Even for the same information, different values of priority PR and classification CL are given depending on difference in time zone.

According to the third modified example, the time zone may be designated by the name (e.g. meal hour, commuter's rush hour etc.) as shown in FIG. 48, or by specifying the time as shown in FIG. 49.

The system construction and control of the system according to the third modified example are substantially the same as that of the third embodiment. The effects same as that of the foregoing third embodiment can be attained by third modified example.

Modification of Third Embodiment

Fourth Modified Example (Considering Time Zone)

The fourth modified example is a modified version of the third modified example, and the determination process of whether or not to provide information to a driver, is further improved. According to the foregoing third modified example, data which is excluded from the determining operation of information offer is predetermined (indicated by "x" in FIGS. 48 and 49) in the system, and the setting can be changed by a user via the display. However, information subjected to processing is different in accordance with the time zone. Therefore, the fourth modified example includes a table shown in FIG. 50. In the table, information are determined in advance as excluded from the determining operation of whether or not to provide a driver, by the driver, and the determination is made in accordance with the time zones.

Figures 51, 52:
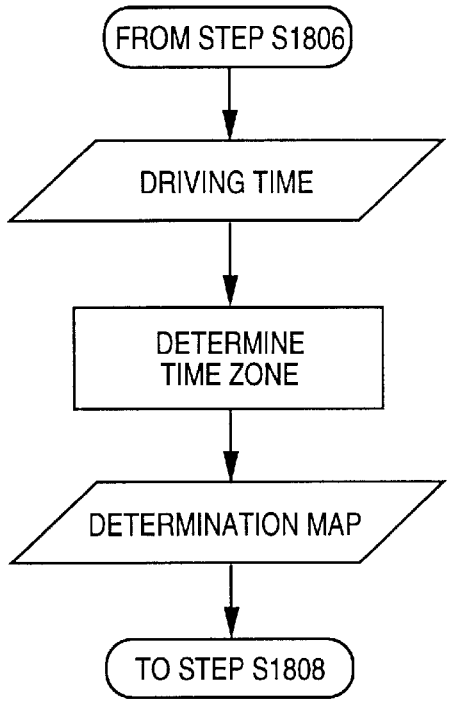
FIG. 51 is a flowchart showing controlling operation of the fourth modified example (modification of the third embodiment)
FIG. 52 is a table used in controlling operation of the fourth modified example (modification of the fourth embodiment)

FIG. 51 is a flowchart illustrating control steps according to the fourth modified example. FIG. 51 shows only the steps different from the control steps of the third embodiment. By adding the control steps in FIG. 51 between steps S1806 and S1808 (FIG. 38) of the third embodiment, the controlling operation of the fourth modified example is realized.

More specifically, upon executing step S1806, driving time is read and the driving time zone is determined based on the time. Examples of the determination logic are shown in FIG. 52. By utilizing the logic, the current driving time zone can be determined without requiring additional user operation. Upon determining the driving time zone, data to be excluded from the determination operation of whether or not to offer information, is decided by the logic shown in FIG. 50. Note that in FIG. 50, information without the indication ○ is the data to be excluded.

Upon deciding data to be excluded from determination of whether or not to provide the information, the data is removed by the "processing of exceptional data" in step S1808.

Fourth Embodiment

Considering Driving Purpose

In the first embodiment, whether or not to offer information to a driver, and the order of information offer are determined on the basis of running state (urgent operation, break, handle operation and the like), while in the third embodiment, they are determined on the basis of running environment (neighborhood/mountain road and so on) and a running mode (difference in speed).

In the fourth embodiment, they are determined on the basis of driving purpose.

FIG. 53 is a table showing the logic of determining whether or not to offer information to a driver, and the order of information offer, in accordance with driving purpose. Examples of driving purpose used in the fourth embodiment are; commute to work, travel, leisure drive, and shopping.

The system construction and control of the fourth embodiment is substantially the same as that of the third embodiment. The fourth embodiment can also achieve the same effects as that described in the foregoing first to third embodiments.

Modification of Fourth Embodiment

Fifth Modified Example (Speculation of Driving Purpose)

In the foregoing fourth embodiment, a driver sets driving purpose via the screen of a display. In the fifth modified example, the driving purpose is speculated by the system.

The driving purpose assumed in the fifth modified example includes five purposes: work, travel/leisure drive, sales, shopping, route guidance by NAVI.

FIG. 54 shows the control steps different from the control steps of the fourth embodiment. By adding the control steps in FIG. 54 between steps S1806 and S1808 (FIG. 38) of the fourth embodiment, the controlling operation of the fifth modified example is realized.

In other words, drive speculation is performed after step S1806. The logic of speculation is as follows:

Driving between 7:00AM to 9:00AM on weekdays: Work;

Driving on weekend/holiday within a radius of 50 km from home: Shopping;

Driving on weekend outside a radius of 50 km from home: Travel/leisure drive.

Whether the date is a weekday or a weekend/holiday is determined by a clock included in the system, and the distance of driving is determined on the basis of distance information provided by the NAVI system.

Note that the driving purpose may be entered by a switch or the like. Next, information to be excluded from determination of whether or not to provide the information, is obtained from a map (FIG. 55). Note that in FIG. 55, information without the indication ○ is the data to be excluded. Upon deciding data to be excluded, the data is removed by the "processing of exceptional data" in step S1808.

Fifth Embodiment

Considering Driver's Mental State

The fifth embodiment is similar to the foregoing first to fourth embodiments in the way that the determination of whether or not to offer information to a driver and the order of the information offer are made in accordance with running state. More specifically, in the fifth embodiment, whether or not to offer the information to a driver and the order of information offer is determined in accordance with mental state of the driver.

Figure 58:
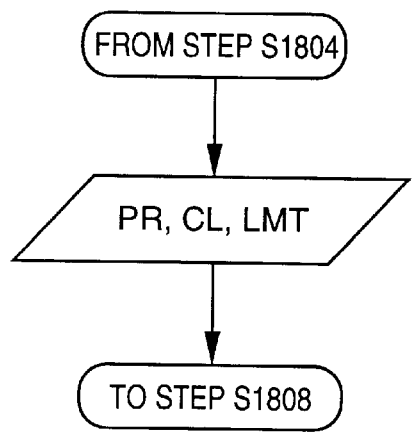
FIG. 58 is a flowchart showing a part of control steps of the navigation system according to the fifth embodiment.

The control operation performed by the fifth embodiment utilizes the same control described in the third embodiment. FIG. 56 is a table where levels of importance (priority PR and classification CL) of each type of information are defined in accordance with driver's mental state. The table in FIG. 56 is utilized in the fifth embodiment in the manner similar to the way the table in FIG. 35 is utilized in the third embodiment to perform controlling in accordance with running state. More specifically, for the control steps of the fifth embodiment, step S1806 in the flowchart in FIG. 38 is changed to step S1806' as shown in FIG. 58. In step S1806', the table in FIG. 56 is referred to. Note that in the fifth embodiment, the system determines the mental state of the driver on the basis of continuous driving time, the driving time zone, the number of times of breaking and driving speed and so on.

Upon executing step S1806', the controlling of the fifth embodiment proceeds to step S1808 in FIG. 38 which is "processing of exceptional data." Herein processing is performed such that urgent information is always provided to a driver. Information indicated by "x" in the table in FIG. 56 is determined as exceptional data, thus is excluded from controlling.

Furthermore, the priority PR and classification CL in FIG. 56 are used in the "processing corresponding to priority (FIG. 42)" performed in the fifth embodiment.

The fifth embodiment can also achieve the same effect as that described in the third and fourth embodiments.

Modification of Fifth Embodiment

Sixth Modified Example

In the map in FIG. 56, information to be subjected to the control operation is classified into three types of mental state (weary, tense and normal), and information which is excluded from the control is indicated by "x." According to the sixth modified example, the information is classified further in detail as shown in FIG. 57.

Sixth Embodiment

Urgent Information Designated by User

In the control performed by the third embodiment, so called "urgent information" is processed as exceptional data in the routine "processing exceptional data" (FIG. 38), so that the urgent information is quickly and surely provided to a driver. However, such "urgent information" in the third embodiment is data which has been predetermined by the system. Examples of "urgent information" are: tunnel information, earthquake information, vehicle information (alarm for breakdown, alarm for distance between vehicles, alarm for flat tire and the like), traffic information (accident information, regulation of traffic) and the like. Thus, "urgent information" is fixed. The sixth embodiment is characterized in that the "urgent information" can be designated by a driver.

Figure 59:
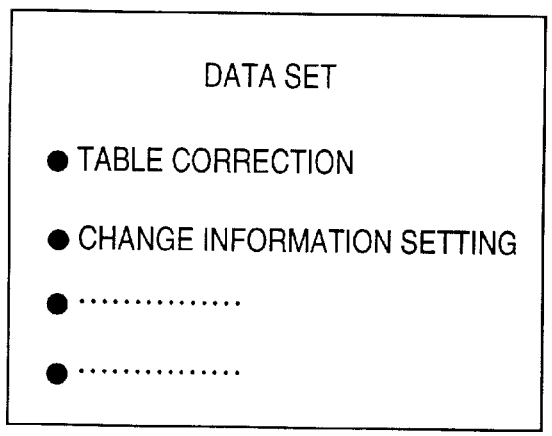
FIGS. 59 and 60 are a screen of a user interface of the navigation system according to the sixth embodiment.
Figure 60:
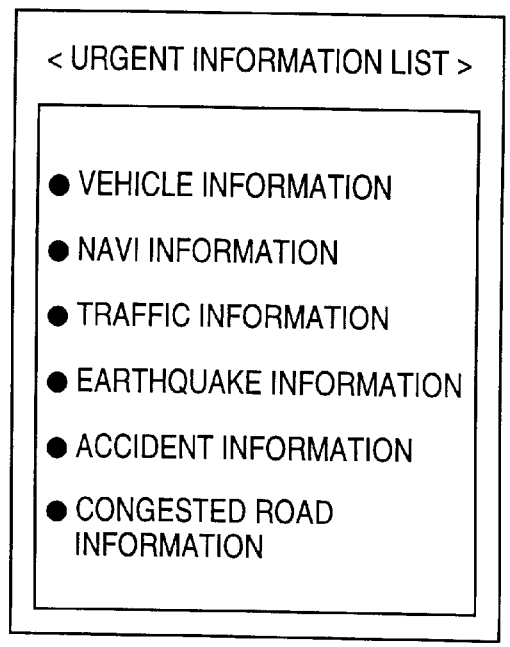

FIG. 59 shows a user interface for the designation. More specifically, when a driver selects "Change Information Setting" on the screen of the display 8 (FIG. 59), a screen shown in FIG. 60 appears, where information currently selected as "urgent information" will be indicated by a black circle ● and information which can be selected as "urgent information" will be by a white circle ○. When a user wishes to add some information to "urgent information," the user selects the white circle ○ of the information with an operating device. When the user wishes to delete some information from "urgent information," the user selects the black circle ● of the information with the operating device. By the above operation, the black circle ● changes to white circle ○ or vice versa, and the user is able to confirm that the information is selected/deleted as "urgent information."

Most of the control performed by the sixth embodiment utilizes the control steps according to the third embodiment.

For such information registered as "urgent information," KND=1 is registered as a type of information. KND=1 is read in step S1806 in FIG. 38, and processed as exceptional data in step S1808, whereby quickly and surely offered to a driver.

Figure 77:
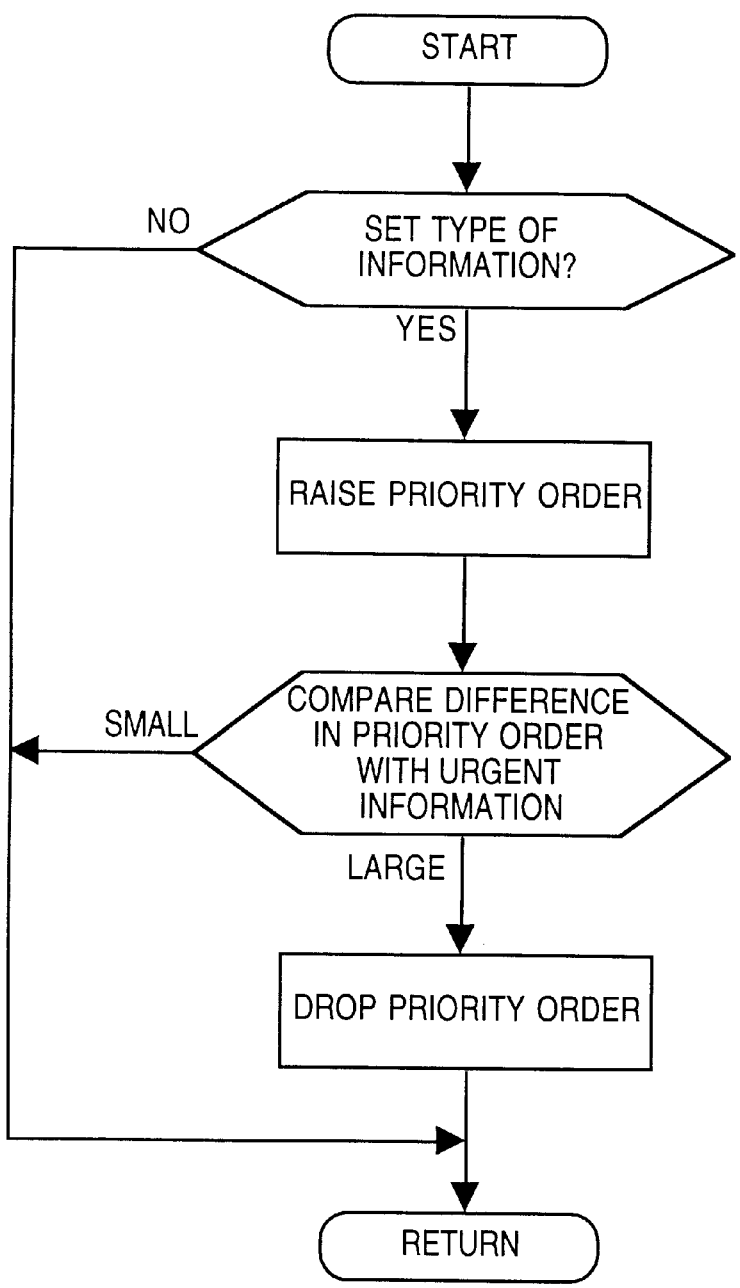
FIG. 77 is a flowchart where the controlling of the sixth embodiment is partially modified.

As described above, sixth embodiment handles information designated by a user as "urgent information" in addition to the innate "urgent information." As modified example of the sixth embodiment, for instance, the following process may be performed. That is, difference is calculated between the priority order of the innate urgent information and the priority order of information in question. If the difference is less than a predetermined value (e.g. 2), the information in question is forcibly set as "urgent", as shown in FIG. 77.

Seventh Embodiment

Automatic Change of Priority

According to the first to sixth embodiments, the priority and the like (priority PR and rank RK) are set in advance in the system. When a user wishes to change values of the priority and the like (priority PR and rank RK), the user interface screen for changing priority/rank is displayed. In other words, priority is substantially half-fixed. The reason for half-fixed priority is that changing values of priority leads to change in the logic. It is not desirable to make the user concern about the logic. On the other hand, it is not preferable to have fixed priority in traffic conditions where running states vary momentarily.

Thus, in the seventh embodiment, the system automatically changes priority (PR and RK) within a predetermined range which is determined to be appropriate, while taking changes of running state into consideration.

FIG. 61 is a table on the logic used in the seventh embodiment for changing the priority and the like (priority PR and rank RK).

Figures 62, 63:
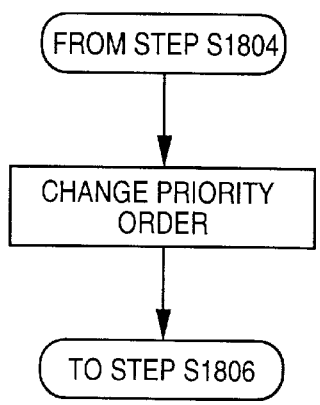
FIG. 62 is a flowchart showing a part of control steps of navigation system according to the seventh embodiment.
FIG. 63 is a table used in controlling of the seventh modified example (modification of the seventh embodiment)

Control performed by the seventh embodiment utilizes most of the control steps of the third embodiment. FIG. 62 shows only the steps different from the control steps of the third embodiment. By adding the control step S2000 (FIG. 62) between steps S1804 and S1806 (FIG. 38), the control operation of the seventh embodiment is realized. By such control steps, the system according to the seventh embodiment performs, in step S2000, correction of the priority order which satisfies the rules in FIG. 61, on the basis of various data read in step S1804 (FIG. 38). In step S1806, classification value CL and the limitation in number of times of continuous output LMT are read in addition to the priority PR corrected in step S2000. Then in step S1810, the routine "processing corresponding to priority" is performed in accordance with the correction value.

Conditions of correction in FIG. 61 are as follows: correction to raise the priority order of vehicle trouble information in a case where a problem suddenly occurs in the vehicle, correction to raise the priority order of VICS information while driving a highway, correction to raise the priority order of weather information while driving a mountain road (detected by a barometer) or driving in rain (detected by wiper being activated), correction to lower the priority order of information having high-level noise or information which has passed for a long time since the time of input, correction to lower the priority order of VICS information related to directions different from destination, and the like.

As set forth above, according to the seventh embodiment, priority orders are determined in detail so that the most appropriate information offer is realized while taking into account of current running state and characteristics of information.

The technique of changing priority orders according to the seventh embodiment can be applied not only to the third embodiment but also to the first to sixth embodiments.

The above-described automatic change of priority orders can also be effectively applied during the presentation of route guidance.

More specifically, during route guidance, the navigation controller of the navigation system notifies the driver each time the vehicle approaches one of plural route guidance points, so that a driver is able to confirm that he/she is correctly heading toward the destination. In other words, the driver expects to receive some amount of information near the route guidance points. However, in locations other than the route guidance points, the driver does not expect any information, thus feels uncomfortable when provided with excessive amount of information.

Figure 78:
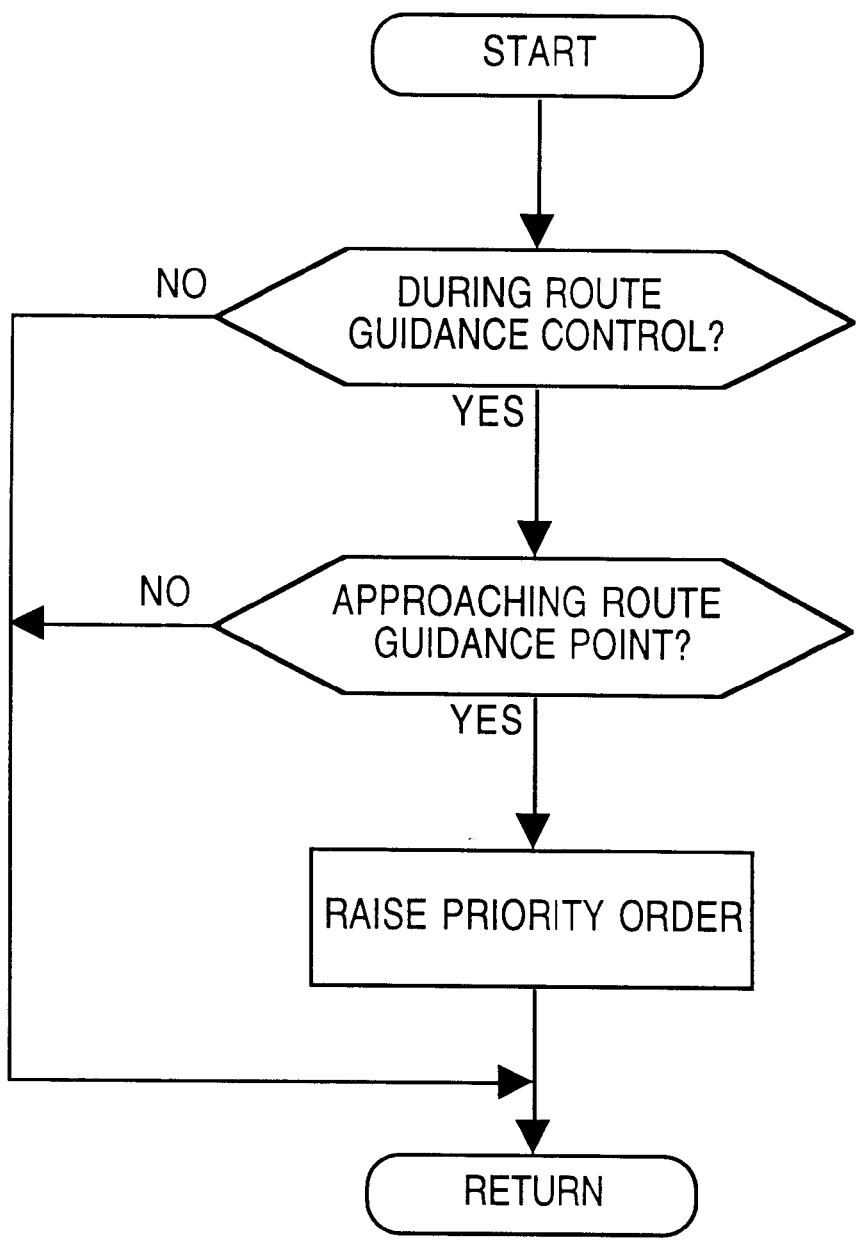
FIG. 78 is a flowchart where the controlling of the seventh embodiment is partially modified.

To cope with such situation, the navigation controller 17 according to the seventh embodiment sends NAVI information to the centralized control unit of the seventh embodiment in accordance with the control steps shown in FIG. 78, while adding a priority order to the NAVI information. As shown in FIG. 78, the NAVI controller 17 confirms whether or not route guidance control is being performed. If the route guidance control is performed while the vehicle is near (within a radius of a predetermined distance) one of the route guidance points, the priority order of the NAVI information is raised.

Meanwhile, with respect to other information sent by a medium besides NAVI information, if the route guidance control is performed while the vehicle is near one of the route guidance points, the priority order of the information, e.g. news or the like, may be lowered.

Accordingly, NAVI information is prioritized when a vehicle is near the route guidance point, and priority orders of information other than NAVI information are lowered. Therefore, information truly necessary for a driver is provided.

Modification of Seventh Embodiment

Seventh Modified Example (Deleting Outdated Data)

Depending on running speed of a vehicle, information such as traffic information or the like may be inputted many times while driving a short distance. Such repetition of input may bother a driver.

To cope with such situation, the seventh modified example lowers the priority order of data which has the same contents as that of already-inputted data. As a result, a situation where the same information is repeatedly offered to a driver, is prevented. The seventh modified example is particularly effective for data transmitted in the form of character or text because such data is relatively easy to make determination of its contents. By lowering the priority order of the character data or text data having outdated contents, probability of such data being provided to a driver (on a display or as audio information) will relatively decrease. Furthermore, since the multimedia navigation system outputs character data by converting the data into audio information, restraining such outdated information from being displayed or being outputted as audio information, will reduce the driver's uncomfortable feeling.

Figure 64:
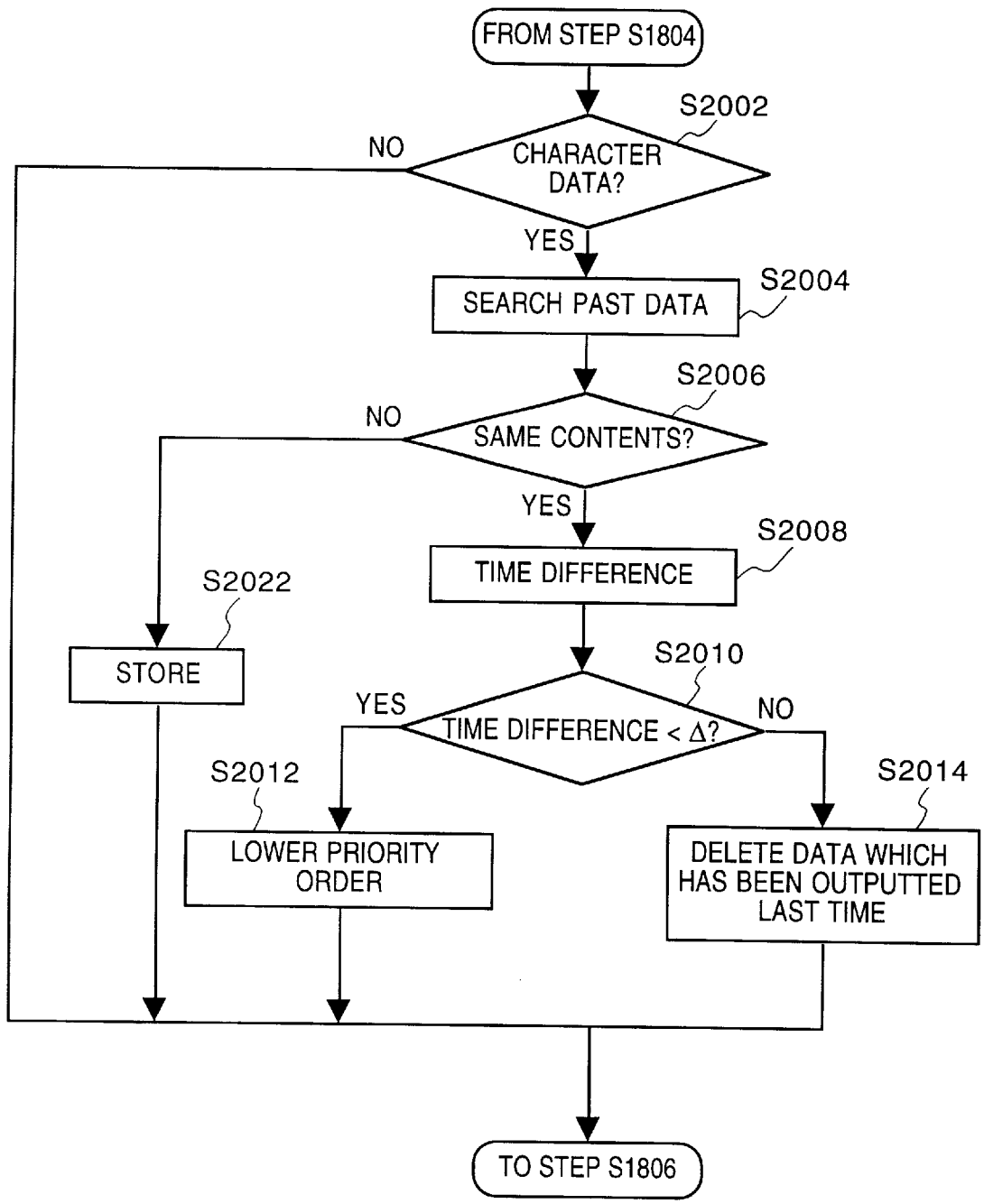
FIG. 64 is a flowchart showing a part of control steps of the seventh modified example (modification of the seventh embodiment)

The seventh modified example also employs a part of the control steps of the third embodiment. More specifically, control steps shown in FIG. 64 is added between the steps S1804 and S1806 of the control steps shown in FIG. 38. In addition, a storage area as shown in FIG. 63 is prepared in the seventh modified example. In the storage area, time at which character data is inputted, the number of times the data is determined to have the same contents, and the contents of the data are stored.

It is determined in step S2002 in FIG. 64 whether or not inputted data is character data. If the inputted data is not character data, the inputted data will not be subjected to determination of whether or not it is outdated. If the inputted data is character data, it is determined in step S2004 whether or not the storage area in FIG. 63 includes data having the same contents as that of the inputted data. If the storage area does not have any data having the same contents, the inputted data is stored in the storage area in FIG. 63. If data having the same contents is found, the time difference is calculated in step S2008. If the time difference is smaller than a predetermined threshold value Δ, it is determined that data having the same contents has been received in a short period of time. Therefore, the priority order of the data is lowered in step S2012. Meanwhile, if the time difference is larger than the predetermined threshold value Δ, it is determined that a long period of time has passed since last received the data. Therefore, the data is deleted from the storage area shown in FIG. 63.

By virtue of the seventh modified example, it is possible to prevent the data, having the same outdated contents, from being repeatedly provided to a driver.

Note that in a case where data having the same contents is inputted for the second time, the data may be displayed on the display 8. Further, when the same data is inputted for the third time, the data may be deleted.

Eighth Embodiment

Preferential Processing According to Data Contents

The eighth embodiment relates to the system which preferentially provides a user, upon receiving information from teletext broadcasting, with only data having a particular keyword. More specifically, since teletext broadcasting provides text data, a driver is forced to pay attention to the display when text data is displayed. On the other hand, because the data being inputted is text data, a particular keyword can be easily searched for. The eighth embodiment is provided making use of the above characteristics.

Figure 65:
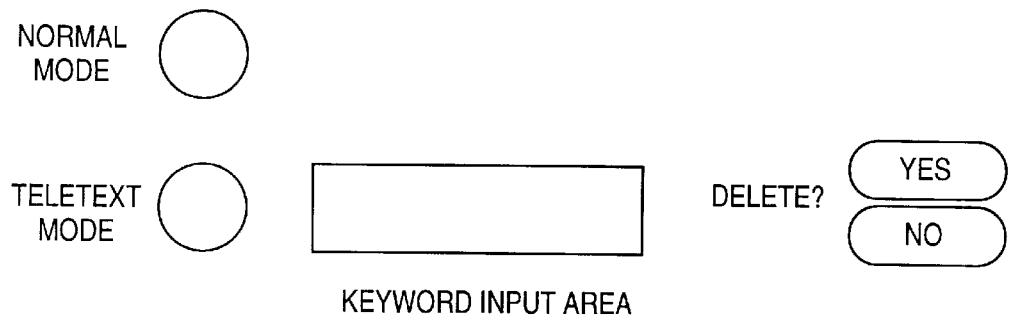
FIG. 65 is a screen view of a user interface used in the navigation system according to the eighth embodiment.

According to the navigation system of the eighth embodiment, a user interface such as that shown in FIG. 65 is displayed on the display 8, thereby allowing a user to select either a normal mode or a teletext mode. When the teletext mode is selected, the system allows the user to input a keyword which is to be searched for in the received teletext data. Furthermore, the system allows the user to select either to delete received teletext data which does not include the keyword (YES in FIG. 65) or to display the data as text data (NO in FIG. 65).

Figure 66:
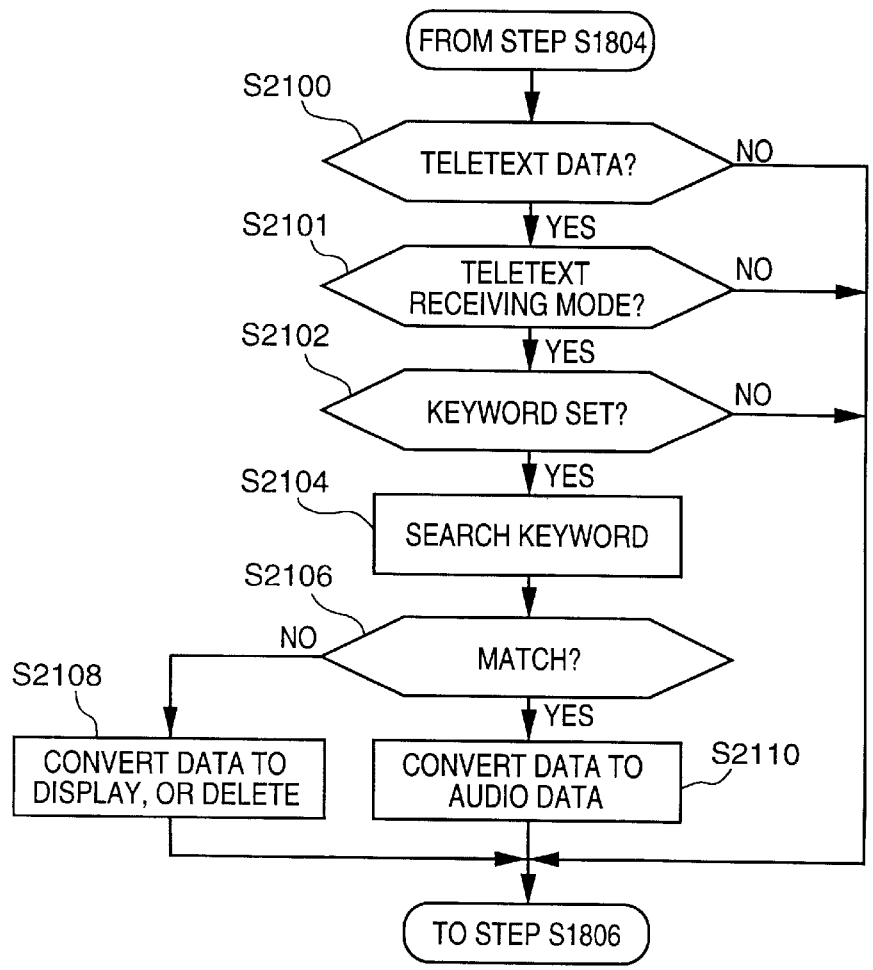
FIG. 66 is a flowchart showing a part of control steps of the navigation system according to the eighth embodiment.

The control steps of the eighth embodiment employs the control steps of the third embodiment. In other words, a part of the flowchart in FIG. 38 (steps S1804 to S1806) is changed as shown in FIG. 66.

When data is inputted, it is determined in step S2100 whether or not the inputted data is teletext data. In step S2101, it is determined whether or not the teletext mode is set. If the mode is set, it is determined in step S2102 whether or not a keyword is set. If a keyword is set, the system searches for the keyword in the received data in step S2104.

If data including the keyword is found, the data is converted to audio information in step S2110. The data converted to audio information is processed in the similar manner to other data in accordance with the control steps described with reference to the third embodiment. If data including the keyword is not found, the data is processed to be displayed on a display 8 or is deleted, in accordance with the aforementioned setting switch (YES/NO in FIG. 65).

Note that teletext broadcasting is classified by genre "sports information," "weather information" and "event information" in the present embodiment. Thus, a user inputs a particular keyword in the genre, for instance, a favorite sports team or a player, or a name of place for weather information, a name of event or the like.

According to the control steps of the eighth embodiment, only the information which interests the driver (matched with keyword) is provided as audio information so that the driver easily recognizes the data. Other data which does not match the keyword is deleted or displayed on the display 8 so that the information offer does not bother the driver.

Ninth Embodiment

Controlling Interval of Information Offer

In a case where audio information is frequently provided to a driver, the interval of audio information output is also an important factor of driver's concern. Thus, the system according to the ninth embodiment controls the interval of information offer. According to the present embodiment, a long interval of information offer is set for conditions (running environment, running state, driving time, mental state) where a small amount of information offer is preferable, and a short interval of information offer is set for the conditions (running environment, running state, driving time, mental state) where a large amount of information offer is preferable. By virtue of the above, the amount of information offer is controlled to a most appropriate amount in a unit of time.

Such controlling in interval of information offer according to the ninth embodiment is also applicable to all the navigation system according to the first to eighth embodiments. The principle of the controlling interval of information offer is now described with reference to FIG. 70.

Figure 70:
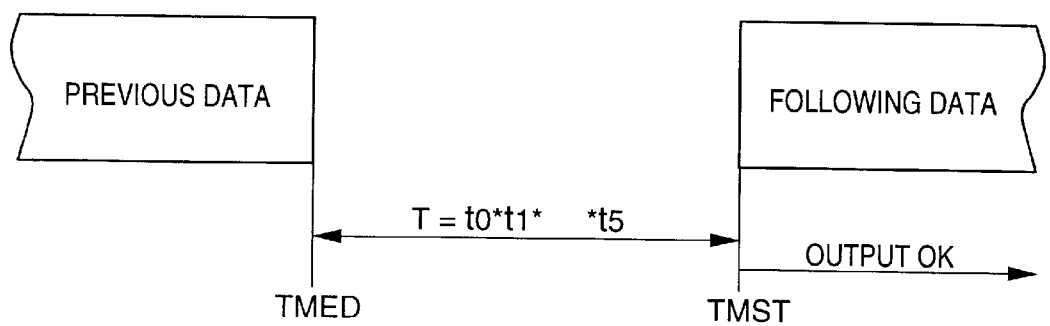
FIG. 70 is a timing chart showing operation of the navigation system according to the ninth embodiment.

Referring to FIG. 70, time T denotes the time interval (minimum value) of information offer which is most appropriate for a driver in the current condition. The beginning of the time interval of time T is the output-completed time (TMED) of the previous data. Therefore, the driver will not feel uncomfortable if the next data is provided after the lapse of TMED+T.

The principle of determining the minimum value of the information offer interval T will be described with reference to FIGS. 71A to 71F.

According to FIGS. 71A to 71F, the information offer interval T is defined by the equation below:

$$\text{information offer interval } T = t0 \times t1 \times t2 \times t3 \times t4 \times t5$$

Herein, the time t0 is the basic value of information offer interval which is determined according to vehicle speed.

Figure 71A:
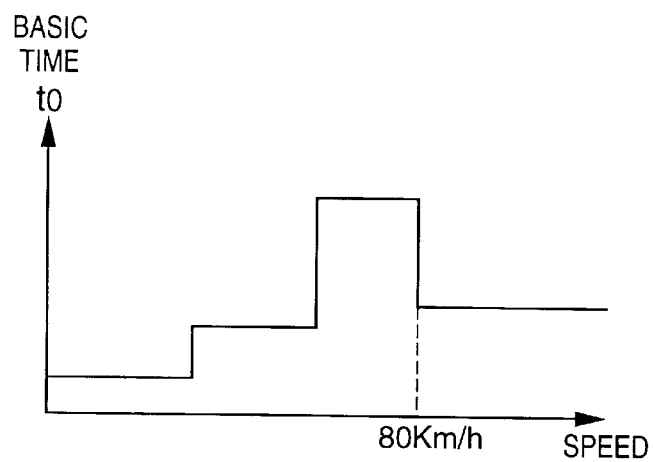
FIGS. 71A–71F are graphs for explaining the principle of calculating a time interval in the navigation system according to the ninth embodiment.

Generally speaking, the time interval should be shortened as the vehicle speed rises. However, in a case the vehicle safely runs on a highway, even though the vehicle speed is high, it would not be so problematic to provide a large amount of information. Thus as shown in FIG. 71A, the value of t0 is set small when the vehicle speed is above 80 km/h.

t1, t2, t3, t4 and t5 are respectively a correction coefficient.

Figure 71B:
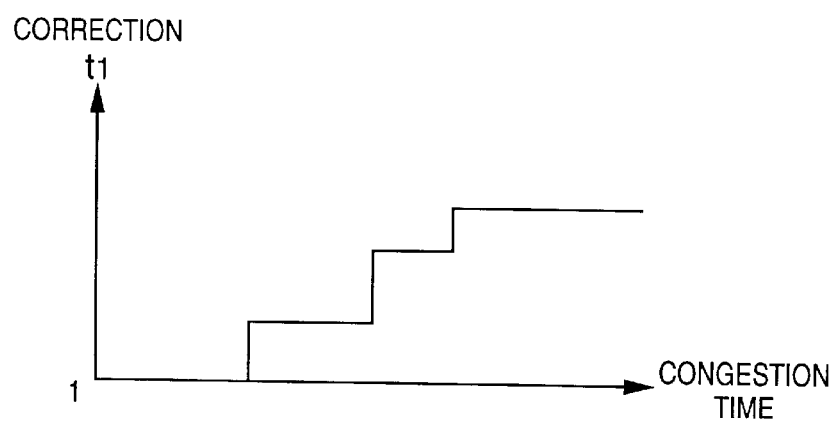

Referring to FIG. 71B, the correction coefficient t1 is set as a larger value as congestion on the road becomes serious. This is because a small amount of information offer is preferable while driving a congested road.

Figure 71C:

Referring to FIG. 71C, the correction coefficient t2 is set as a smaller value as the roads become more complicated. This is because a driver necessitates a larger amount of information in an area where roads are complicated.

Figure 71D:
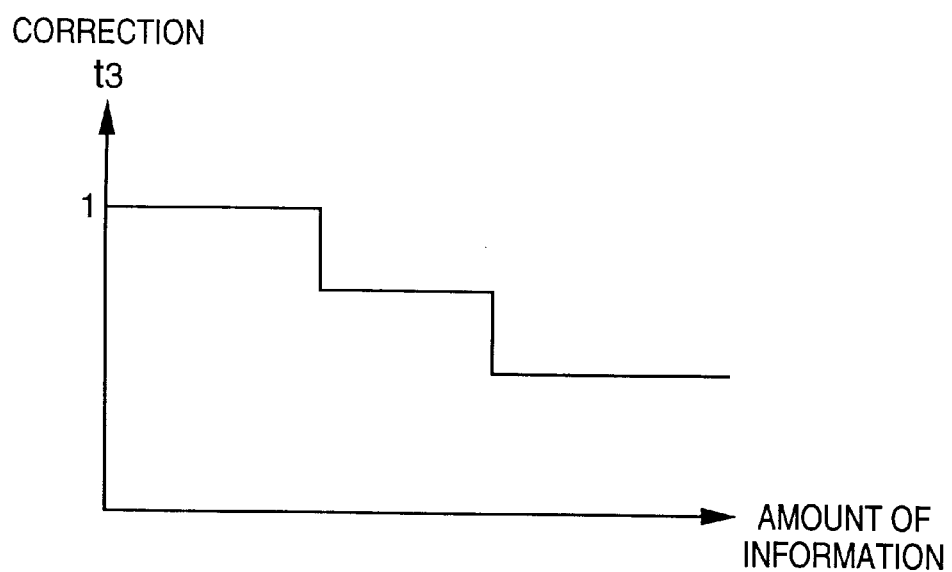

Referring to FIG. 71D, the correction coefficient t3 is set as a smaller value as there are a larger amount of information to be offered to a driver. When there are a large amount of information to be offered, a driver tends to necessitate a relatively larger amount of information.

Figure 71E:
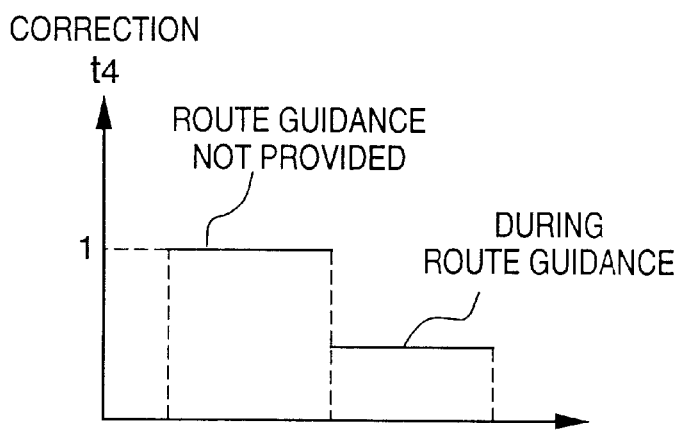

Referring to FIG. 71E, the correction coefficient t4 is set as a smaller value when navigation system is operating, and set as a larger value when the navigation system is not operating. This is because the driver desires navigation information when the navigation system is operating.

Figure 71F:
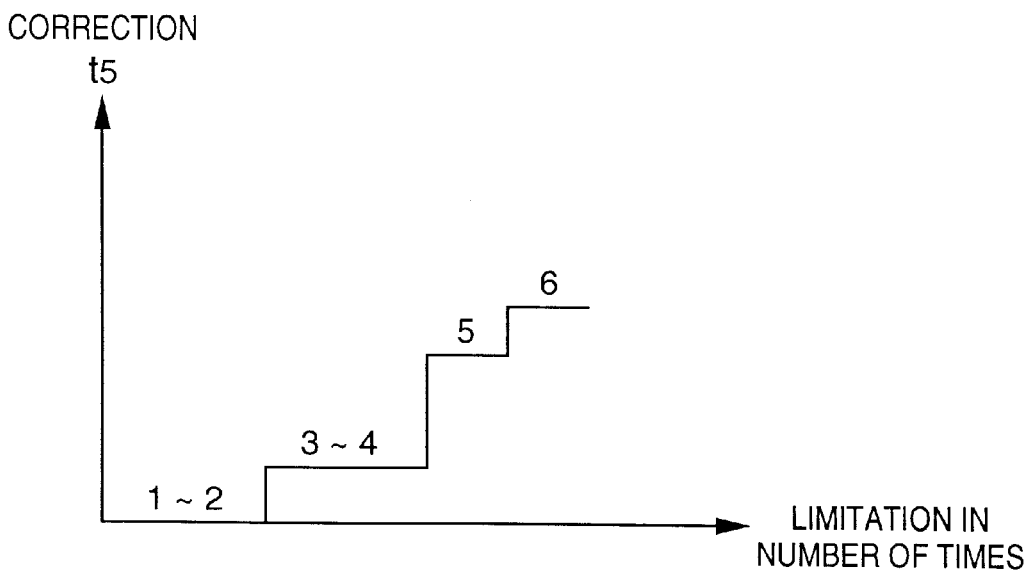

Referring to FIG. 71F, the correction coefficient t5 is set as a larger value as the limitation LMT in number of times of continuous data output (see FIG. 21) becomes larger. As apparent from FIG. 21, the limitation in number of times LMT is set as a smaller value as the driving condition requires more operation to the driver. The more the driving state is close to the normal state, the less information may be provided.

Figure 72:
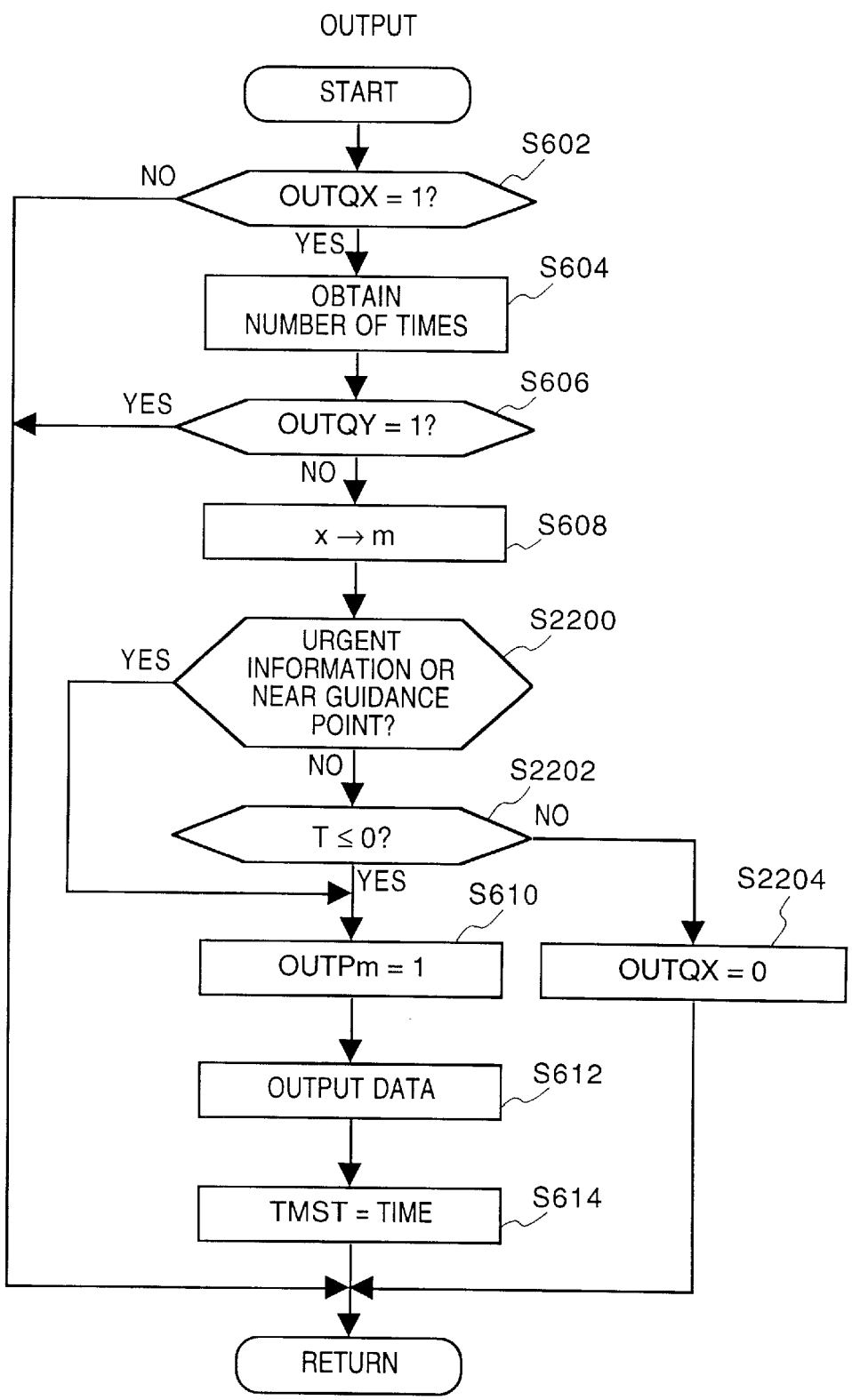
FIG. 72 is a flowchart showing a part of control steps of the navigation system according to the ninth embodiment.
Figure 73:
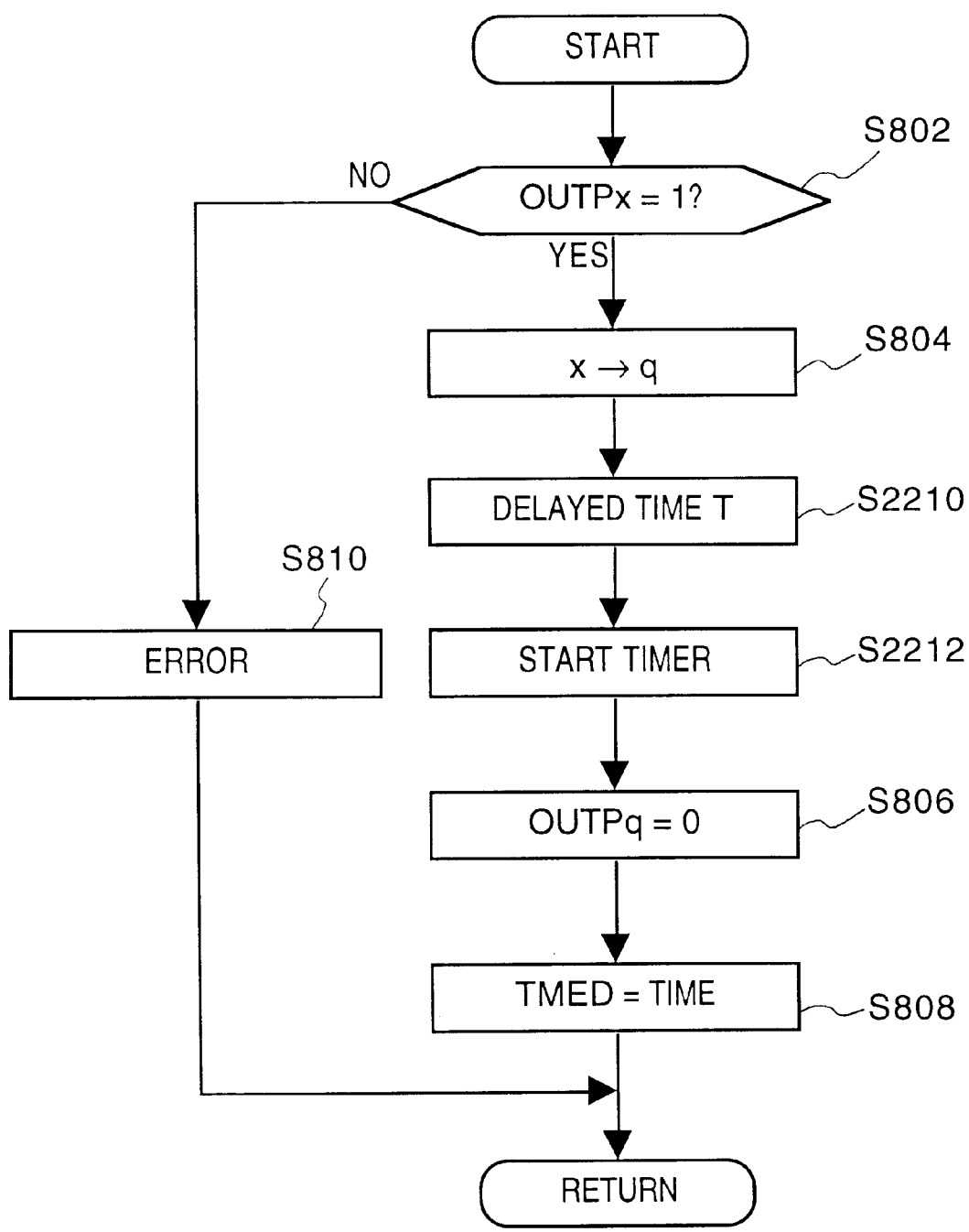
FIG. 73 is a flowchart showing a part of control steps of navigation system according to the ninth embodiment.

In a case where the above-described control of the information offer interval is applied to the navigation system of the first to eighth embodiments, changes are necessary in the control steps as shown in FIGS. 72 and 73.

Assuming a case where the above-described ninth embodiment is applied to the first embodiment, FIGS. 72 and 73 respectively show the "output" routine (first embodiment, FIG. 19) and "complete output" routine (first embodiment FIG. 20) for the ninth embodiment.

As explained with reference to FIG. 70, when output of the previous data is completed, a delayed time T (interval of information offer) is calculated in step S2210 in FIG. 73 in accordance with FIGS. 71A to 71F. In step S2212, the time T is set at a timer.

Then, when audio information (e.g. data k) is inputted, the determination control of whether or not information is to be offered to a driver and the priority order of information offer, described with reference to the first to eighth embodiments, is performed. Then, an output queue (OUTQk=1) is set for the audio information k (e.g. step S554 in FIG. 18). Referring to the "output" routine in FIG. 72, it is determined in step S2200 whether the audio information k is urgent information (KND=1) or whether the current position is near a route guidance point (e.g. junction) of the navigation system. This is because output of urgent information (KND=1) should not be delayed, and because the driver necessitates a larger amount of information near a route guidance point.

In a case where the audio information k is not urgent information and the current position is not near a route guidance point of the navigation system, it is determined in step S2202 whether the time set at the timer in step S2212 (FIG. 73) is up. If the set time has not passed, it is too early to offer the audio information k to the driver. Therefore, the output queue of the audio information k is reset (OUTQk=0) in step S2204. By resetting the queue of the audio information k, the system becomes available to output another data having higher priority which may be inputted next.

By controlling the information offer interval as set forth above, an appropriate amount of audio information which corresponds to the current driving condition, is provided to a driver.

Modification of Ninth Embodiment

Eighth Modified Example

Figure 74:
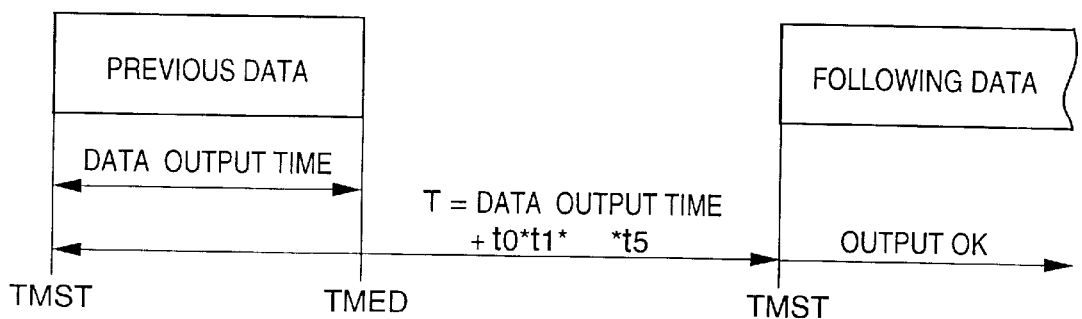
FIG. 74 is an explanatory view for explaining a principle of modification of the control steps in the ninth embodiment.

In the ninth embodiment, the timer T is started each time output of the previous audio information is completed. According to the eighth modified example, the timer T is started each time the output of the previous audio information is started. In this case, the time necessary to output audio information needs to be calculated as shown in FIG. 74.

Tenth Embodiment

Selecting Sound Quality According to Type of Information

The tenth embodiment relates to an improved form of audio information output which is applicable to the aforementioned navigation system according to first to eighth embodiments.

The tenth embodiment is provided in view of the fact that particularly an excessive amount of audio information bothers a driver. The tenth embodiment suggests to output the audio information with different sound quality or volume, in accordance with the current condition.

Figure 75:
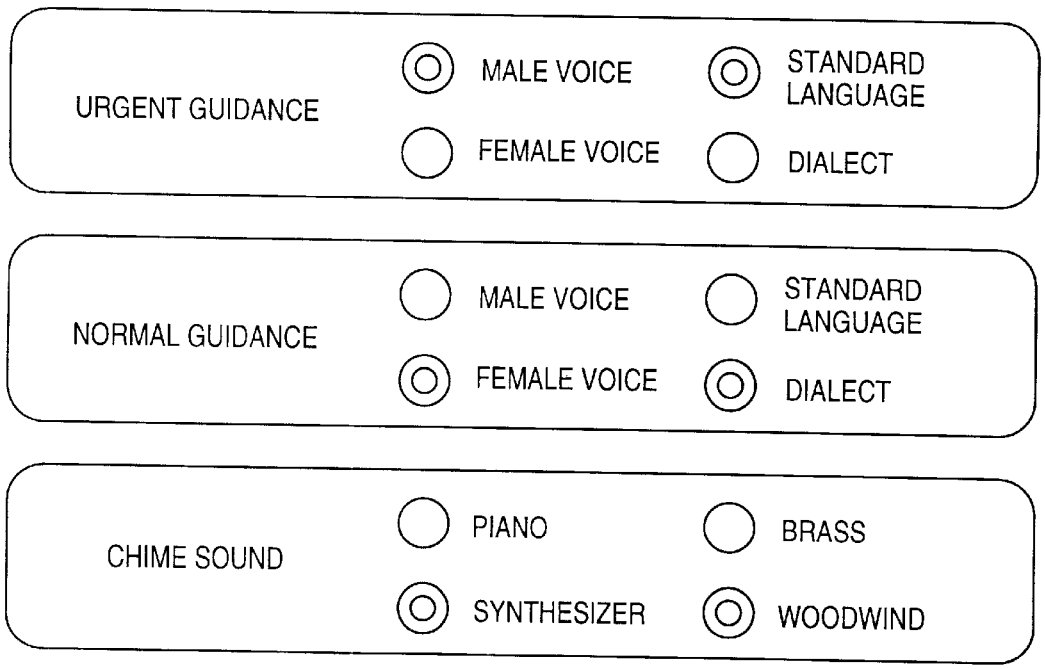
FIG. 75 is a screen view of a user interface used in the navigation system according to the tenth embodiment.

FIG. 75 shows as an example a display screen of a user interface where the form of audio information output is set. In the tenth embodiment, sound quality and volume are set according to types of guidance information: "warning information," "route guide information," "traffic information," "facility guide information," "highway guide information," "current position information," "running environment," "driving time," "driving time zone" and "driving area." With respect to a type of information which requires driver's attention, tense voice is set and information is provided in a tone of command. On the other hand, in a driving condition where the driver should be relaxed, for instance, soft female voice is set and information is provided in a tone of guidance.

The centralized control unit 2 of the system according to the present embodiments (first to tenth) comprises a ROM capable of storing voice-synthesizing data for vocalizing character codes of audio information in either female or male voice. In addition, the control unit includes ROM for storing grammar rules so that the tone of voice can be changed between "tone of command" and "tone of guidance."

Figure 19:
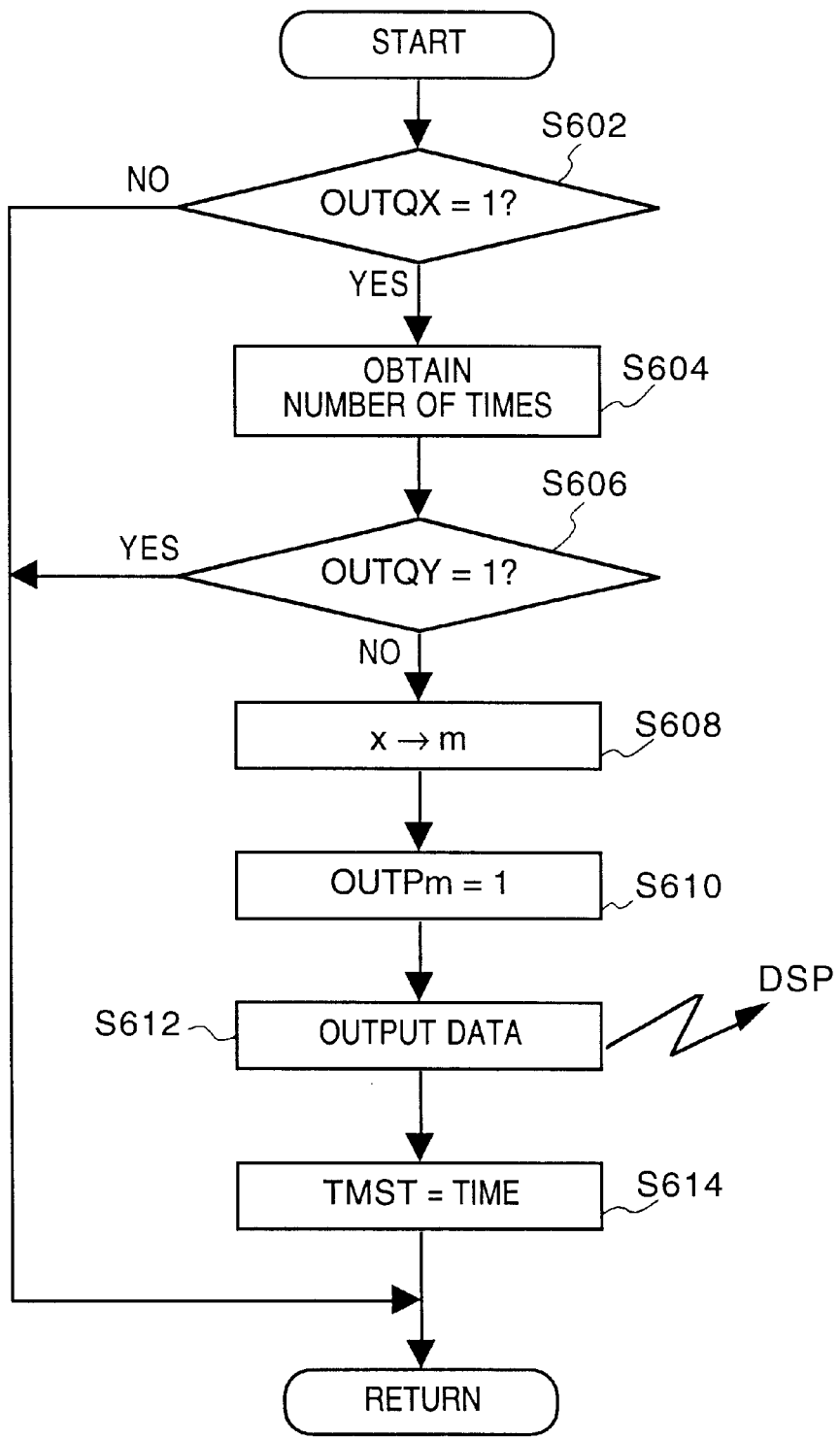
FIG. 19 is a flowchart showing an "output" routine in control steps of the navigation system according to the first embodiment.
Figure 20:
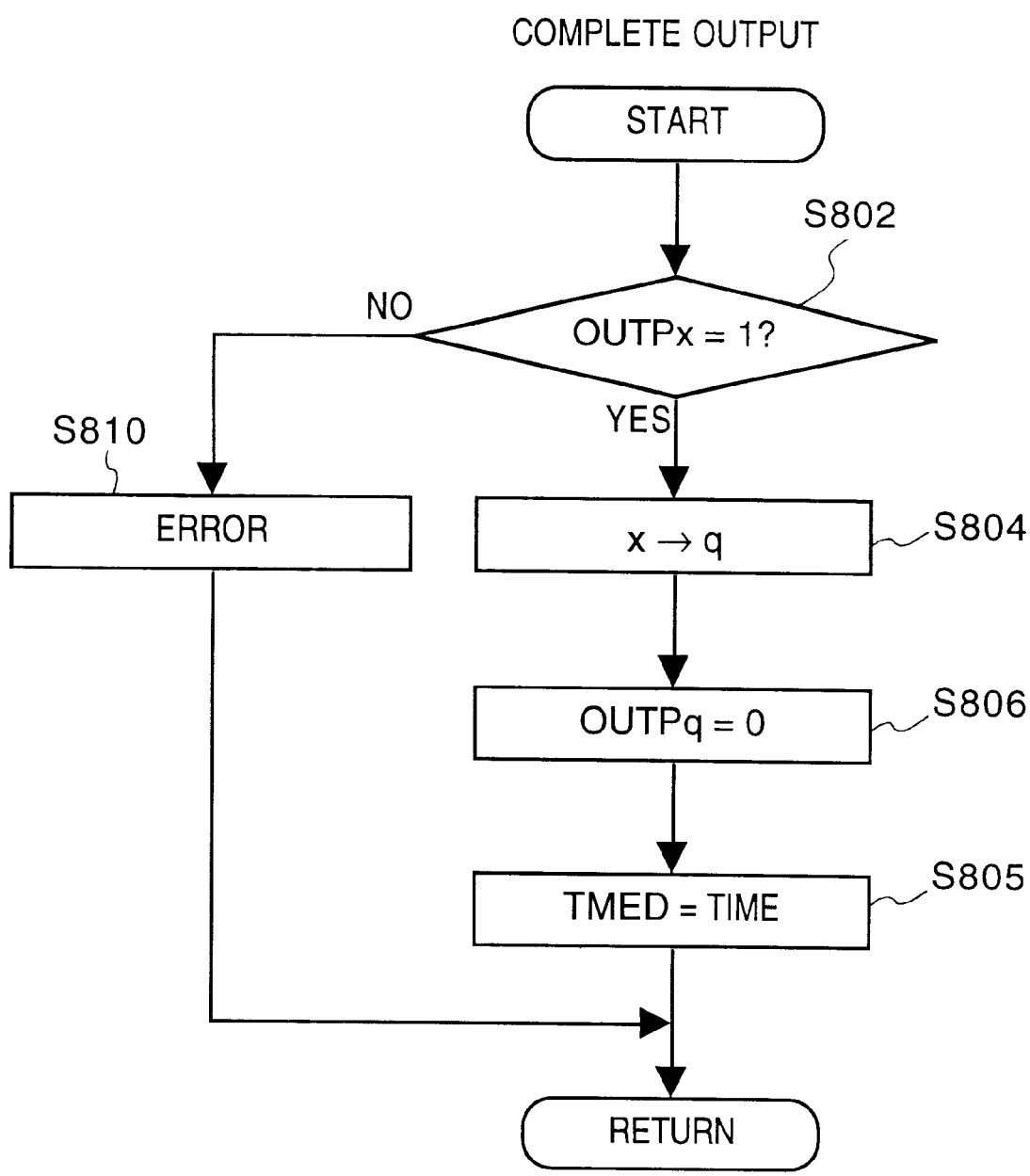
FIG. 20 is a flowchart showing an "output complete" routine in control steps of the navigation system according to the first embodiment.

If control of the tenth embodiment is to be applied to the first embodiment, the aforementioned control of converting audio information is executed in the "output" routine in FIG. 19.

Eleventh Embodiment

Outputting Information from Appropriate Medium

The present navigation system includes the head-up display, display 8, an audio information output channel and various other means (means of providing information to a driver), in addition to various media as a source of multimedia information.

According to the foregoing first to tenth embodiments, information offer (audio information) to a driver is controlled by determining appropriateness of the information offer as well as the order of priority for information offer. According to the eleventh embodiment, a medium to which data is to be outputted is selectively used, whereby controlling the information offer to a driver.

FIG. 80 is a logic table ("table for determining audio information output destination") for determining the medium to which audio information is to be outputted on the basis of the "urgent level" which is determined based on the running state and conditions, and the "priority rank RK" of the data itself. The eleventh embodiment is characterized in that a user is able to select the determination logic. FIG. 79 is a table ("definition table of menu-setting permission") defining the areas where a user is allowed to take part in determination.

Referring to the definition table of menu-setting permission in FIG. 79, an area where user can define is indicated by hatching to be distinguished from areas where user cannot define, for descriptive convenience.

Hereinafter, the urgent level in the eleventh embodiment will be described.

The urgent level is, as similar to the foregoing embodiments, an index to express a level of urgency of information based on various aspects other than the information itself. In the present embodiment, the urgent level is defined as shown in the table in FIG. 81. It is defined that the smaller the value of the urgent level, the higher the urgency. Note that most states shown in FIG. 81 are determined by various sensors shown in FIG. 2. For instance, "prediction of large curvature on the road" in the first column of the table in FIG. 81 can be determined on the basis of information sent by the NAVI controller, e.g. information notifying that the vehicle is approaching a curve.

Referring to the table in FIG. 80, the sign X denotes that information is not offered. According to the "table for determining audio information output destination" in FIG. 80, the lower the priority rank RK (indicative of urgency of data itself) is, and the higher the urgent level as a running state (vertical column of the table in FIG. 80) is, the necessity to provide such data is low. Thus, such data is not provided to the driver as audio information or not displayed on a display. For instance, when priority rank RK=E and urgent level LVL=1, data is not outputted. On the other hand, the higher the priority rank RK of data itself is, and the lower the urgent level as a running state is, the necessity to provide such data is high. Therefore, such audio information has a wider selection for output destination. For instance, when priority rank RK=A or B and urgent level LVL=4, the data can be outputted as audio information or displayed on a display (display 8 or head-up display).

As set forth above, the output destination of audio information is selected in accordance with running state of a vehicle. Accordingly, appropriate information can be provided to a driver in appropriate timing.

Twelfth Embodiment

Determining Information Offer Sequence by Switch

According to the navigation system of the first to eleventh embodiments, the order of information offer is determined in accordance with orders of data input and the priority relationship between the data. Since there is no association between the order of information offer and the order of data input, it is difficult to predict orders of information offer.

The twelfth embodiment enables a user to control the order of information offer in a case where a plurality of data are successively inputted.

For the descriptive convenience for describing the operation of the twelfth embodiment, it is assumed herein that the navigation system of the twelfth embodiment receives the following types of information: "warning information," "route guide information," "facility guide information," "highway guide information," "traffic information" and "current position information." These information are "guide information" for the driver. Environment conditions which become the base of these information is detected by various environment detecting means exemplified in FIG. 83. When warning indicative of a small amount of remaining fuel is issued, what the driver needs is a series of guide information to deal with the warning. FIG. 84 shows examples of such guide information. In other words, it is preferable for the driver to be provided with the guide information in a logical series of sequence to deal with the warning. More specifically, if facility guide information is provided before warning information, the driver must take time to figure out why the facility guide information is being offered. It is difficult for the driver to think such matter while driving. In the navigation system of the twelfth embodiment, the order of information offer is designated by using a user interface shown in FIG. 85. In FIG. 85, the priority order of information offer is specified by a user. Thus, the designation of information offering order designated by a user can be applied to the navigation system of the aforementioned first to eleventh embodiments since all the navigation systems utilize the "priority order." While the navigation systems according to the first to eleventh embodiments determine the priority order on the basis of a level of importance or a level of urgency, the system of the twelfth embodiment determines the priority order such that a sequence of information offer makes sense to the driver.

FIG. 85 shows the user interface for setting the priority order of guidance information offer. If the user selects the "default mode," a predetermined order set in advance in the system is used. If the user selects the "selection mode," the user is able to input priority orders. In FIG. 85, the priority orders as follows are set: "current position information"→"route guide information"→"traffic information"→"warning information"→"highway guide information"→"facility guide information."

As types of information, the twelfth embodiment handles or necessitates "warning information," "route guide information," "facility guide information," "highway guide information," "traffic information" and "current position information." Occurrence of these information can be detected by the various sensors shown in FIG. 83 as follows:

A: Occurrence of warning information is determined by whether or not there is warning information;
B: Occurrence of route guide information is determined by whether or not route guidance is performed;
C: Occurrence of facility guide information is determined by whether the vehicle runs near a destination point or route guidance point while route guidance is being provided;
D: Occurrence of highway guide information is determined by whether or not the vehicle is running on highway;
E: Occurrence of traffic information is determined by whether or not there is congestion or accident on the road the vehicle is running;
F: Occurrence of current position information is determined by whether or not the vehicle is running an area where driving frequency is low.

Figure 86:
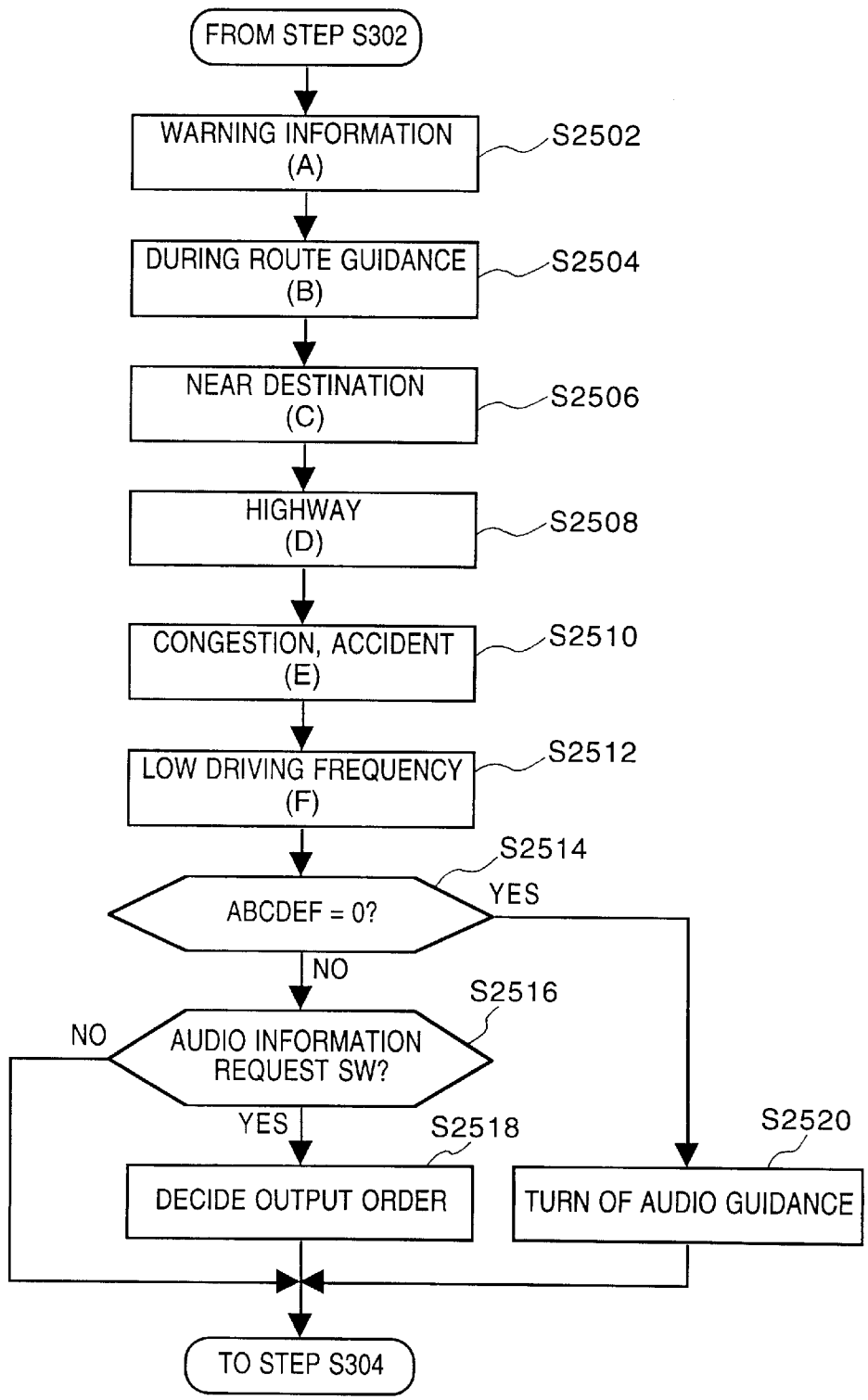
FIG. 86 is a flowchart showing a part of control steps of the twelfth embodiment.

The flowchart in FIG. 86 shows the control steps of the twelfth embodiment. The control steps is performed to output the priority order PR. In a case where the control of the twelfth embodiment is applied to the control of the first to eleventh embodiments, the control steps shown in FIG. 86 should be added between the steps S302 and S304 of the first embodiment.

More specifically, the above-described determination A to F is performed in steps S2502–S2512. The result of determination is expressed as data having six bits (ABCDEF= xxxxxx). If the data value is 0, i.e. if all bits are OFF, there is no necessity to output guidance information. Thus, audio guidance is turned off in step S2520.

Meanwhile, if one of the six bits is ON, i.e. if there is necessity to output guidance information, determination in step S2514 proceeds to NO. In step S2516, it is determined whether the audio information request SW (see FIG. 3C) is depressed. If it is depressed, the priority order is generated in accordance with the user's setting in FIG. 85.

FIG. 82 shows that since data having six bits (ABCDEF) may have twenty-one patterns, six types of guidance information are set in twenty-one different orders. For instance, when ABCDEF=100011, i.e., when "warning information," "traffic information" and "current position information" are detected, since priority orders "4," "3" and "1" are respectively set for these information (FIG. 85), the order of information offer is respectively "1," "3" and "2" as shown in FIG. 82.

As set forth above, the navigation system according to the twelfth embodiment enables a driver to set orders of information offer which is appropriate for his/her purpose. Thus, when a plurality of information are provided to a driver in a sequence, the driver can easily understand the plurality of guidance information because the sequence bases upon a logic set by the driver. In other words, perfected and easy-to-operate navigation system is realized.

Thirteenth Embodiment

Information During Intermission of Music

According to the thirteenth embodiment, information is provided to a driver during intermission of music in order not to bother a driver by cutting off the music.

Figure 87:
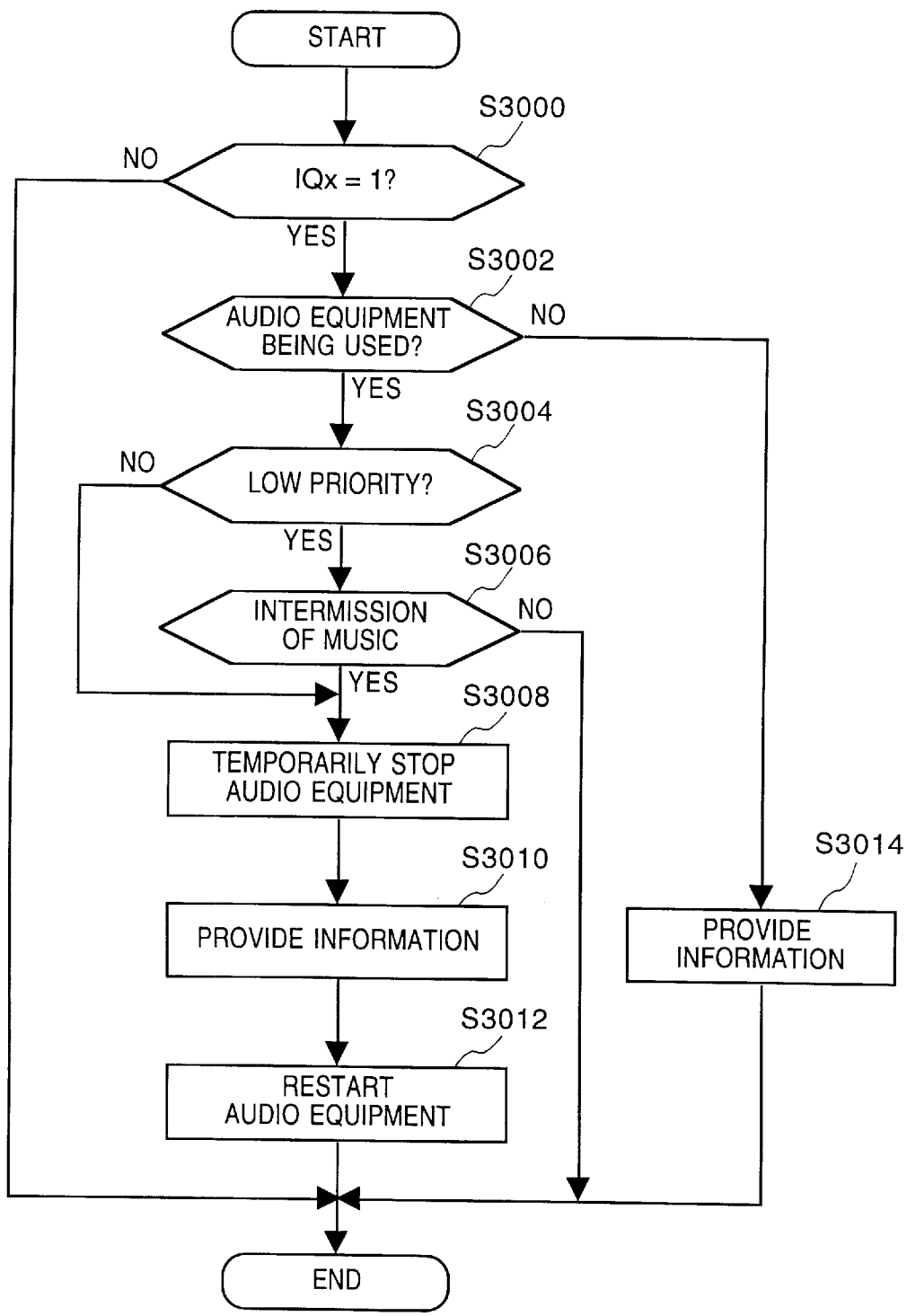
FIG. 87 is a flowchart showing control steps according to the thirteenth embodiment.

FIG. 87 is a flowchart showing control steps of the thirteenth embodiment.

In step S3000, data input in a queue is detected. It is determined in step S3002 whether or not an audio equipment is being used. If it is not used, information is offered in step S3014.

If the audio equipment is not used, a priority order of the inputted data is determined in step S3004.

Steps S3008 to S3012 are control steps for providing information while stopping the audio equipment. More specifically, in step S3008, the audio equipment is temporarily stopped; in step S3010, information is provided; and in step S3012, the audio equipment is started again.

The above-described control steps for providing information while stopping the audio equipment are performed when inputted data having a high priority order is found in step S3004, or when intermission of music is found in step S3006.

Particularly during the intermission of music, output of the audio equipment is temporarily stopped although the audio equipment is performing its operation. Therefore, information having a relatively low priority may be outputted.

Note that information to be provided during intermission of music must have relatively low priority, because once the following music starts, the information will not be provided until that music ends. For this reason, it is important to set in advance the information to be provided while interrupting a music played on the audio equipment (NO in step S3004) and the information to be provided during intermission of music (YES in step S3004), by utilizing various user interfaces of the foregoing embodiments (e.g., interface shown in FIG. 85 used in the twelfth embodiment).

The present invention is not limited to the above embodiments and various changes and modifications can be made within the spirit and scope of the present invention. Therefore, to appraise the public of the scope of the present invention, the following claims are made.

What is claimed is:

1. A navigation apparatus for providing a driver with different types of information, comprising:

means for allocating a priority order, indicative of priority for information provision in accordance with a type of inputted information and a travel classification indicative of at least one of running state, driving purpose and running environment, to inputted information;

means for changing a value of the travel classification in accordance with a change in at least one of the running state, driving purpose and running environment in a case where the at least one of the running state, driving purpose and running environment changes;

means for selecting a first type of inputted information having a higher priority order than a second type of inputted information in a case where types of the first and second types are different from each other;

means for providing the driver with the selected first type of inputted information; and determining means for determining, after the selected first type of inputted information is provided, whether or not the unselected type of second type of inputted information is to be provided in accordance with a travel classification of the unselected second type of inputted information.

2. The navigation apparatus according to claim 1, wherein a priority order is set to correspond to a medium which conveys information.

3. The navigation apparatus according to claim 1, further comprising means for allowing the driver to change a priority order.

4. The navigation apparatus according to claim 1, wherein the priority order is prescribed in accordance with a running state of a vehicle.

5. The navigation apparatus according to claim 4, wherein the priority order is changed in accordance with change in the running state of a vehicle.

6. The navigation apparatus according to claim 4, wherein the priority order is prescribed in accordance with running environment of a vehicle.

7. The navigation apparatus according to claim 6, wherein the priority order is changed in accordance with change in running environment of a vehicle.

8. The navigation apparatus according to claim 4, wherein the priority order is prescribed in accordance with a driving purpose.

9. The navigation apparatus according to claim 1, wherein the priority order is prescribed in accordance with the type of information.

10. The navigation apparatus according to claim 1, wherein the priority order is prescribed in accordance with a quality of information.

11. The navigation apparatus according to claim 10, wherein in a case where information, having the same information as information of the already inputted information, is inputted, the priority order of the inputted information is set low.

12. The navigation apparatus according to claim 10, wherein a low priority order is given to information received in low reception sensitivity.

13. The navigation apparatus according to claim 1, wherein the information is audio information.

14. The navigation apparatus according to claim 1, wherein the information is information inputted from an arbitrary medium in chronological order.

15. The navigation apparatus according to claim 1, further comprising means for storing a plurality of information to be outputted, wherein said selecting means selects information, which is to be outputted in accordance with the priority order, from the plurality of information stored in the storing means.

16. The navigation apparatus according to claim 1, wherein said allocating means sets a priority order of inputted information to a value according to at least one of running state, driving purpose and running environment.

17. The navigation apparatus according to claim 1, wherein the running state is inclusive of a driving time zone during which the driver is driving, and said allocating means sets the priority order and travelling classification of inputted information to a value according to the driving time zone.

18. The navigation apparatus according to claim 1, wherein the running state is inclusive of a mental state of the driver, and said allocating means sets the priority order and travelling classification of inputted information to a value according to the mental state.

19. A navigation apparatus for providing different types of information, comprising:

means for allocating, to inputted information, a rank indicating a type of the inputted information, and a priority order indicating a priority degree of the inputted information;

means for determining a lower limit value for ranks in accordance with at least one of running state, driving purpose and running environment;

means for changing a value of the lower limit in accordance with a change in at least one of the running state, driving purpose and running environment in a case where at least one of the running state, driving purpose and running environment changes; and means for selecting one or more information allocated with a rank value higher than a lower limit value determined by said determination means, and successively providing the selected one or more information in accordance with values of priority order allocated to said one or more information.

20. The navigation apparatus according to claim 19, wherein the information to be provided is audio information.

21. The navigation apparatus according to claim 19, wherein the value of the rank can be changed.

22. The navigation apparatus according to claim 19, wherein said selecting means selects one or more information which are allocated with one of a plurality of ranks which have a different rank value from each other, in accordance with values of priority order allocated to said one or more information.

23. A navigation apparatus for sequentially providing different types of information inputted successively, comprising:

means for allocating a rank to inputted information in accordance with a type of the inputted information;

means for setting an urgency level indicating a degree of urgency of the inputted information with respect to travelling, the urgency level being set to either one of a highest first, intermediate second and lowest third values in consideration of the allocated rank and at least one of running state, driving purpose and running environment; and control means for allowing a provision of the inputted information suspending the provision of the inputted information until the provision is allowed, and canceling the provision of the inputted information when the set urgency level indicates the highest first, intermediate second and lowest third values, respectively.

24. The navigation apparatus according to claim 23, wherein the information is audio information.

25. The navigation apparatus according to claim 23 further comprising means for determining a lower limit value for ranks in accordance with at least one of running state, driving purpose and running environment, wherein said control means limits information to be provided to ones having a rank smaller than the lower limit value.

26. A navigation apparatus for sequentially providing different types of audio information inputted successively, comprising:

providing means for successively providing inputted audio information to the driver;

means for detecting a time interval between the audio information successively provided by said providing means;

restraining means, operatively connected to said detecting means and said providing means, for restraining said providing means from providing the audio information successively, if it is detected that a predetermined number of conditions have successively occurred in the time interval less than a predetermined time length.

27. The navigation apparatus according to claim 26, wherein a number of audio information restrained by said restraining means can be changed.

28. The navigation apparatus according to claim 27, wherein the restraining means changes the number of audio information to be restrained in accordance with at least one of running state, driving purpose and running environment.

29. The navigation apparatus according to claim 26 further comprising means for inhibiting said restraining means for audio information having a high rank value.

30. A navigation apparatus for providing a driver with different types of information, comprising:

means for allocating a priority order to inputted information in accordance with a type of the inputted information, the priority order being prescribed in accordance with a quality of information;

means for selecting a type of information having a high priority order in a case where there are a plurality of types of information to be provided; and means for providing the driver with the selected information in accordance with a priority order of the selected type of information, wherein in a case where information, having the same information as information of the already inputted information, is inputted, the priority order of the inputted information is set low.

* * * * *

UNITED STATES PATENT AND TRADEMARK OFFICE
CERTIFICATE OF CORRECTION

PATENT NO.    : 6,208,932 B1                                              Page 1 of 1
DATED         : March 27, 2001
INVENTOR(S)   : Hiroshi Ohmura et al.

It is certified that error appears in the above-identified patent and that said Letters Patent is hereby corrected as shown below:

<u>Column 9,</u>
Line 62, after "a", delete ".".

<u>Column 30,</u>
Line 59, after "be", insert -- indicated --.

<u>Column 39,</u>
Line 35, before "Information", insert -- Providing --.

Signed and Sealed this

Fourteenth Day of January, 2003

JAMES E. ROGAN
*Director of the United States Patent and Trademark Office*